United States Patent
Kim et al.

(10) Patent No.: US 11,107,047 B2
(45) Date of Patent: Aug. 31, 2021

(54) ELECTRONIC DEVICE PROVIDING ELECTRONIC PAYMENT FUNCTION AND OPERATING METHOD THEREOF

(71) Applicant: Samsung Electronics Co., Ltd., Suwon-si (KR)

(72) Inventors: Kibong Kim, Daegu (KR); Sang-Hee Kim, Gumi-si (KR); Inho Kim, Suwon-si (KR); Seon Sook Lee, Gumi-si (KR); Myung-Hwa Jun, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 763 days.

(21) Appl. No.: 15/054,642

(22) Filed: Feb. 26, 2016

(65) Prior Publication Data

US 2016/0253670 A1    Sep. 1, 2016

Related U.S. Application Data

(60) Provisional application No. 62/126,121, filed on Feb. 27, 2015.

(30) Foreign Application Priority Data

Jan. 15, 2016 (KR) .................. 10-2016-0005199

(51) Int. Cl.
*G06Q 20/02* (2012.01)
*G06Q 20/40* (2012.01)
(Continued)

(52) U.S. Cl.
CPC .............. *G06Q 20/02* (2013.01); *G06F 3/041* (2013.01); *G06F 3/048* (2013.01); *G06K 9/00* (2013.01);
(Continued)

(58) Field of Classification Search
CPC ........ G06Q 20/32; G06Q 20/02; G06Q 20/10; G06Q 20/16; G06Q 20/36; G06Q 20/38;
(Continued)

(56) References Cited

U.S. PATENT DOCUMENTS 5,396,558 A    3/1995    Ishiguro et al.
5,649,115 A    7/1997    Schrader et al.
(Continued)

FOREIGN PATENT DOCUMENTS

AU    2015200102 A1    2/2015
CN       1820279 A     8/2006
(Continued)

OTHER PUBLICATIONS

Phillip Garner et al.; "Card-based Macropayment for Mobile Phones"; International Conference on Mobile Business (ICMB'06); Lancaster University; p.garner, r.edwards, p.coulton@lancaster.ac.uk.
(Continued)

*Primary Examiner* — Jay Huang
*Assistant Examiner* — Courtney P Jones
(74) *Attorney, Agent, or Firm* — Jefferson IP Law, LLP

(57) ABSTRACT

A method of operating an electronic device capable of operating a plurality of execution environments including a first execution environment and a second execution environment is provided. The method includes generating a first authentication value, using a first application executed in the first execution environment, transmitting the first authentication value from the first application through the second execution environment to a second application executed in the first execution environment, transmitting, based on reception of the first authentication value, a second authentication value and a result of authentication of the user from the second application to the first application through the second execution environment, and performing, when the (Continued)

second authentication value corresponds to the first authentication value, payment based on the result of the authentication, using the first application.

17 Claims, 28 Drawing Sheets

(51) Int. Cl.
| | | |
|---|---|---|
| G06Q 20/38 | (2012.01) | |
| G06Q 20/32 | (2012.01) | |
| G06Q 20/36 | (2012.01) | |
| G06F 3/048 | (2013.01) | |
| G06Q 20/16 | (2012.01) | |
| G06Q 40/02 | (2012.01) | |
| G06K 9/00 | (2006.01) | |
| G06Q 20/10 | (2012.01) | |
| G06Q 20/22 | (2012.01) | |
| G06Q 20/34 | (2012.01) | |
| H04W 12/08 | (2021.01) | |
| G06F 3/041 | (2006.01) | |
| H04W 12/069 | (2021.01) | |

(52) U.S. Cl.
CPC .............. *G06Q 20/10* (2013.01); *G06Q 20/16* (2013.01); *G06Q 20/227* (2013.01); *G06Q 20/32* (2013.01); *G06Q 20/3227* (2013.01); *G06Q 20/3255* (2013.01); *G06Q 20/3274* (2013.01); *G06Q 20/3276* (2013.01); *G06Q 20/3278* (2013.01); *G06Q 20/34* (2013.01); *G06Q 20/36* (2013.01); *G06Q 20/363* (2013.01); *G06Q 20/367* (2013.01); *G06Q 20/3674* (2013.01); *G06Q 20/38* (2013.01); *G06Q 20/382* (2013.01); *G06Q 20/3823* (2013.01); *G06Q 20/38215* (2013.01); *G06Q 20/4012* (2013.01); *G06Q 20/4014* (2013.01); *G06Q 20/40145* (2013.01); *G06Q 40/02* (2013.01); *H04W 12/069* (2021.01); *H04W 12/08* (2013.01)

(58) Field of Classification Search
CPC ......... G06Q 20/40; G06F 3/041; G06F 3/048; H04W 12/06; H04W 12/08
See application file for complete search history.

(56) References Cited

U.S. PATENT DOCUMENTS

| | | | |
|---|---|---|---|
| 5,784,463 | A | 7/1998 | Chen et al. |
| 5,815,657 | A | 9/1998 | Williams et al. |
| 6,357,006 | B1 | 3/2002 | Pham et al. |
| 6,675,153 | B1 | 1/2004 | Cook et al. |
| 7,715,593 | B1 | 5/2010 | Adams et al. |
| 7,743,254 | B2 | 6/2010 | Sauve et al. |
| 7,767,430 | B2 | 8/2010 | Neeser et al. |
| 7,865,577 | B1 | 1/2011 | O'Neil et al. |
| 8,055,545 | B2 | 11/2011 | Mages et al. |
| 8,126,782 | B1 | 2/2012 | Zhu et al. |
| 8,452,882 | B2 | 5/2013 | Schneider |
| 8,621,075 | B2 | 12/2013 | Luna |
| 8,628,012 | B1 | 1/2014 | Wallner |
| 8,670,748 | B2 | 3/2014 | Slack et al. |
| 8,682,802 | B1 | 3/2014 | Kannanari |
| 8,718,602 | B2 | 5/2014 | Wu et al. |
| 8,732,451 | B2 | 5/2014 | Viswanathan et al. |
| 8,775,757 | B2 | 7/2014 | Polzin et al. |
| 8,814,046 | B1 | 8/2014 | Wallner |
| 8,843,749 | B2 | 9/2014 | Sauve et al. |
| 8,954,122 | B2 | 2/2015 | Wilmhoff et al. |
| 8,954,515 | B2 | 2/2015 | Guo et al. |
| 8,966,268 | B2 | 2/2015 | Marien |
| 9,027,079 | B2 | 5/2015 | Comay et al. |
| 9,055,314 | B2 | 6/2015 | Yin et al. |
| 9,077,543 | B2 | 7/2015 | Luft et al. |
| 9,092,772 | B2 | 7/2015 | Fernandez et al. |
| 9,100,873 | B2 | 8/2015 | Luna et al. |
| 9,112,703 | B2 | 8/2015 | Wood et al. |
| 9,118,464 | B2 | 8/2015 | Nix |
| 9,130,910 | B1 | 9/2015 | Logue |
| 9,135,424 | B2 | 9/2015 | Taveau et al. |
| 9,137,025 | B2 | 9/2015 | Lambert |
| 9,161,196 | B2 | 10/2015 | Ballantyne et al. |
| 9,161,225 | B2 | 10/2015 | Pecen et al. |
| 9,166,953 | B2 | 10/2015 | Luukkala et al. |
| 9,167,428 | B2 | 10/2015 | Buntinx |
| 9,602,508 | B1 | 3/2017 | Mahaffey et al. |
| 10,026,078 | B1 | 7/2018 | Nolan |
| 10,089,612 | B2 | 10/2018 | Wolfs et al. |
| 10,504,108 | B2 | 12/2019 | Laracey |
| 2002/0174068 | A1 | 11/2002 | Marsot |
| 2002/0186845 | A1 | 12/2002 | Dutta et al. |
| 2003/0134615 | A1 | 7/2003 | Takeuchi |
| 2003/0217165 | A1 | 11/2003 | Buch et al. |
| 2004/0098352 | A1 | 5/2004 | Mastsuyama |
| 2004/0199784 | A1 | 10/2004 | Irisawa et al. |
| 2005/0039054 | A1 | 2/2005 | Satoh et al. |
| 2005/0109841 | A1 | 5/2005 | Ryan et al. |
| 2005/0138384 | A1 | 6/2005 | Brickell et al. |
| 2005/0154886 | A1 | 7/2005 | Birk et al. |
| 2006/0016878 | A1 | 1/2006 | Singer et al. |
| 2006/0080550 | A1 | 4/2006 | Awatsu et al. |
| 2006/0165060 | A1 | 7/2006 | Dua |
| 2006/0200410 | A1 | 9/2006 | Kelley et al. |
| 2006/0209016 | A1 | 9/2006 | Fox et al. |
| 2006/0218403 | A1 | 9/2006 | Sauve et al. |
| 2007/0204153 | A1 | 8/2007 | Tome et al. |
| 2008/0115191 | A1 | 5/2008 | Kim et al. |
| 2008/0155268 | A1 | 6/2008 | Jazayeri et al. |
| 2008/0182592 | A1 | 7/2008 | Cha et al. |
| 2008/0320308 | A1 | 12/2008 | Kostiainen et al. |
| 2008/0320566 | A1 | 12/2008 | Herzog et al. |
| 2009/0114716 | A1 | 5/2009 | Ramachandran |
| 2009/0119184 | A1 | 5/2009 | Mages et al. |
| 2009/0156213 | A1 | 6/2009 | Spinelli et al. |
| 2009/0159663 | A1 | 6/2009 | Mullen et al. |
| 2009/0171836 | A1 | 7/2009 | Olliphant et al. |
| 2009/0307132 | A1 | 12/2009 | Phillips |
| 2010/0082991 | A1 | 4/2010 | Baldwin et al. |
| 2010/0088188 | A1 | 4/2010 | Kumar et al. |
| 2010/0117794 | A1 | 5/2010 | Adams et al. |
| 2010/0138912 | A1 | 6/2010 | Bauchot et al. |
| 2010/0156627 | A1 | 6/2010 | Kennedy |
| 2010/0210240 | A1 | 8/2010 | Mahaffey et al. |
| 2010/0216429 | A1 | 8/2010 | Mahajan |
| 2010/0217989 | A1 | 8/2010 | Sauve et al. |
| 2010/0242110 | A1 | 9/2010 | Louch et al. |
| 2010/0275259 | A1 | 10/2010 | Adams et al. |
| 2010/0306107 | A1 | 12/2010 | Nahari |
| 2011/0022835 | A1 | 1/2011 | Schibuk |
| 2011/0029370 | A1 | 2/2011 | Roeding et al. |
| 2011/0082737 | A1 | 4/2011 | Crowe et al. |
| 2011/0099112 | A1 | 4/2011 | Mages et al. |
| 2011/0145932 | A1 | 6/2011 | Nerger et al. |
| 2011/0214158 | A1 | 9/2011 | Pasquero et al. |
| 2012/0024947 | A1 | 2/2012 | Naelon |
| 2012/0074217 | A1 | 3/2012 | Block et al. |
| 2012/0101939 | A1 | 4/2012 | Kasower |
| 2012/0101951 | A1 | 4/2012 | Li et al. |
| 2012/0149331 | A1 | 6/2012 | Wu et al. |
| 2012/0149332 | A1 | 6/2012 | Wu et al. |
| 2012/0166795 | A1 | 6/2012 | Wood et al. |
| 2012/0171992 | A1 | 7/2012 | Cheong et al. |
| 2012/0172026 | A1 | 7/2012 | Kwon et al. |
| 2012/0197797 | A1 | 8/2012 | Grigg et al. |
| 2012/0216244 | A1 | 8/2012 | Kumar et al. |
| 2012/0221422 | A1 | 8/2012 | Sobek |
| 2012/0231844 | A1* | 9/2012 | Coppinger ......... G06Q 20/3229 455/558 |
| 2012/0254290 | A1 | 10/2012 | Naaman |
| 2012/0254624 | A1 | 10/2012 | Malkhasyan et al. |

(56) References Cited

U.S. PATENT DOCUMENTS

| | | |
|---|---|---|
| 2012/0290449 A1 | 11/2012 | Mullen et al. |
| 2012/0316992 A1 | 12/2012 | Oborne |
| 2012/0317370 A1 | 12/2012 | Luna |
| 2013/0006756 A1 | 1/2013 | Heo |
| 2013/0007114 A1 | 1/2013 | Wee et al. |
| 2013/0013480 A1 | 1/2013 | Venter |
| 2013/0042111 A1 | 2/2013 | Fiske |
| 2013/0080525 A1 | 3/2013 | Aoki et al. |
| 2013/0103582 A1 | 4/2013 | Singfield |
| 2013/0124349 A1 | 5/2013 | Khan et al. |
| 2013/0124420 A1 | 5/2013 | Duri et al. |
| 2013/0139230 A1 | 5/2013 | Koh et al. |
| 2013/0141567 A1 | 6/2013 | Walker et al. |
| 2013/0151400 A1 | 6/2013 | Makhotin et al. |
| 2013/0159186 A1 | 6/2013 | Brudnicki et al. |
| 2013/0208893 A1 | 8/2013 | Shablygin et al. |
| 2013/0226812 A1 | 8/2013 | Landrok et al. |
| 2013/0238455 A1 | 9/2013 | Laracey |
| 2013/0262303 A1 | 10/2013 | Metral |
| 2013/0294250 A1 | 11/2013 | Berelejis et al. |
| 2013/0314214 A1 | 11/2013 | Leica et al. |
| 2013/0317928 A1 | 11/2013 | Laracey |
| 2013/0325712 A1 | 12/2013 | Park et al. |
| 2013/0332740 A1 | 12/2013 | Sauve et al. |
| 2013/0339122 A1 | 12/2013 | Truitt et al. |
| 2013/0340064 A1 | 12/2013 | Kostiainen et al. |
| 2013/0346302 A1 | 12/2013 | Purves et al. |
| 2013/0347064 A1 | 12/2013 | Aissi |
| 2014/0007215 A1 | 1/2014 | Romano et al. |
| 2014/0025444 A1 | 1/2014 | Willis |
| 2014/0025520 A1 | 1/2014 | Mardikar et al. |
| 2014/0040126 A1 | 2/2014 | Andrews et al. |
| 2014/0058935 A1 | 2/2014 | Mijares |
| 2014/0068744 A1 | 3/2014 | Bran et al. |
| 2014/0073270 A1 | 3/2014 | Chou et al. |
| 2014/0075349 A1 | 3/2014 | Yun et al. |
| 2014/0095286 A1 | 4/2014 | Drewry et al. |
| 2014/0095865 A1 | 4/2014 | Yerra et al. |
| 2014/0101034 A1 | 4/2014 | Tanner et al. |
| 2014/0101048 A1 | 4/2014 | Gardiner et al. |
| 2014/0101679 A1 | 4/2014 | Yin et al. |
| 2014/0114777 A1 | 4/2014 | Guyot |
| 2014/0114860 A1 | 4/2014 | Ozvat et al. |
| 2014/0115125 A1 | 4/2014 | Chen |
| 2014/0122328 A1 | 5/2014 | Grigg |
| 2014/0122873 A1 | 5/2014 | Deutsch et al. |
| 2014/0138435 A1 | 5/2014 | Khalid |
| 2014/0149198 A1 | 5/2014 | Kim et al. |
| 2014/0149285 A1 | 5/2014 | De et al. |
| 2014/0162598 A1 | 6/2014 | Villa-Real |
| 2014/0180787 A1 | 6/2014 | Sarkissian |
| 2014/0180931 A1 | 6/2014 | Lie et al. |
| 2014/0181962 A1 | 6/2014 | Seo et al. |
| 2014/0183269 A1 | 7/2014 | Glaser |
| 2014/0191028 A1 | 7/2014 | Laracey |
| 2014/0222597 A1 | 8/2014 | Nadella et al. |
| 2014/0222663 A1 | 8/2014 | Park et al. |
| 2014/0222688 A1 | 8/2014 | Haggerty et al. |
| 2014/0244494 A1 | 8/2014 | Davis et al. |
| 2014/0244496 A1 | 8/2014 | Langus et al. |
| 2014/0258110 A1 | 9/2014 | Davis et al. |
| 2014/0258132 A1 | 9/2014 | Swamy et al. |
| 2014/0269946 A1 | 9/2014 | Wallner |
| 2014/0279437 A1 | 9/2014 | Lee et al. |
| 2014/0281500 A1 | 9/2014 | Ignatchenko |
| 2014/0282878 A1 | 9/2014 | Ignatchenko et al. |
| 2014/0282906 A1 | 9/2014 | Ignatchenko |
| 2014/0283006 A1 | 9/2014 | Korkishko et al. |
| 2014/0289130 A1 | 9/2014 | Savolainen et al. |
| 2014/0297539 A1 | 10/2014 | Swamy et al. |
| 2014/0297540 A1 | 10/2014 | Swamy et al. |
| 2014/0317686 A1* | 10/2014 | Vetillard ............... G06F 21/74 726/2 |
| 2014/0329500 A1 | 11/2014 | Wang et al. |
| 2014/0358794 A1 | 12/2014 | Finley |
| 2014/0364099 A1 | 12/2014 | Pai et al. |
| 2014/0370851 A1 | 12/2014 | Wang et al. |
| 2014/0372293 A1 | 12/2014 | Leung et al. |
| 2014/0372299 A1 | 12/2014 | Singh et al. |
| 2014/0372300 A1 | 12/2014 | Blythe |
| 2015/0001289 A1 | 1/2015 | Smith et al. |
| 2015/0004934 A1 | 1/2015 | Qian et al. |
| 2015/0006392 A1 | 1/2015 | Brand et al. |
| 2015/0006404 A1 | 1/2015 | Beidl et al. |
| 2015/0011273 A1 | 1/2015 | Wilmhoff et al. |
| 2015/0012427 A1 | 1/2015 | Phillips et al. |
| 2015/0012439 A1 | 1/2015 | Sakurai et al. |
| 2015/0019944 A1 | 1/2015 | Kalgi |
| 2015/0020160 A1 | 1/2015 | Goncalves et al. |
| 2015/0032524 A1 | 1/2015 | Fisher |
| 2015/0032635 A1 | 1/2015 | Guise |
| 2015/0039494 A1 | 2/2015 | Sinton et al. |
| 2015/0046324 A1 | 2/2015 | De La Cropte De Chanterac et al. |
| 2015/0046339 A1 | 2/2015 | Wong et al. |
| 2015/0082025 A1 | 3/2015 | Deshpande |
| 2015/0102047 A1 | 4/2015 | Tsou et al. |
| 2015/0112868 A1 | 4/2015 | Swamy et al. |
| 2015/0121068 A1* | 4/2015 | Lindemann ............ H04L 9/006 713/158 |
| 2015/0127549 A1* | 5/2015 | Khan ................... G06Q 20/20 705/71 |
| 2015/0134439 A1 | 5/2015 | Maxwell et al. |
| 2015/0161386 A1 | 6/2015 | Gupta et al. |
| 2015/0161647 A1 | 6/2015 | Arai et al. |
| 2015/0163222 A1 | 6/2015 | Pal |
| 2015/0178732 A1 | 6/2015 | Laracey |
| 2015/0199058 A1 | 7/2015 | Zhang |
| 2015/0200774 A1 | 7/2015 | Le Saint |
| 2015/0201322 A1 | 7/2015 | Kim et al. |
| 2015/0229477 A1 | 8/2015 | Blair et al. |
| 2015/0254636 A1 | 9/2015 | Yoon et al. |
| 2015/0264024 A1 | 9/2015 | Frank |
| 2015/0278796 A1 | 10/2015 | Jiang et al. |
| 2015/0287018 A1 | 10/2015 | Iqbal et al. |
| 2015/0302201 A1 | 10/2015 | Ryu |
| 2015/0302396 A1 | 10/2015 | Jeon |
| 2015/0347768 A1 | 12/2015 | Martin et al. |
| 2015/0363762 A1 | 12/2015 | Kimberg |
| 2015/0371234 A1 | 12/2015 | Huang et al. |
| 2015/0381369 A1 | 12/2015 | Broumas et al. |
| 2015/0381634 A1* | 12/2015 | Lal ..................... H04L 63/12 713/168 |
| 2016/0036892 A1 | 2/2016 | Twitchell, Jr. |
| 2016/0080468 A1 | 3/2016 | Lambert et al. |
| 2016/0125377 A1 | 5/2016 | Boncimino |
| 2016/0125412 A1 | 5/2016 | Cannon |
| 2016/0134660 A1* | 5/2016 | Ponsini ................. G06F 8/61 726/1 |
| 2016/0247138 A1 | 8/2016 | Wallner |
| 2016/0247144 A1 | 8/2016 | Oh et al. |
| 2016/0253657 A1 | 9/2016 | Sohn et al. |
| 2016/0381725 A1 | 12/2016 | Spinelli et al. |
| 2017/0039368 A1* | 2/2017 | Grobman .............. G06F 21/32 |
| 2017/0357960 A1* | 12/2017 | Quentin ........... G06Q 20/40145 |

FOREIGN PATENT DOCUMENTS

| | | |
|---|---|---|
| CN | 101034449 A | 9/2007 |
| CN | 101155030 A | 4/2008 |
| CN | 101501722 A | 8/2009 |
| CN | 101919303 A | 12/2010 |
| CN | 101996446 A | 3/2011 |
| CN | 102103683 A | 6/2011 |
| CN | 102685692 A | 9/2012 |
| CN | 103020825 A | 4/2013 |
| CN | 103188653 A | 7/2013 |
| CN | 103220637 A | 7/2013 |
| CN | 103282929 A | 9/2013 |
| CN | 103337023 A | 10/2013 |
| CN | 103426084 A | 12/2013 |
| CN | 103500404 A | 1/2014 |
| CN | 103765454 A | 4/2014 |

(56) References Cited

FOREIGN PATENT DOCUMENTS

| | | |
|---|---|---|
| CN | 103793815 A | 5/2014 |
| CN | 103942678 A | 7/2014 |
| CN | 104050559 A | 9/2014 |
| CN | 104200362 A | 12/2014 |
| CN | 104252675 A | 12/2014 |
| CN | 104320779 A | 1/2015 |
| CN | 104331796 A | 2/2015 |
| CN | 105393259 A | 3/2016 |
| EP | 0 949 595 A2 | 10/1999 |
| EP | 1 176 844 A3 | 5/2002 |
| EP | 2 515 472 A1 | 10/2012 |
| EP | 3 062 270 A1 | 8/2016 |
| EP | 3 057 047 B1 | 4/2019 |
| JP | 2002278939 A | 9/2002 |
| JP | 2005-62556 A | 3/2005 |
| JP | 2010-224807 A | 10/2010 |
| JP | 2014-128028 A | 7/2014 |
| KR | 10-2003-0009830 A | 2/2003 |
| KR | 10-2011-0019887 A | 3/2011 |
| KR | 10-2011-0032735 A | 3/2011 |
| KR | 10-2011-0112594 A | 10/2011 |
| KR | 10-2011-0137033 A | 12/2011 |
| KR | 10-2012-0046376 A | 5/2012 |
| KR | 10-2012-0094544 A | 8/2012 |
| KR | 10-2013-0083029 A | 7/2013 |
| KR | 10-2013-0089902 A | 8/2013 |
| KR | 10-2013-0125344 A | 11/2013 |
| KR | 10-2013-0142864 A | 12/2013 |
| KR | 10-2014-0068443 A | 6/2014 |
| KR | 10-2014-0079960 A | 6/2014 |
| KR | 10-2014-0096208 A | 8/2014 |
| KR | 10-2014-0112785 A | 9/2014 |
| KR | 10-2014-0117105 A | 10/2014 |
| KR | 10-2014-0133240 A | 11/2014 |
| KR | 10-2015-0019956 A | 2/2015 |
| KR | 10-2015-0097325 A | 8/2015 |
| KR | 10-2015-0104700 A | 9/2015 |
| KR | 10-2015-0141321 A | 12/2015 |
| WO | 2006103383 A1 | 10/2006 |
| WO | 2010039337 A2 | 4/2010 |
| WO | 2012/068094 A1 | 5/2012 |
| WO | 2012/091349 A2 | 7/2012 |
| WO | 2013/166185 A1 | 11/2013 |
| WO | 2013/166507 A1 | 11/2013 |
| WO | 2014/189569 A1 | 11/2014 |
| WO | 2015/004677 A1 | 1/2015 |
| WO | 2015004803 A1 | 1/2015 |

OTHER PUBLICATIONS

Wikipedia; "Magnetic stripe card".
EP Office Action dated Sep. 26, 2018 issued in EP Application 16755957.4.
EP Office Action dated Oct. 19, 2018 issued in EP Application 16755927.7.
EP Office Action dated Oct. 19, 2018 issued in EP Application 16157635.0.
EP Office Action dated Oct. 22, 2018 issued in EP Application 16755948.3.
EP Office Action dated Oct. 25, 2018 issued in EP Application 16755947.5.
Non-Final Office Action dated Dec. 3, 2018 issued in U.S. Appl. No. 15/056,827.
U.S. Office Action dated Jan. 28, 2019, issued in the U.S. Appl. No. 15/055,026.
Reddy et al., A Practical Approach for Implementation of Public Key Infrastructure for Digital Signatures, Journal of Information Engineering and Applications, ISSN 2224-5758 (print) ISSN 2224-896X (online), vol. 1, No. 2, 2011.
About Apple Pay in the US, Apple Support, https://support.apple.com/en-us/HT201469, Oct. 22, 2015.
Wallner, Stronger Security and Mobile Payments—Dramatically Faster and Cheaper to Implement, LoopPay White Paper, 2014, LoopPay, Inc.
Ibrahim, Receiver-deniable Public-Key Encryption, International Journal of Network Security, vol. 8, No. 2, pp. 159-165, Mar. 2009.
AU Office Action dated Jan. 14, 2019, issued in the AU Application No. 2016216833.
EP Office Action dated Feb. 18, 2019, issued in the EP Application No. 16755950.9.
CN Office Action dated Mar. 7, 2019, issued in the CN Application No. 201610111381.X.
EP Office Action dated Mar. 27, 2019, issued in the EP Application No. 16755954.1.
U.S. Non-final Office Action dated Jun. 14, 2019, issued in U.S. Appl. No. 15/054,808.
U.S. Final Office Action dated Aug. 8, 2019, issued in U.S. Appl. No. 15/055,026.
Australian Notice of Acceptance dated Aug. 1, 2019, issued in Australian Patent Application No. 2016216833.
Chinese Office Action dated Mar. 22, 2019, issued in Chinese Patent Application No. 201610084771.2.
U.S. Non-final Office Action dated Apr. 16, 2019, issued in U.S. Appl. No. 15/042,671.
U.S. Non-final Office Action dated Apr. 26, 2019, issued in U.S. Appl. No. 15/054,949.
U.S. Non-final Office Action dated May 6, 2019, issued in U.S. Appl. No. 15/054,601.
Australian Office Action dated May 7, 2019, issued in Australian Patent Application No. 2016216833.
U.S. Final Office Action dated Jun. 7, 2019, issued in U.S. Appl. No. 15/056,827.
U.S. Non-final Office Action dated Jun. 22, 2018, issued in U.S. Appl. No. 15/055,314.
U.S. final Office Action dated Dec. 12, 2019, issued in U.S. Appl. No. 15/054,808.
U.S. Advisory Action dated Dec. 20, 2019, issued in U.S. Appl. No. 15/054,949.
U.S. Non-final Office Action dated Jan. 22, 2020, issued in U.S. Appl. No. 15/054,601.
U.S. Final Office Action dated Sep. 19, 2019, issued in U.S. Appl. No. 15/054,601.
U.S. Final Office Action dated Sep. 30, 2019, issued in U.S. Appl. No. 15/054,949.
U.S. Final Office Action dated Oct. 7, 2019, issued in U.S. Appl. No. 15/055,314.
U.S. Non-Final Office Action dated Oct. 16, 2019, issued in U.S. Appl. No. 15/554,190.
U.S. Final Office Action dated Sep. 18, 2019, issued in U.S. Appl. No. 15/042,671.
European Office Action dated Sep. 3, 2019, issued in European Patent Application No. 16157728.3.
European Office Action dated Sep. 6, 2019, issued in European Patent Application No. 16755957.4.
Chinese Office Action dated Sep. 11, 2019, issued in Chinese Patent Application No. 201610084771.2.
Chinese Office Action dated Sep. 17, 2019, issued in Chinese Patent Application No. 201610111381.X.
European Office Action dated Sep. 30, 2019, issued in European Patent Application No. 16157635.0.
European Office Action dated Sep. 30, 2019, issued in European Patent Application No. 16755927.7.
European Office Action dated Oct. 7, 2019, issued in European Patent Application No. 16755948.3.
European Office Action dated Oct. 7, 2019, issued in European Patent Application No. 16755947.5.
European Office Action dated Oct. 8, 2019, issued in European Patent Application No. 16755921.0.
Chinese Office Action dated Dec. 4, 2019, issued in Chinese Patent Application No. 201680011694.6.
U.S. Non-final Office Action dated Mar. 12, 2020, issued in U.S. Appl. No. 15/042,671.
U.S. Non-final Office Action dated Apr. 27, 2020, issued in U.S. Appl. No. 15/554,190.
U.S. Non-final Office Action dated Feb. 21, 2020, issued in U.S. Appl. No. 15/056,113.

(56) References Cited

OTHER PUBLICATIONS

U.S. Non-final Office Action dated Apr. 30, 2020, issued in U.S. Appl. No. 15/054,808.
U.S. Non-final Office Action dated Apr. 28, 2020, issued in U.S. Appl. No. 15/055,314.
U.S. Non-final Office Action dated Jul. 9, 2020, issued in U.S. Appl. No. 15/055,026.
Chinese Office Action dated May 11, 2020, issued in Chinese Patent Application No. 201610113423.3.
Chinese Decision of Rejection dated May 12, 2020, issued in Chinese Patent Application No. 201610111381.X.
Indonesian Office Action dated Feb. 17, 2020, issued in Indonesian Patent Application No. P00201702069.
Chinese Office Action dated Mar. 24, 2020, issued in Chinese Patent Application No. 201680012591.1.
European Summons to Attend Oral Proceedings' dated Apr. 22, 2020, issued in European Patent Application No. 16 157 728.3.
European Office Action dated Aug. 17, 2020, issued in European Patent Application No. 16 755 950.9.
European Office Action dated Aug. 25, 2020, issued in European Patent Application No. 16 755 948.3.
Chinese Office Action dated Sep. 2, 2020, issued in Chinese Patent Application No. 201680011694.6.
Indian Office Action dated Sep. 14, 2020, issued in Indian Patent Application No. 201717017018.
Malaysian Substantive Examination Adverse Report dated Sep. 29, 2020, issued in Malaysian Patent Application No. PI2017701124.
European Preliminary Opinion dated Oct. 19, 2020, issued in European Patent Application No. 16157728.3.
Guowei et al., Analysis of the Trusted Environment of Mobile Intelligent Terminals, China Academic Journal Electronic Publishing House, Dec. 31, 2012.
European Office Action dated Feb. 2, 2021, issued in European Patent Application No. 16 755 948.3.
Chinese Office Action dated Feb. 10, 2021, issued in Chinese Patent Application No. 201680012550.2.
European Office Action dated Nov. 5, 2020, issued in European Patent Application No. 16 755 957.4.
Chinese Office Action dated Nov. 25, 2020, issued in Chinese Patent Application No. 201680012353.0.
European Decision to refuse dated Nov. 30, 2020, issued in European Patent Application No. 16 157 728.3.
Chinese Office Action dated Dec. 1, 2020, issued in Chinese Patent Application No. 201680012545.1.
Chinese Office Action dated Dec. 14, 2020, issued in Chinese Patent Application No. 201680012591.1.
U.S. Final Office Action dated Aug. 12, 2020, issued in U.S. Appl. No. 15/056,113.
U.S. Final Office Action dated Aug. 14, 2020, issued in U.S. Appl. No. 15/042,671.
U.S. Interview Summary dated Oct. 20, 2020, issued in U.S. Appl. No. 15/055,026.
U.S. Final Office Action dated Jan. 13, 2021, issued in U.S. Appl. No. 15/055,026.
Examiner Interview Summary dated Mar. 16, 2021, issued in U.S. Appl. No. 15/055,026.
Nasreen, The Contactless Wave: A Case Study in Transit Payments, Emerging Payments Industry Briefing, Jun. 2008, Federal Bank of Boston.
U.S. Final Office Action dated Nov. 9, 2020, issued in U.S. Appl. No. 15/054,808.
U.S. Final Office Action dated Oct. 23, 2020, issued in U.S. Appl. No. 15/055,314.
U.S. Final Office Action dated Nov. 24, 2020, issued in U.S. Appl. No. 15/056,113.
U.S. Non-final Office Action dated Jan. 1, 2021, issued in U.S. Appl. No. 15/554,190.
U.S. Non-final Office Action dated Mar. 31, 2021, issued in U.S. Appl. No. 15/056,113.
Chinese Office Action dated Mar. 1, 2021, issued in Chinese Patent Application No. 201680012319.3.
U.S. Notice of Allownace dated May 12, 2021, issued in U.S. Appl. No. 15/042,671.
Chinese Decision of Rejection dated May 26, 2021, issued in Chinese Patent Application No. 201680012591.1.
European Office Action dated Jun. 15, 2021, issued in European Patent Application No. 16 755 957.4.
Tap & Pay NFC—YouTube, https://www.youtube.com/watch?v=u7Xjzsqx-eQ, Sep. 3, 2014.
Nasreen Quibria, The Contactless Wave: A Case Study in Transit Payments, Emerging Payments Industry Briefing Jun. 2008.
U.S. Final Office Action dated Jun. 23, 2021, issued in U.S. Appl. No. 15/056,113.
U.S. Non-final Office Action dated Jun. 30, 2021, issued in U.S. Appl. No. 15/554,190.
Report of Substantive examination results issued in European Patent Application No. 16 155 258.3; dated Apr. 30, 2018.
Vietnamese Office Action dated Jun. 30, 2021, issued in Vietnamese Patent Application No. 1-2017-03492.
U.S. Non-Final Office Action dated Jul. 9, 2021, issued in U.S. Appl. No. 15/055,314.
Chinese Office Action dated Jul. 13, 2021, issued in Chinese Patent Application No. 201680012353.0.

\* cited by examiner

ELECTRONIC DEVICE PROVIDING ELECTRONIC PAYMENT FUNCTION AND OPERATING METHOD THEREOF

CROSS-REFERENCE TO RELATED APPLICATION(S)

This application claims the benefit under 35 U.S.C. § 119(e) of a U.S. provisional patent application filed on Feb. 27, 2015 in the U.S. Patent and Trademark Office and assigned Ser. No. 62/126,121, and under 35 U.S.C. § 119(a) of a Korean patent application filed on Jan. 15, 2016 in the Korean Intellectual Property Office and assigned Serial number 10-2016-0005199, the entire disclosure of each of which is hereby incorporated by reference.

TECHNICAL FIELD

The present disclosure relates to an electronic device and an operation method thereof. More particularly, the present disclosure relates to an electronic device including a plurality of execution environments for providing an electronic payment function, and an operation method thereof.

BACKGROUND

With the development of mobile communication technologies, an electronic device can perform various data communication functions as well as voice call functions. The electronic device, for example, a mobile device or a user device may provide various services through various applications. The electronic device may provide network-based communication services, such as multimedia services, for example, a music service, a dynamic image service, a digital broadcasting service, a call, wireless Internet, a short message service (SMS), a multimedia messaging service (MIMS), and the like. Further, the electronic device has evolved from a simple communication medium to a device having various functions, such as a communication function, a circulation function, an Internet function, or a payment function, and may be used in the whole of the social, cultural, financial, or circulation industrial field.

The electronic device may provide, for example, a mobile payment scheme through the electronic device by the payment function. The electronic device may enable, for example, payment using the electronic device from a payment scheme using cash or a plastic card. The electronic device may provide, for example, a function of paying for, using the electronic device, a service or purchase of goods through on-line or off-line (in the case of proceeding payment after buying a product or food in an actual shop or restaurant) using a mobile payment service. Further, the electronic device may have, for example, a communication function for receiving or transmitting payment information.

The electronic device as described above is problematic in that the electronic device has a vulnerable security in using a payment service. That is to say, user authentication information for use of a payment service may be exposed to an attack from the outside. As a result, a third party other than the user may perform payment through the electronic device.

Therefore, a need exists for an electronic device and an operation method thereof, which can improve the security in use of a payment service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device for providing a plurality of execution environments for providing an electronic payment function, and an operation method thereof.

In accordance with an aspect of the present disclosure, an electronic device is provided. The electronic device includes a memory configured to store a plurality of execution environments including a first execution environment and a second execution environment, and a processor configured to generate a first authentication value, using a first application executed in the first execution environment, transmit the first authentication value from the first application through the second execution environment to a second application executed in the first execution environment, transmit, based on reception of the first authentication value, a second authentication value and a result of authentication of the user from the second application to the first application through the second execution environment, and perform, when the second authentication value corresponds to the first authentication value, payment based on the result of the authentication, using the first application.

In accordance with another aspect of the present disclosure, a method of operating an electronic device capable of operating a plurality of execution environments including a first execution environment and a second execution environment is provided. The method includes generating a first authentication value, using a first application executed in the first execution environment, transmitting the first authentication value from the first application through the second execution environment to a second application executed in the first execution environment, transmitting, based on reception of the first authentication value, a second authentication value and a result of authentication of the user from the second application to the first application through the second execution environment, and performing, when the second authentication value corresponds to the first authentication value, payment based on the result of the authentication, using the first application.

In accordance with another aspect of the present disclosure, a recording medium including a program for executing operations in an electronic device capable of operating a plurality of execution environments including a first execution environment and a second execution environment is provided. The operations include generating a first authentication value, using a first application executed in the first execution environment, transmitting the first authentication value from the first application through the second execution environment to a second application executed in the first execution environment, transmitting, based on reception of the first authentication value, a second authentication value and a result of authentication of the user from the second application to the first application through the second execution environment, and performing, when the second authentication value corresponds to the first authentication value, payment based on the result of the authentication, using the first application.

According to various embodiments of the present disclosure, the electronic device can ensure the security in using the payment service.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
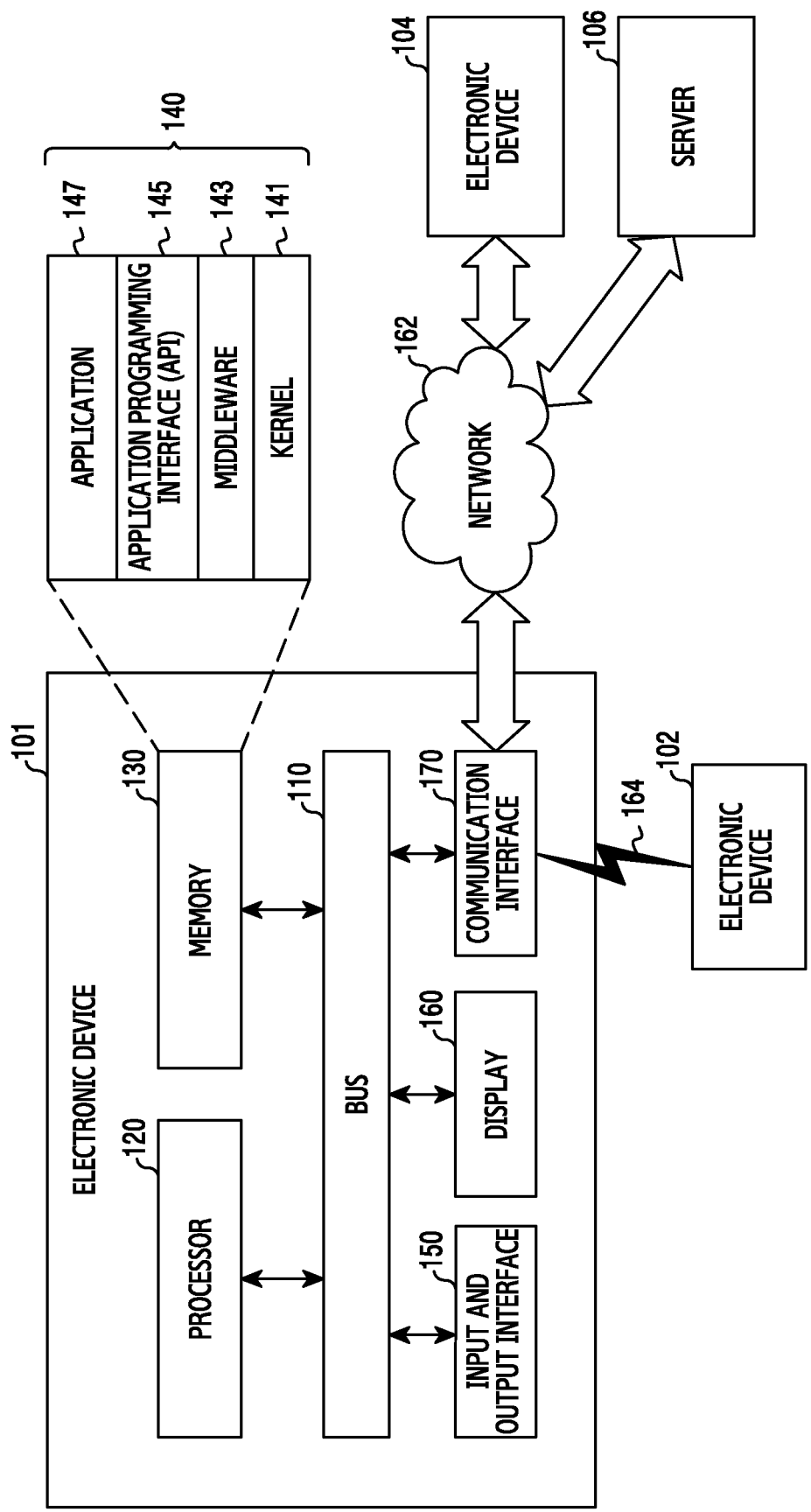
FIG. 1 is a block diagram illustrating a network environment system according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In an embodiment of the present disclosure, the expression "have", "may have", "include" or "may include" refers to existence of a corresponding feature (e.g., a numerical value, a function, an operation, or components, such as elements), and does not exclude existence of additional features.

In an embodiment of the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first electronic device and a second electronic device may indicate different user devices regardless of order or importance thereof. For example, a first element may be termed a second element, and similarly, a second element may be termed a first element without departing from the scope of the present disclosure.

It should be understood that when an element (e.g., the first element) is referred to as being (operatively or communicatively) "connected," or "coupled," to another element (e.g., the second element), the element may be directly connected or coupled directly to the other element or any other element (e.g., the third element) may be interposer between them. In contrast, it may be understood that when an element (e.g., the first element) is referred to as being "directly connected," or "directly coupled" to another element (e.g., the second element), there are no element (e.g., the third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., an embedded processor) only for performing the corresponding operations or a generic-purpose processor (e.g., a central processing unit (CPU) or an application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a moving picture experts group phase 1 or phase 2 (MPEG-1 or MPEG-2) audio layer-3 (MP3) player, a mobile medical device, a camera, and a wearable device. According to various embodiments of the present disclosure, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or a tattoo), a bio-implantable type (e.g., an implantable circuit), and the like.

According to some embodiments of the present disclosure, the electronic device may be a home appliance. The home appliance may, for example, include at least one of a television, a digital versatile disc (DVD) player, an audio player, a refrigerator, an air conditioner, a cleaner, an oven, a microwave oven, a washing machine, an air purifier, a set-top box, a home automation control panel, a TV box (e.g., HomeSync™ of Samsung, Apple TV™, or Google TV™), a game console (e.g., Xbox™, PlayStation™), an electronic dictionary, an electronic key, a camcorder, and an electronic frame.

According to another embodiment of the present disclosure, the electronic device may include at least one of various medical devices (e.g., various portable medical measuring devices (e.g., a blood glucose monitoring device, a heart rate monitoring device, a blood pressure measuring device, a body temperature measuring device, and the like), a magnetic resonance angiography (MRA), a magnetic resonance imaging (MRI), a movie camera, a computed tomography (CT) machine, and an ultrasonic machine), a navigation device, a global navigation satellites system (GNSS), an event data recorder (EDR), a flight data recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sale (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, and the like).

According to some embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology Hereinafter, an electronic device according to various embodiments will be described with reference to the accompanying drawings. As used herein, the term "user" may indicate a person who uses an electronic device or a device (e.g., an artificial intelligence electronic device) that uses an electronic device.

FIG. 1 is a block diagram illustrating a network environment system according to various embodiments of the present disclosure.

Referring to FIG. 1, an electronic device 101, a first external electronic device 102, or a second external electronic device 104 or a server 106 may be connected with each other through a network 162 or a short range communication 164. The electronic device 101 may include a bus 110, a processor 120, a memory 130, an input/output interface 150, a display 160, and a communication interface 170. In some embodiments of the present disclosure, the electronic device 101 may omit at least one of the above elements or may further include other elements.

The bus 110 may include, for example, a circuit for interconnecting the elements 110 to 170 and transferring communication (e.g., control messages and/or data) between the elements.

The processor 120 may include one or more of a CPU, an AP, and a communication processor (CP). The processor 120, for example, may carry out operations or data processing relating to control and/or communication of at least one other element of the electronic device 101.

The memory 130 may include a volatile memory and/or a non-volatile memory. The memory 130 may store, for example, instructions or data relevant to at least one other element of the electronic device 101. According to an embodiment of the present disclosure, the memory 130 may store software and/or a program 140. The program 140 may include, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented by the other programs (e.g., the middleware 143, the API 145, or the application programs 147). Furthermore, the kernel 141 may provide an interface through which the middleware 143, the API 145, or the application programs 147 may access the individual elements of the electronic device 101 to control or manage the system resources.

The middleware 143, for example, may function as an intermediary for allowing the API 145 or the application programs 147 to communicate with the kernel 141 to exchange data.

In addition, the middleware 143 may process one or more task requests received from the application programs 147 according to priorities thereof. For example, the middleware 143 may assign priorities for using the system resources (e.g., the bus 110, the processor 120, the memory 130, and the like) of the electronic device 101, to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., an instruction) for file control, window control, image processing, or text control.

The input/output interface 150, for example, may function as an interface that may transfer instructions or data input from a user or another external device to the other element(s) of the electronic device 101. In addition, the input/output interface 150 may output, to the user or another external device, commands or data received from the element(s) other than the input/output interface 150 within the electronic device 101.

Examples of the display 160 may include a liquid crystal display (LCD), a light-emitting diode (LED) display, an organic LED (OLED) display, a microelectromechanical systems (MEMS) display, and an electronic paper display. The display 160, for example, may display various types of contents (e.g., a text, images, videos, icons, symbols, and the like) for the user. The display 160 may include a touch screen and receive, for example, a touch, gesture, proximity, or hovering input by using an electronic pen or the user's body part.

The communication interface 170, for example, may set communication between the electronic device 101 and an external device (e.g., the first external electronic device 102, the second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, long term evolution (LTE), LTE-Advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may include at least one of, for example, Wi-Fi, Bluetooth, near field communication (NFC), magnetic stripe transmission (MST), and global navigation satellite system (GNSS).

The MST may generate a pulse according to transmission data using an electromagnetic signal and the pulse may generate a magnetic field signal. The electronic device 101 may transmit the magnetic field signal to a POS device, and the POS device may detect the magnetic field signal using an MST reader and convert the detected magnetic field signal to an electric signal to restore the data.

The GNSS may include at least one of, for example, a global positioning system (GPS), a global navigation satellite system (Glonass), a Beidou navigation satellite system (hereinafter, referred to as "Beidou"), and Galileo (European global satellite-based navigation system) according to the use area or bandwidth. Hereinafter, in the present disclosure, the "GPS" may be interchangeably used with the "GNSS". The wired communication may include, for example, at least one of a universal serial bus (USB), a high definition multimedia interface (HDMI), recommended standard 232 (RS-232), and a plain old telephone service (POTS). The network 162 may include at least one of a communication network, such as a computer network (e.g., a local area network (LAN) or a wide area network (WAN)), the Internet, and a telephone network.

Each of the first external electronic device 102 and the second external electronic device 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be performed in another electronic device or a plurality of electronic devices (e.g., the first external electronic device 102 and the second external electronic device 104 or the server 106). According to an embodiment of the present disclosure, when the electronic device 101 has to perform some functions or services automatically or in response to a request, the electronic device 101 may make a request for performing at least some functions relating thereto to another device (e.g., the first external electronic device 102 or the second external electronic device 104 or the server 106) instead of performing the functions or services by itself or in addition. Another electronic device (e.g., the first external electronic device 102 or the second external electronic device 104) or the server 106 may execute the requested functions or the additional functions, and may deliver a result of the execution to the electronic device 101. The electronic device 101 may process the received result as it is or additionally to provide the requested functions or services. To this end, for example, cloud computing, distributed computing, or client-server computing technology may be used.

Figure 2:
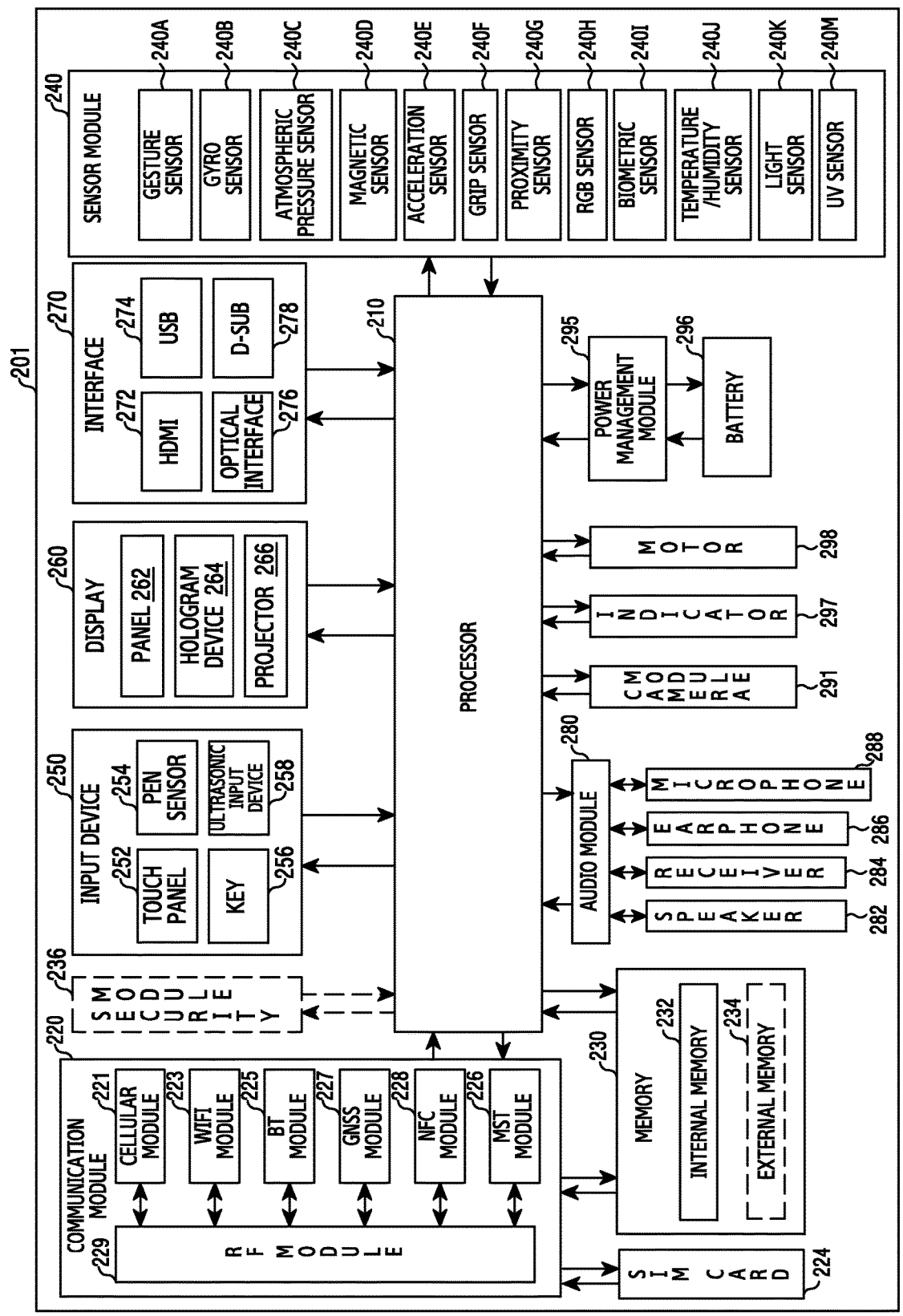
FIG. 2 is a block diagram illustrating an electronic device according to various embodiments of the present disclosure.

FIG. 2 is a block diagram illustrating an electronic device according to various embodiments of the present disclosure.

Referring to FIG. 2, an electronic device 201 may include, for example, all or some of the electronic device 101 illustrated in FIG. 1. The electronic device 201 may include at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program and perform processing of various pieces of data and calculations. The processor 210 may be implemented by, for example, a system on chip (SoC). According to an embodiment of the present disclosure, the processor 210 may further include a graphics processing unit (GPU) and/or an image signal processor. The processor 210 may include at least some (e.g., a cellular module 221) of the elements illustrated in FIG. 2. The processor 210 may load, into a volatile memory, instructions or data received from at least one (e.g., a non-volatile memory) of the other elements and may process the loaded instructions or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a Bluetooth module 225, a GNSS module 227 (e.g., a GPS module, a Glonass module, a Beidou module, or a Galileo module), an NFC module 228, an MST module 226, and a radio frequency (RF) module 229.

The cellular module 221 may provide a voice call, image call, a text message service, or an Internet service through, for example, a communication network. According to an embodiment of the present disclosure, the cellular module 221 may distinguish between and authenticate electronic devices 201 within a communication network using a subscriber identification module (e.g., the SIM card 224). According to an embodiment of the present disclosure, the cellular module 221 may perform at least some of the functions that the processor 210 may provide. According to an embodiment of the present disclosure, the cellular module 221 may include a CP.

Each of the Wi-Fi module 223, the BT module 225, the GNSS module 227, the NFC module 228 and the MST module 226 may include, for example, a processor for processing data transmitted and received through the relevant module. According to some embodiments of the present disclosure, at least some (e.g., two or more) of the cellular module 221, the Wi-Fi module 223, the BT module 225, the GNSS module 227, the NFC module 228, and the MST module 226 may be included in one integrated chip (IC) or IC package.

The RF module 229 may transmit/receive, for example, a communication signal (e.g., an RF signal). The RF module 227 may include, for example, a transceiver, a power amp module (PAM), a frequency filter, a low noise amplifier (LNA), or an antenna. According to another embodiment of the present disclosure, at least one of the cellular module 221, the Wi-Fi module 222, the Bluetooth module 223, the GNSS module 227, the NFC module 225, and the MST module 226 may transmit and receive RF signals through a separate RF module.

The subscriber identification module 229 may include, for example, a card including a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include, for example, an internal memory 232 or an external memory 234. The internal memory 232 may include at least one of, for example, a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a flash memory (e.g., a NAND flash memory or a NOR flash memory), a hard driver, or a solid state drive (SSD)).

An external memory 234 may further include a flash drive, for example, a compact flash (CF), a secure digital (SD), a micro-SD, a mini-SD, an extreme digital (xD), a memory stick, and the like. The external memory 234 may be functionally and/or physically connected to the electronic device 201 through various interfaces.

The security module 236 is a module including a storage space having a higher security level than that of the memory 230 and may be a circuit guaranteeing safe data storage and protected execution environment. The security module 236 may be implemented by a separate circuit and may include a separate processor. The security module 236 may exist in, for example, a detachable smart chip or SD card or include an embedded secure elements (eSE) embedded in a fixed chip of the electronic device 201. Further, the security module 236 may be operated by an OS different from the OS of the electronic device 201. For example, the security module may operate based on a java card open platform (JCOP) operating system.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G a color sensor 240H (e.g., a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments of the present disclosure, an electronic device 201 may further include a processor configured to control the sensor module 240 as a part of or separately from the processor 210, and may control the sensor module 240 while the processor 210 is in a sleep state.

The input device 250 may include, for example, a touch panel 252, a (digital) pen sensor 254, a key 256, or an ultrasonic input device 258. The touch panel 252 may use at least one of, for example, a capacitive scheme, a resistive scheme, an infrared scheme, and an ultrasonic scheme. In addition, the touch panel 252 may further include a control circuit. The touch panel 252 may further include a tactile layer and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic wave generated by an input tool through a microphone (e.g., the microphone 288) and identify data corresponding to the detected ultrasonic waves.

The display 260 (e.g., the display 160) may include a panel 262, a hologram device 264 or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be configured by one module. According to an embodiment of the present disclosure, the panel 262 may include a pressure sensor (or force sensor) capable of measuring the intensity of pressure by a touch of a user. The pressure sensor may be implemented either integrated with the touch panel 252 or as at least one sensor separate from the touch panel 252. The hologram device 264 may show a three dimensional image in the air by using an interference of light. The projector 266 may display an image by projecting light onto a screen. The screen may be located, for example, inside or outside the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a d-subminiature (D-sub) 278. The interface 270 may be included in, for example, the communication interface 170 illustrated in FIG. 1. Additionally or alternatively, the interface 270 may include, for example, a mobile high-definition link (MI-IL) interface, a SD card/multi-media card (MMC) interface, or an infrared data association (IrDA) standard interface.

The audio module 280 may bilaterally convert, for example, a sound and an electrical signal. At least some elements of the audio module 280 may be included in, for example, the input/output interface 150 illustrated in FIG. 1. The audio module 280 may process sound information which is input or output through, for example, a speaker 282, a receiver 284, earphones 286, the microphone 288, and the like.

The camera module 291 is a device which may photograph a still image and a dynamic image. According to an embodiment of the present disclosure, the camera module 291 may include one or more image sensors (e.g., a front sensor or a back sensor), a lens, an image signal processor (ISP) or a flash (e.g., an LED or a xenon lamp).

The power management module 295 may manage, for example, power of the electronic device 201. According to an embodiment of the present disclosure, the power management module 295 may include a power management integrated circuit (PMIC), a charger integrated circuit (IC), or a battery or fuel gauge. The PMIC may use a wired and/or wireless charging method. Examples of the wireless charging method may include, for example, a magnetic resonance method, a magnetic induction method, an electromagnetic wave method, and the like, and may further include additional circuits (e.g., a coil loop, a resonance circuit, a rectifier, and the like) for wireless charging. The battery gauge may measure, for example, a residual quantity of the battery 296, and a voltage, a current, or a temperature during the charging. The battery 296 may include, for example, a rechargeable battery or a solar battery.

The indicator 297 may indicate a particular state (e.g., a booting state, a message state, a charging state, and the like) of the electronic device 201 or a part (e.g., the processor 210) of the electronic device 201. The motor 298 may convert an electrical signal into mechanical vibration, and may generate vibration, a haptic effect, and the like. Although not illustrated, the electronic device 201 may include a processing unit (e.g., a GPU) for supporting a mobile television (TV). The processing unit for supporting mobile TV may, for example, process media data according to a certain standard, such as digital multimedia broadcasting (DMB), digital video broadcasting (DVB), or mediaFLO™.

Each of the components of the electronic device according to the present disclosure may be implemented by one or more components and the name of the corresponding component may vary depending on a type of the electronic device. The electronic device according to various embodiments of the present disclosure may include at least one of the aforementioned elements. Some elements may be omitted or other additional elements may be further included in the electronic device. In addition, some of the hardware components according to various embodiments may be combined into one entity, which may perform functions identical to those of the relevant components before the combination.

Figure 3:
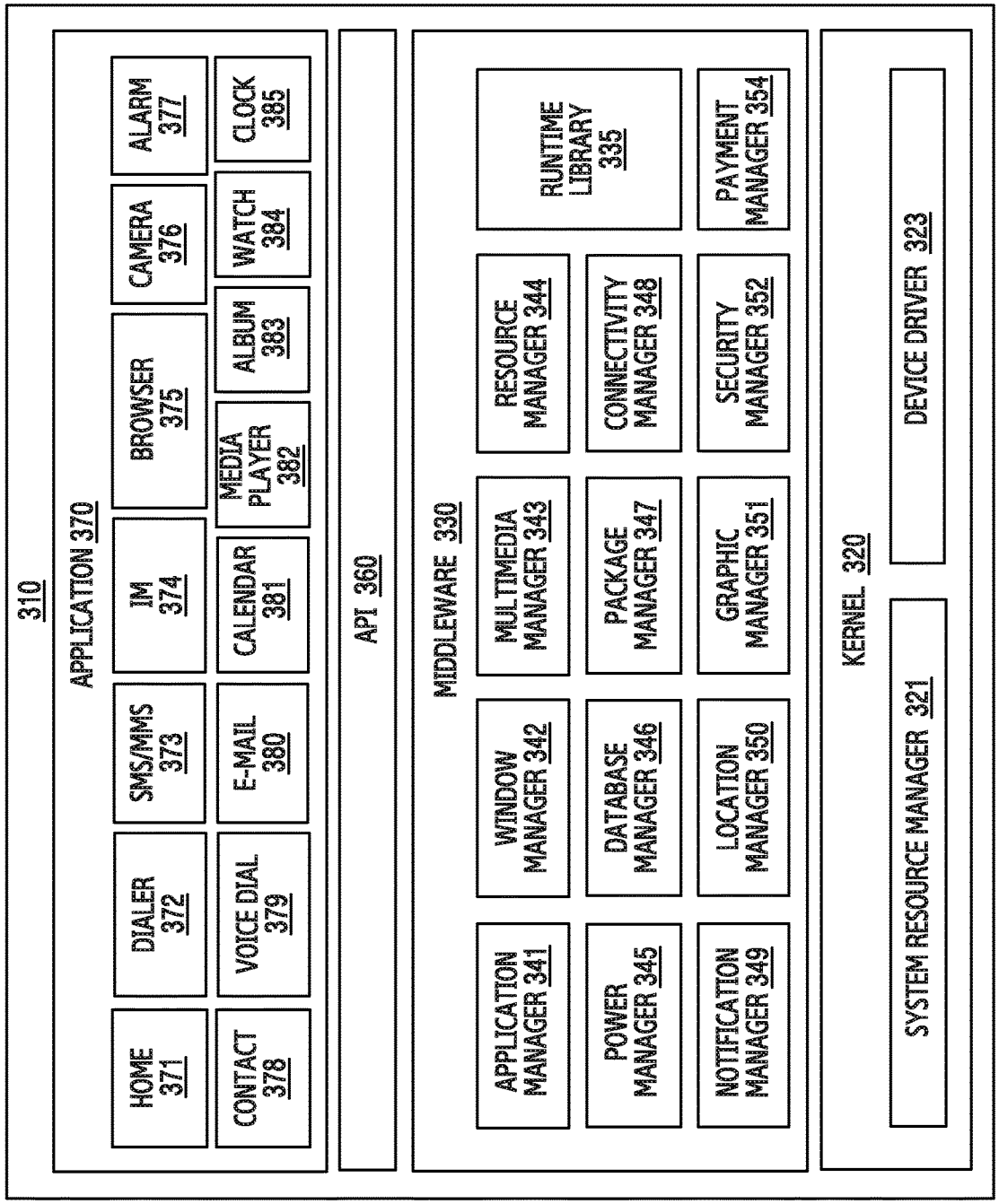
FIG. 3 is a block diagram illustrating a programming module according to various embodiments of the present disclosure.

FIG. 3 is a block diagram illustrating a program module according to various embodiments of the present disclosure.

Referring to FIG. 3, a program module 310 (e.g., the program 140) may include an OS for controlling resources related to the electronic device (e.g., the electronic device 101) and/or various applications (e.g., the application programs 147) executed in the operating system. The operating system may be, for example, Android, iOS, Windows, Symbian, Tizen, Bada, and the like.

The program module 310 may include a kernel 320, middleware 330, an API 360, and/or an application 370. At least some of the program module 310 may be preloaded on the electronic device, or may be downloaded from an external electronic device (e.g., the first external electronic device 102 or the second external electronic device 104, or the server 106).

The kernel 320 (e.g., the kernel 141) may include, for example, a system resource manager 321 and/or a device driver 323. The system resource manager 321 may perform the control, allocation, retrieval, and the like of system resources. According to an embodiment of the present disclosure, the system resource manager 321 may include a process manager, a memory manager, a file system manager, and the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide a function required by the applications 370 in common or provide various functions to the applications 370 through the API 360 so that the applications 370 can efficiently use limited system resources within the electronic device. According to an embodiment of the present disclosure, the middleware 330 (e.g., the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and a payment manager 354.

The runtime library 335 may include a library module which a compiler uses in order to add a new function through a programming language while the applications 370 are being executed. The runtime library 335 may perform input/output management, memory management, the functionality for an arithmetic function, and the like.

The application manager 341 may manage, for example, a life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the corresponding format. The resource manager 344 may manage resources, such as a source code, a memory, a storage space, and the like, of at least one of the applications 370.

The power manager 345 may operate together with a basic input/output system (BIOS) to manage a battery or power, and may provide power information required for the operation of the electronic device. The database manager 346 may generate, search for, and/or change a database to be used by at least one of the applications 370. The package manager 347 may manage the installation or update of an application distributed in the form of a package file.

The connectivity manager 348 may manage a wireless connection, such as, for example, Wi-Fi or Bluetooth. The notification manager 349 may display or notify of an event, such as an arrival message, an appointment, a proximity notification, and the like, in such a manner as not to disturb the user. The location manager 350 may manage location information of the electronic device. The graphic manager 351 may manage a graphic effect, which is to be provided to the user, or a user interface (UI) related to the graphic effect. The security manager 352 may provide various security functions required for system security, user authentication, and the like. According to an embodiment of the present disclosure, when the electronic device (e.g., the electronic device 101) has a telephone call function, the middleware 330 may further include a telephony manager for managing a voice call function or a video call function of the electronic device. The payment manager may relay information for payment from the application 370 to the application 370 or the kernel 320. Further, the payment manager may store information related to the payment, which has been received from an external device, in the electronic device 201 or transfer the internally stored information to an external device.

The middleware 330 may include a middleware module that forms a combination of various functions of the above-described elements. The middleware 330 may provide a module specialized for each type of OS in order to provide a differentiated function. In addition, the middleware 330 may dynamically delete some of the existing elements, or may add new elements.

The API 360 (e.g., the API 145) is, for example, a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which can provide functions, such as a home application 371, a dialer application 372, a short message service (SMS)/multimedia messaging service (MIMS) application 373, an instant message application (IM) 374, a browser application 375, a camera application 376, an alarm application 377, a contacts application 378, a voice dialer application 379, an email application 380, a calendar application 381, a media player application 382, an album application 383, a clock application 385, a health care application (e.g., measure exercise quantity or blood sugar), or environment information (e.g., atmospheric pressure, humidity, temperature information, and the like).

According to an embodiment of the present disclosure, the applications 370 may include an application (hereinafter, referred to as an "information exchange application" for convenience of description) supporting information exchange between the electronic device (e.g., the electronic device 101) and an external electronic device (e.g., the first external electronic device 102 or the second external electronic device 104). The information exchange application may include, for example, a notification relay application for transferring specific information to an external electronic device or a device management application for managing an external electronic device.

For example, the notification relay application may include a function of transferring, to the external electronic device (e.g., the first external electronic device 102 or the second external electronic device 104), notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

For example, the device management application may manage (e.g., install, delete, or update) at least one function of an external electronic device (e.g., the second external electronic device 104) communicating with the electronic device (e.g., a function of turning on/off the external electronic device itself (or some components) or a function of adjusting luminance (or a resolution) of the display), applications operating in the external electronic device, or services provided by the external electronic device (e.g., a call service and a message service).

According to an embodiment of the present disclosure, the applications 370 may include applications (e.g., a health care application of a mobile medical appliance, and the like) designated according to attributes of the first external electronic device 102 or the second external electronic device 104. According to an embodiment of the present disclosure, the application 370 may include an application received from the external electronic device (e.g., the server 106, or the first external electronic device 102 or the second external electronic device 104). According to an embodiment of the present disclosure, the application 370 may include a preloaded application or a third party application which can be downloaded from the server. Names of the elements of the program module 310, according to the above-described embodiments of the present disclosure, may change depending on the type of OS.

According to various embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGAs), and a programmable-logic device for performing operations which has been known or are to be developed hereinafter.

At least some of the devices (e.g., modules or functions thereof) or the method (e.g., operations) according to various embodiments may be implemented by, for example, a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

According to various embodiments of the present disclosure, a recording medium according to various embodiments including a program for executing operations in an electronic device capable of operating a plurality of execution environments including a first execution environment and a second execution environment is provided. The operations include generating a first authentication value, using a first application executed in the first execution environment, transmitting the first authentication value from the first application through the second execution environment to a second application executed in the first execution environment, transmitting, based on reception of the first authentication value, a second authentication value and a result of authentication of the user from the second application to the first application through the second execution environment, and performing, when the second authentication value corresponds to the first authentication value, payment based on the result of the authentication, using the first application.

According to various embodiments of the present disclosure, the first execution environment may include a trusted execution environment and the second execution environment may include a rich execution environment.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

Figure 4:
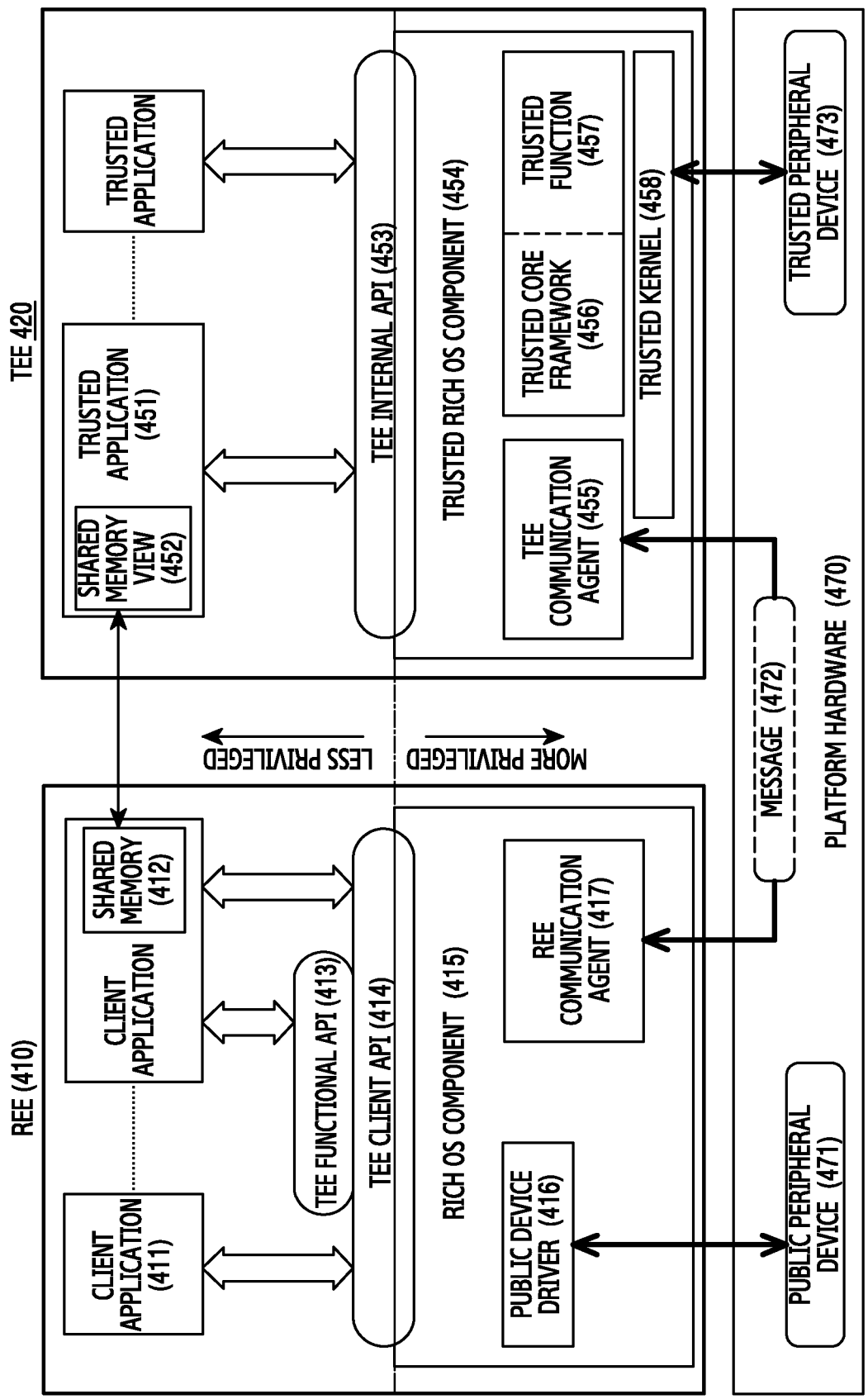
FIG. 4 is a block diagram illustrating a plurality of execution environments operated in an electronic device according to various embodiments of the present disclosure.

FIG. 4 is a block diagram illustrating a plurality of execution environments operated in an electronic device according to various embodiments of the present disclosure.

Referring to FIG. 4, the electronic device 101 may operate a plurality of execution environments 400 having security levels in order to reinforce the security. The plurality of execution environments may include, for example, a rich execution environment (REE) 410 and a trusted execution environment (TEE) 420.

The REE 410 may be, for example, a first execution environment having a first security level. The TEE 420 may be, for example, a second execution environment having a second security level different from (e.g., higher than) the first security level. According to an embodiment of the present disclosure, the electronic device 101 may include another execution environment (e.g., a third execution environment) having a third security level, without being limited thereto.

The REE 410 may include, for example, a client application 411, a shared memory 412, a TEE functional API 413, a TEE client API 414, a rich OS component 415, a public device driver 416, or an REE communication agent 417. The client application 411 (e.g., the application 370 or application program 147) may include at least one application capable of performing functions, including a phone call, messaging, payment, alarm, browser, or camera. The client application 411 may include the shared memory 412 and may access a shared memory view 452 of the TEE 420 using the shared memory 412. The shared memory 412 may be a memory accessible by applications of the REE 410 and the TEE 420.

The TEE functional API 413 and/or the TEE client API 414 are APIs allowed to access the TEE 420 and can perform functions similar to those of the API 145 or the API 360. The TEE functional API 413 may be an application interface designed to access some services of the TEE 420. The TEE client API 414 may be an interface designed to allow exchange of data between applications of the REE 410 and the TEE 420. The rich OS component 415 may include, for example, a public device driver 416 or an REE communication agent 417. The public device driver 416 may be a system driver for driving a public peripheral device 471 in the REE 410. The REE communication agent 417 may perform a role of processing a message communication between the client application 411 and the trusted application 451. The client application 411 may transfer a message 472 from the REE communication agent 417 to the TEE communication agent 455 of the TEE 420, using the TEE functional API 413 and/or the TEE client API 414. The message 472 may be, for example, implemented to be transferred to only the TEE 420 in view of hardware. The REE communication agent 417 may, for example, receive a result of processing associated with the message 472 from the TEE communication agent 455 and transfer the result to the client application 411.

The TEE 420 may store data requiring a relatively high security level and perform related operations in a safe environment. The TEE 420 may operate on an application processor of the electronic device 101 and operate based on a reliable hardware structure determined in the process of manufacturing the electronic device 101. The TEE 420 may divide the application processor or memory into a general area and a security area and operate in the security area. The TEE 420 may configure software or hardware requiring security, to operate in only the security area. The electronic device 101 may operate the TEE 420 through a physical change of hardware or a logical change of software. The TEE 420 may be separated from the REE 410 through hardware restrictions, or may be separated in view of software while operating in the same hardware.

The TEE 420 may include a trusted application 451, a shared memory view 452, a TEE internal API 453, a trusted OS component 454, a TEE communication agent 455, a trusted core framework 456, a trusted function 457, or a trusted kernel 458. The trusted application 451 may include at least one application capable of performing functions of digital right management (DRM), security, payment, or biometric information. The shared memory view 452 may be a memory space capable of accessing the shared memory 412 of the REE 410.

The trusted application 451 may receive, for example, a message 472 from the REE communication agent 417 through the TEE communication agent 455, using the TEE internal API 453. The TEE client API 453 may be an interface provided to enable basic software of the TEE 420 to operate. The TEE communication agent 455 may receive the message 472 and transfer the message to the trusted application 451. The trusted application 451 may perform an operation associated with the message 472 and transfer a result of processing of the operation to the REE communication agent 417 through the TEE communication agent 455. The trusted OS component 454 may include a TEE communication agent 455, a trusted core framework 456, a trusted function 457, and/or a trusted kernel 458.

The TEE communication agent 455 is one kind of framework API and may perform a role of processing a safe message communication between the client application 411 and the trusted application 451. The trusted core framework 456 may provide operating system functions, such as scheduling, communication, and memory management, to be performed by the trusted application 451. The trusted function 457 may provide a function of trust including a password. The trusted kernel 458 may be a kernel for driving the TEE 420. The platform hardware 470 is a hardware element which transfers, for example, the message 472 from the REE communication agent 417 to the TEE communication agent 455. The platform hardware 470 may include a public peripheral device 471 and/or a trusted peripheral device 473. The public peripheral device 471 may communicate with the public device driver 416 of the REE 410. The trusted peripheral device 473 may communicate with the trusted kernel 458 of the TEE 420. The public peripheral device 471, which is a general peripheral device provided in an electronic device, may be, for example, a Gyro sensor or a GPS device. The trusted peripheral device 473 is a security (or password)-related peripheral device connected with the TEE 420 and may be, for example, a fingerprint sensor, an iris sensor, or a security display.

"More privileged" and "less privileged" relate to an authority capable of accessing the system, and "more privileged" may refer to a high system access authority and "less privileged" may refer to a low system access authority. For example, a low system authority may have a limited authority for access to the system (e.g., file writing, reading, and the like). The system access authority may have a concept equal or similar to the access authority in a general operating system.

Figure 5A:
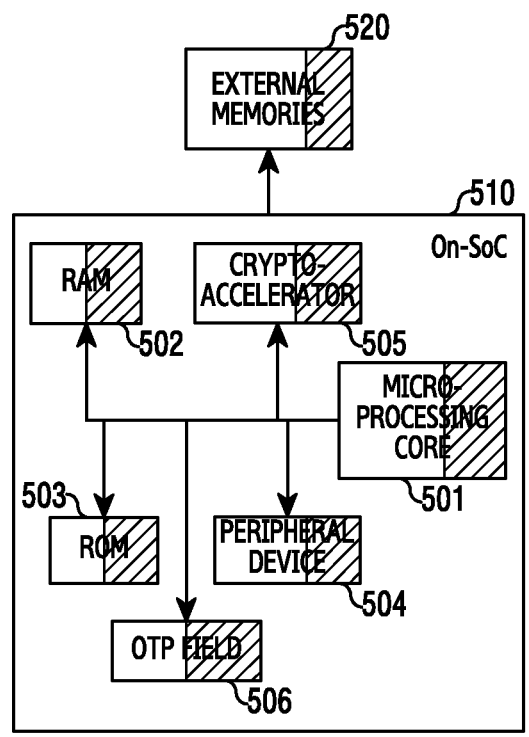
FIGS. 5A to 5C illustrate block diagrams of hardware structures of a trusted execution environment (TEE) according to various embodiments of the present disclosure.
Figure 5B:
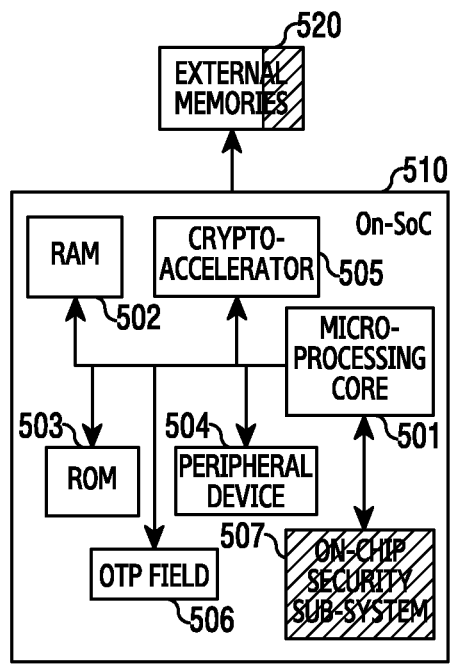
Figure 5C:
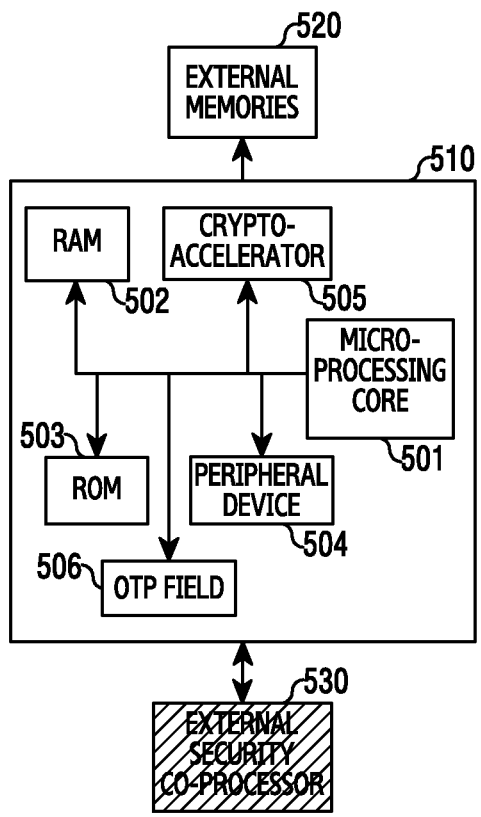

FIGS. 5A to 5C illustrate block diagrams of hardware structures of a TEE according to various embodiments of the present disclosure.

FIG. 5A illustrates an example (e.g., a trustzone (TZ) of ARM) of using one processor (e.g., the processor 120) and one memory (e.g., memory 130) in a manner of dividing them into the REE 410 and the TEE 420 in view of hardware.

Referring to FIG. 5A, the hardware structure of the TEE 420 may include an On-SoC 510 and an external memory 520. The On-SoC 510 may include, for example, a micro-processing core 501, a RAM 502, a ROM 503, a peripheral device 504, a crypto-accelerator 505, or a one time programmable (OTP) field 506. In order to operate two or more execution environments, the trust zone may temporally divide the processors to separately use the REE 410 and the TEE 420. Further, the trust zone may divide one memory into an area accessible in the REE 410 and an area accessible in the TEE 420 and separately use the areas. Therefore, the micro-processing core 501, the RANI 502, the ROM 503, the peripheral device 504, the crypto-accelerator 505, and the OTP field 506 may be divided, in use, into an REE area and a TEE area.

FIG. 5B illustrates a case where a processor (e.g., the processor 120) for the TEE 420 is implemented together with a processor for operating the REE 410 in the form of on-chip but is implemented in a separate processing core set. The processor for the TEE 420 according to various embodiments may have a configuration equal or similar to that of the above processor (e.g., the processor 120) due to the on-chip security sub-system 507 added thereto. Therefore, the following description omits description on the same elements as those of the above processor (e.g., the processor 120).

Referring to FIG. 5B, the On-SoC 510 may include an on-chip security sub-system 507 including at least one processor, in addition to a micro-processing core 501, a RAM 502, a ROM 503, a peripheral device 504, a crypto-accelerator 505, and an OTP field 506. In this case, the On-SoC 510 may be configured to operate the REE 410 while the on-chip security sub-system 507 is configured to operate the TEE 420. As in FIG. 5A, one memory may be divided in use into an area accessible in the REE 410 and an area accessible in the TEE 420 in the structure of FIG. 5B.

FIG. 5C illustrates an example in which a processor for the TEE 420 is implemented as a separate chip in view of hardware and is thus separated from a chip in which a processor for operating the REE 410 is implemented. The processor for the TEE 410 according to various embodiments may have a configuration equal or similar to that of the above processor (e.g., the processor 120) due to an external security co-processor 530 added thereto. Therefore, the following description omits description on the same elements as those of the above processor (e.g., the processor 120).

Referring to FIG. 5C, the On-SoC 510 may be configured to operate the REE 410 and one or more external security co-processors 530 disposed outside of the On-SoC 510 may be configured to operate the TEE 420.

Figure 6:
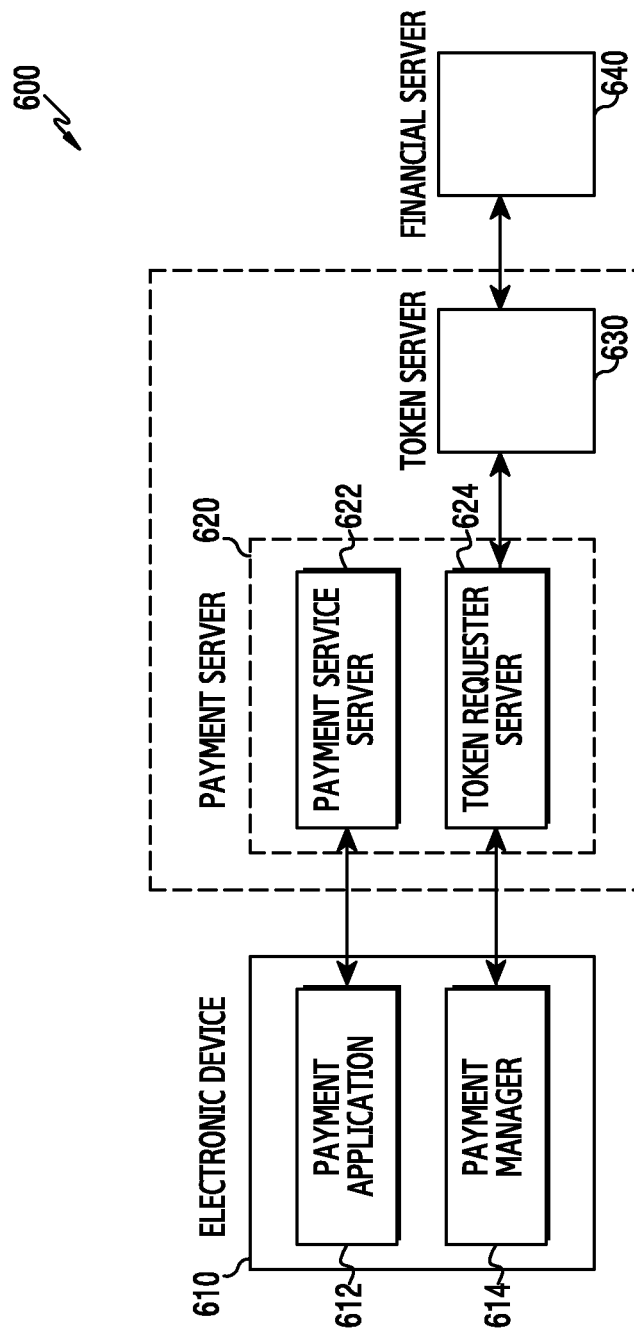
FIG. 6 is a block diagram illustrating a payment system according to various embodiments of the present disclosure.

FIG. 6 is a block diagram illustrating a payment system according to various embodiments of the present disclosure.

Referring to FIG. 6, a payment system 600 may include an electronic device 610 (e.g., the electronic device 101) and/or server. For example, the server may include a payment server 620, a token server (e.g., a token service provider (TSP)) 630, or a financial server (issuer) 640. The electronic device 610 may include, for example, a payment application (e.g., a wallet application) 612 and/or a payment manager 614. The payment server 620 may include, for example, a payment service server 622 and/or a token requester server 624.

According to various embodiments of the present disclosure, the payment application 612 may include a payment application 612 (e.g., Samsung Pay™ application). The payment application 612 may provide, for example, a UI or user experience (UX) related to payment. The user interface related to payment may include a wallet user interface (UI/UX). For example, the payment application 612 may provide, for example, a user interface related to card registration, payment, or transaction. The payment application 612 may provide, for example, an interface related to card registration through an external input (e.g., a user input) or a text reader (e.g., optical character reader/recognition (OCR)). Further, the payment application 612 may provide, for example, an interface related to user Identification through identification and verification (ID&V).

According to various embodiments of the present disclosure, the payment application 612 may perform payment transaction. For example, the payment application 612 may provide a user with a payment function through execution of Simple Pay, Quick Pay, or a designated application. Using the payment application 612, a user may perform a payment function and receive information associated with the payment function.

According to various embodiments of the present disclosure, the payment manager 614 may include information associated with a card company. For example, the payment manager 614 may include a card company software development kit (SDK).

According to various embodiments of the present disclosure, the payment server 620 may include a management server for electronic payment or mobile payment. The payment server 620 may, for example, receive information related to payment from the electronic device 610 and transmit the information to the outside or process the information in itself.

According to various embodiments of the present disclosure, the payment server 620 may transmit or receive information between the electronic device 610 and the token server 630, using the payment service server 622 and/or the token requester server 624. The payment service server 622 may include, for example, a payment server (e.g., a Samsung payment server) 620. The payment service server 622 may manage, for example, card information linked to a service account (e.g., a Samsung account) or user account. Further, the payment service server 622 may include an API server related to the payment application 612. Further, the payment service server 622 may provide, for example, an account management module (e.g., account integration or Samsung account integration).

According to various embodiments of the present disclosure, the token requester server 624 may provide an interface for processing information relating to payment. For example, the token requester server 624 may perform issuance, deletion, or activation of information (e.g., token) related to payment. In addition, the token requester server may be functionally connected to the payment manager 614 to control the information required for the payment.

According to various embodiments of the present disclosure, the payment application 612 included in the electronic device 610 and the payment service server 622 included in the payment server 620 may be functionally connected with each other. For example, the payment application 612 may transmit or receive information relating to payment to or from the payment server 620. According to various embodiments of the present disclosure, the payment manager 614 included in the electronic device 610 and the token requester server 624 included in the payment server 620 may be functionally connected with each other. For example, the payment manager 614 may transmit or receive information relating to payment to or from the token requester server 624.

According to various embodiments of the present disclosure, the token server 630 may issue or manage information (e.g., token) relating to payment. For example, the token server 630 may control the operation cycle (like cycle) of a token and the operation cycle may include a generation, revision, or deletion function. Further, the token server 630 may include, for example, a token management server and perform token provisioning, ID&V, replenishment, or life cycle management. Further, the token server may integrate information relating to the financial server.

According to various embodiments of the present disclosure, the payment server 620 and/or the token server 630 may be located in an identical area, similar areas, or separated areas. For example, the payment server 620 may be included in a first server while the token server 630 is included in a second server. Further, for example, the payment server 620 and/or the token server 630 may be distinguishably implemented in one server (e.g., the first server or the second server).

According to various embodiments of the present disclosure, the financial server 640 may perform issuance of a card. For example, the financial server 640 may include a card issuing bank. Further, the financial server 640 may generate information required for the payment provided to the user. The user may store, in the electronic device 610, the information required for the payment generated in the financial server 640, using the payment application 612. In addition, the financial server 640 may be functionally connected to the token server 630 to transmit or receive the information required for the payment.

Figure 7:
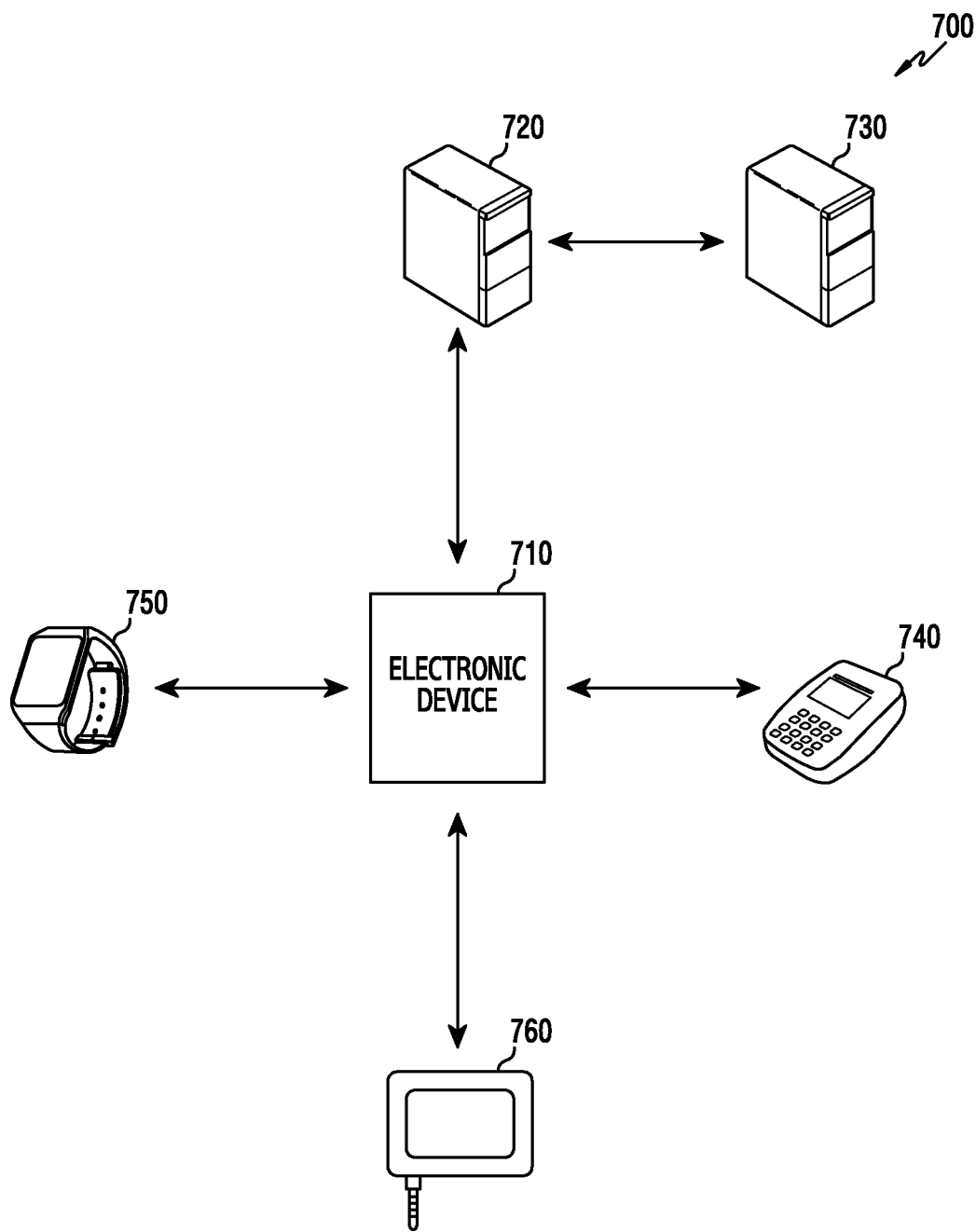
FIG. 7 is a block diagram illustrating a payment system for performing payment according to various embodiments of the present disclosure.

FIG. 7 is a block diagram illustrating a payment system for performing payment according to various embodiments of the present disclosure.

Referring to FIG. 7, a payment system 700 may include an electronic device 710 (e.g., the electronic device 101), a payment server 720 (e.g., the server 106), a token service provider (TSP) 730 (e.g., the server 106 or another server (not shown)), and a POS device 740 (e.g., the first external electronic device 102). According to an embodiment of the present disclosure, the payment system 700 may include one or more additional electronic device 750 or 760. The one or more additional electronic device 750 or 760 may include a wearable device 750 (e.g., a smart watch) or an accessory device 760 (e.g., a fob type device of the LoopPay™ company), which can be functionally connected with the electronic device 710. According to an embodiment of the present disclosure, the fob type device of the LoopPay™ company may include an external payment module connected to the electronic device 710 through a microphone.

According to an embodiment of the present disclosure, the electronic device 710 may perform a payment function. The electronic device 710 may register a card (e.g., a credit card, such as a master card or a visa card) in the electronic device 710 or the payment server 720 in order to perform the payment function. The payment server 720 may manage information on a plurality of registered cards including a card registered through another electronic device (e.g., the electronic device 750) of the user corresponding to the electronic device 710 or another card registered through an electronic device of another user as well as a card registered through the electronic device 710.

According to an embodiment of the present disclosure, the payment server 720 may acquire token information corresponding to registered card information from the TSP 730 and transfer the acquired information to the electronic device 710. The payment server 720 may include, for example, a payment service server or token requester server. The payment service server may manage card information of the user. The payment server may provide a service related to payment based on an account. The token requester server may request the TSP 730 to provide token information necessary for the payment operation and acquire the token information.

The TSP 730 may issue a token used in a payment process. According to an embodiment of the present disclosure, the token may have a value replacing a primary account number (PAN), which is information of a card. According to an embodiment of the present disclosure, a token may be generated using a bank identification number (BIN). Further, the generated token may be encrypted by the TSP 730, or may be encrypted by the payment server 729 after being sent to the payment server 729 without being encrypted. The encrypted token information may be transferred to the electronic device 710 through the payment server 720 and decrypted by the electronic device 710. According to an embodiment of the present disclosure, the token may be generated and encrypted in the TSP 730 and may be transferred to the electronic device 710 without passing through the payment server 720. According to another embodiment of the present disclosure, the payment server 720 may include a token generation function. In this instance, the payment system may omit a separate TSP 730.

The electronic device 710 may perform payment using, for example, at least one electronic device among one or more other electronic devices 750 or 760 functionally connected thereto based on a short range communication (e.g., Bluetooth or WiFi). According to an embodiment of the present disclosure, the at least one electronic device 750 may be a wearable device (e.g., a smart watch) and, in this instance, the electronic device 710 may transmit the token received from the TSP 730 to the wearable device. According to an embodiment of the present disclosure, the at least one electronic device 760 may be an accessory device (e.g., a fob type device of the LoopPay™ company) and, in this instance, the electronic device 710 may be functionally connected with the accessory device (e.g., a fob type device of the LoopPay™ company) through its input/output interface 150 (e.g., the earphone 286).

Figure 8:
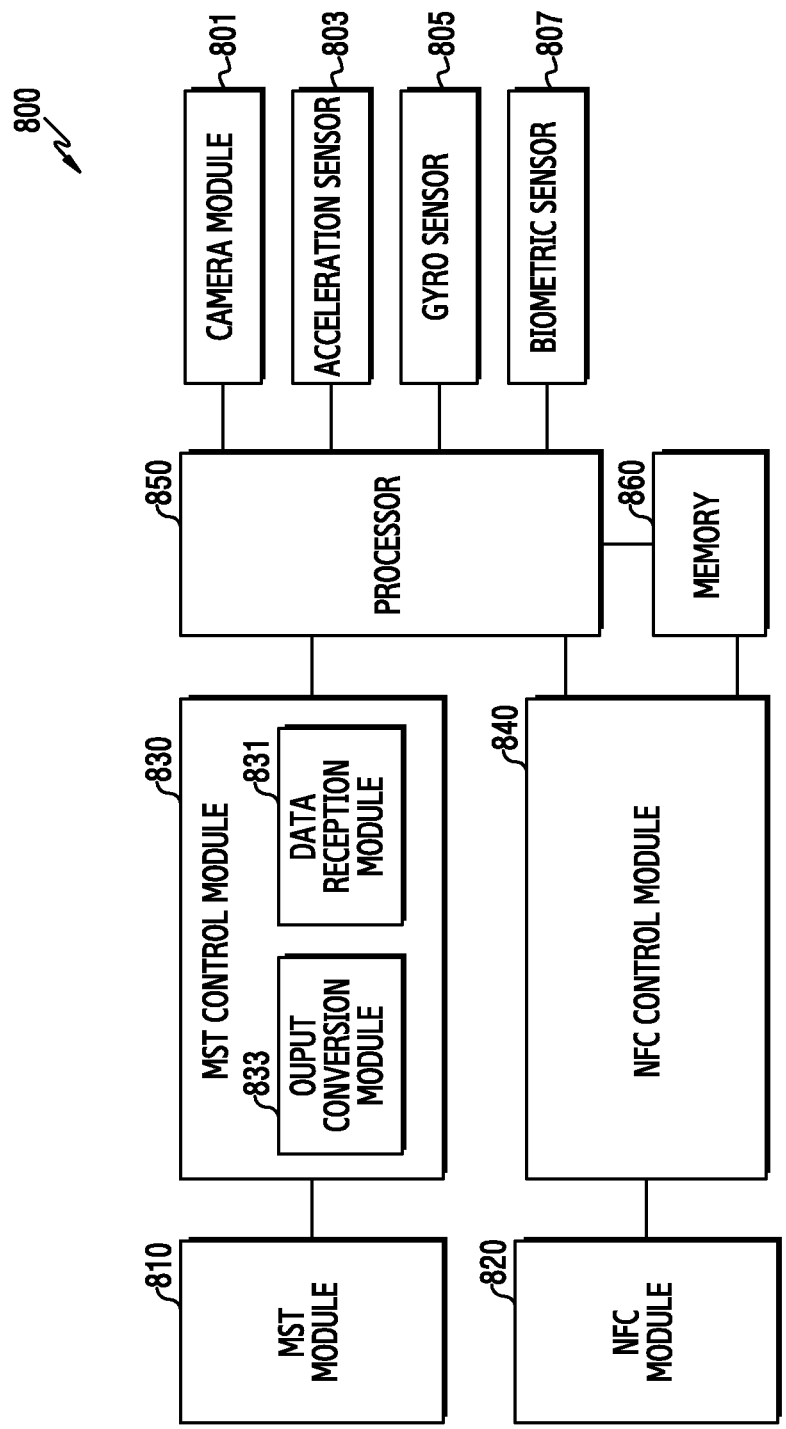
FIG. 8 is a block diagram illustrating a hardware structure of an electronic device according to various embodiments of the present disclosure.

FIG. 8 is a block diagram illustrating a hardware structure of an electronic device according to various embodiments of the present disclosure.

Referring to FIG. 8, an electronic device 800 (e.g., the electronic device 101 or 710) may include, for example, a camera module 801, an acceleration sensor 803, a gyro sensor 805, a biometric sensor 807, an MST module 810, an NFC module 820, an MST control module 830, an NFC control module 840, a processor 850, and a memory 860.

The camera module 801 may photograph a card required for payment to acquire card information. The camera module 801 may recognize, through an optical character reader (OCR) function, card information (e.g., card company, card number, card expiration date, or card owner) recorded in the card. Otherwise, a user may input necessary card information to the electronic device 800, using an input device (e.g., a touch panel, a pen sensor, a key, an ultrasonic input device, or a microphone input device) included in the electronic device 800.

The acceleration sensor 803 or gyro sensor 805 may acquire location state of the electronic device 800 at the time of payment. The acquired location state of the electronic device 800 may be transferred to the processor 850. The processor 850 may adjust the intensity (current intensity) of a magnetic field transmitted to the POS device 740 from one of the MST module 810 or the NFC module 820 based on the acquired location state of the electronic device 800 or select a coil antenna to be used when there are a plurality of coil antennas.

The biometric sensor 807 may acquire biometric information. The acquired biometric information may be transferred to the processor 850. The processor 850 may authenticate a user by comparing the acquired biometric information and pre-stored biometric information of the user.

At least one of the MST control module 830 and the NFC control module 840 may transmit payment information. The MST control module 830 may transmit payment information to a POS device 740 through the MST module 810. The NST control module 840 may transmit payment information to the POS device 740 through the NST module 820.

According to an embodiment of the present disclosure, the MST control module 830 may include a data reception module 831 and an output conversion module 833. The data reception module 831 may receive a pulse signal in the form of logical low/high, which includes payment information transmitted from the processor 850 or the security module 236 (e.g., an eSE). The output conversion module 833 may include a circuit for converting data recognized by the data reception module 831 into necessary types in order to transfer the data to the MST module 810. The circuit may include an H-Bridge for controlling the direction of the voltage supplied to opposite ends of the MST module 810. The H-Bridge may include a circuit structure connected in a shape like H using four switch structures.

According to an embodiment of the present disclosure, based on the card information input through the camera module 801 or an input device (e.g., a touch panel or a pen sensor), the electronic device 800 may receive the payment information (e.g., track 1/2/3 or token information) included in the magnetic stripe of a magnetic card from a card company/bank server through a communication module (not shown) and store the received information in a necessary form in a separate security module 236 (e.g., an eSE).

Figure 9:
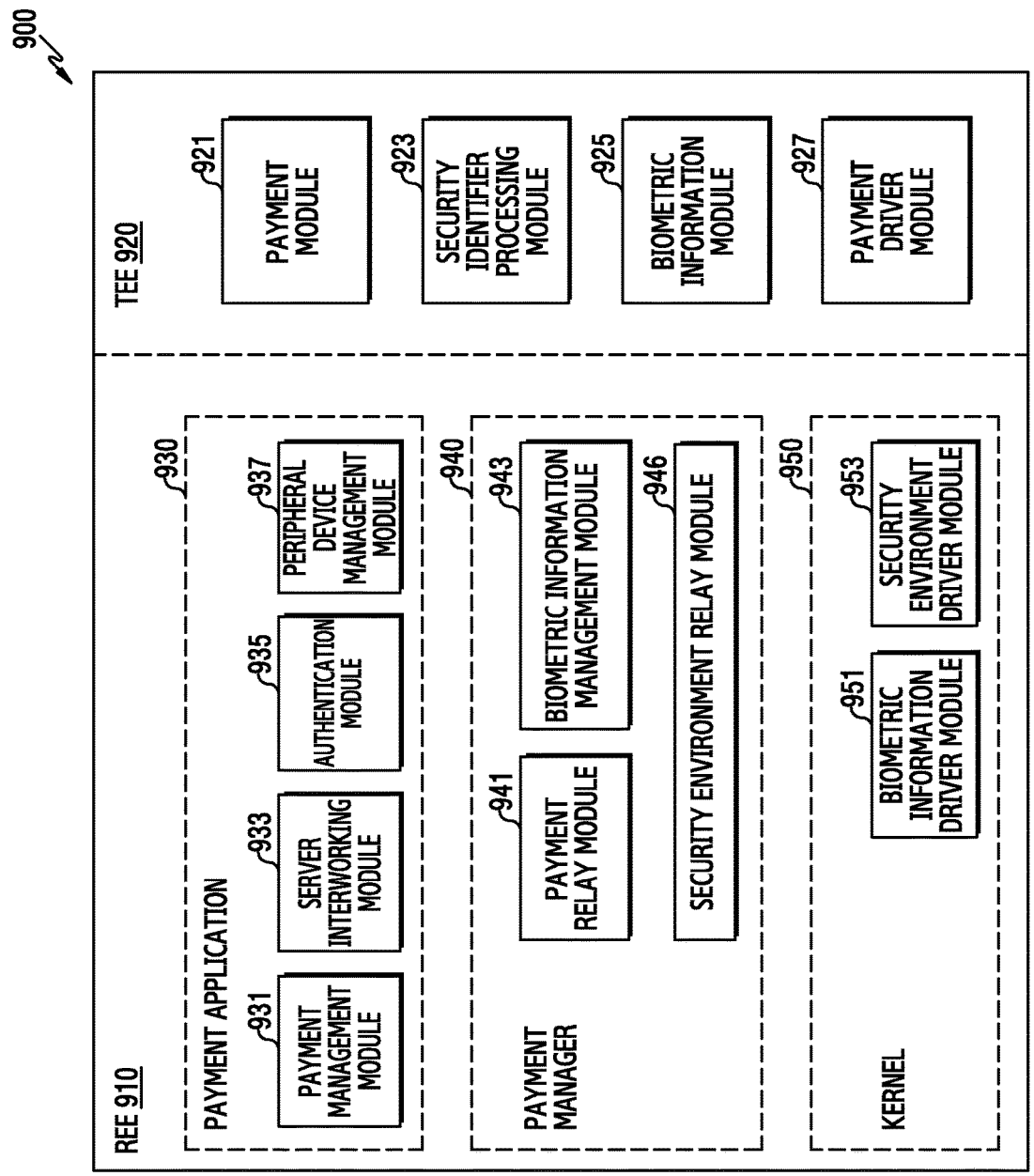
FIG. 9 is a block diagram illustrating a program module to be executed in an execution environment of an electronic device according to various embodiments of the present disclosure.

FIG. 9 is a block diagram illustrating a program module to be executed in an execution environment of an electronic device according to various embodiments of the present disclosure.

Referring to FIG. 9, a program module 900 may include, for example, an REE 910 and a TEE 920.

According to an embodiment of the present disclosure, the REE 910 may include, for example, a payment application 930 (e.g., the payment application 612), a payment manager 940 (e.g., the payment manager 354 or 614), and a kernel 950 (e.g., the kernel 320).

According to an embodiment of the present disclosure, the payment application 930 may include, for example, a payment management module 931, a server inter-working module 933, an authentication module 935, and a peripheral device management module 937.

According to an embodiment of the present disclosure, the payment management module 931 may perform operations for card registration, card authentication, card de-registration, and payment. The payment management module 931 may register a user's card. The electronic device 800 may receive a card registration request from a user. The electronic device 800 may acquire a card image, using the camera module 801. The payment management module 931 may acquire a card image through an OCR module. The payment management module 931 may receive a user's input of information (e.g., a secret code, a home address, an e-mail address, a phone number, an account ID, and the like) associated with the card information or acquire the information from the payment server 720.

According to an embodiment of the present disclosure, the payment management module 931 may display a registered card to the user through the display 160. The user may revise at least a part of the information (e.g., a card name, a home address, a phone number, the number of times of payment trials, or information on whether payment notification information has been received or not) of the registered card. The payment management module 931 may display transaction details of each card. The payment management module 931 may display the registered card information in a wearable device (e.g., a smart watch) functionally connected to the electronic device.

According to an embodiment of the present disclosure, the payment management module 931 may perform a payment operation using a registered card. The user may select one card among a plurality of registered card. The user may take the electronic device 800 to the POS device 740. The payment management module 931 may display product information (e.g., price) received from the POS device 740 through the display 160. The payment management module 931 may perform user authentication (e.g., fingerprint authentication) through the authentication module 935 for payment. When the authentication has been completed, the payment management module 931 may display notification information reporting completion of payment through the display 160.

According to an embodiment of the present disclosure, the electronic device 800 may transmit payment information to the POS device 740, using at least one module among the MST module 810 and the NFC module 820. In order to raise the recognition rate, the electronic device 800 may transmit the payment information to the POS device 740, simultaneously using the MST module 810 and the NFC module 820. Otherwise, the electronic 800 may use the MST module 810 in transmission and may use the NFC module 820 in the transmission when the payment has failed. A method of recognizing a case wherein the payment has failed may include reception, by the electronic device 800, of a notification from the POS device 740 or a $3^{rd}$ party (e.g., financial institution) or lapse of a certain time. Various embodiments are not limited to the sequence described above and allows an opposite sequence.

According to an embodiment of the present disclosure, an electronic device 800 may receive a request for removal of at least one card among already registered cards from a user. The payment management module 931 may delete information corresponding to the at least one card from the memory 860. The payment management module 931 may request the payment server 720 to delete the information corresponding to the at least one card.

According to an embodiment of the present disclosure, the payment management module 931 may determine whether the owner of the card is identical to the user performing the card registration. The payment management module 931 may include, for example, an ID&V module. The payment management module 931 may perform user authentication through text messages, an e-mail, an automatic route selection (ARS), a phone call, and the like. Further, the authentication may be performed through an application issued by a card company or bank. The card registered through the payment management module 931 may be used after being authenticated.

According to an embodiment of the present disclosure, the payment management module 931 may include an OCR module. The OCR module may acquire, through a scanner, an image of a letter written by a human or printed by a machine and convert the image to a machine-readable letter. The electronic device 800 may acquire an image of a card possessed by a user, through a camera module 801. The OCR module may convert an image, a letter, or a number written in a card, obtained from a card image, to a machine-readable letter. The OCR module may acquire card information (e.g., card number, user name, or valid period) of the user from converted letters. The electronic device 800 may acquire the card information of the user through the OCR module and perform a card registration process.

According to an embodiment of the present disclosure, the payment management module 931 may display a bar code generated for payment through the display 160. For example, the payment management module 931 may receive a command indicating generation of a bar code for payment through a bar code reader. The payment management module 931 may generate a bar code based on the command.

According to an embodiment of the present disclosure, the server interworking module 933 may receive a payment-related message, a device-related message, or a service-related message from the payment server 720 or the TSP 730. The server interworking 933 may transfer the message to the payment management module 931.

According to an embodiment of the present disclosure, the server interworking module 933 may include, for example, a push management module and an account management module. For example, a message received from the payment server 720 may be processed by the push management module when the message is in the form of a push notification associated with a token, and may be processed by the account management module when the message relates to account-related information (e.g., Samsung account).

According to an embodiment of the present disclosure, the push management module may calculate or handle the push notification or push message information received from the payment server 720. The push message may be transferred to the server interworking module 933 within the payment application 930 through a payment relay module 941 within the payment manager 940 or 354 or directly transferred to the payment application 930. At least some messages among transferred push messages may be transferred to the payment management module 931 to update card-related information and be synchronized with the payment server 720.

According to an embodiment of the present disclosure, the payment server 720 may include an account server for managing account-related information or a token requester server for providing payment-related information. The account server and the token requester server may be implemented as a separate device (e.g., the server 106) and may be included in a single device.

According to an embodiment of the present disclosure, the message information received by the push management module may include token and payment related information, such authority configuration (e.g., token provisioning), suspension (e.g., token suspension), disposal (e.g., token disposal), state change (e.g., token status change), additional issuance (e.g., token replenishment), and payment identification (e.g., transaction notification), as shown in Table 1 below.

The messages transmitted/received by the account management module may include at least a part of electronic device-related information, a lost electronic device identification function (e.g., lost device, find my mobile), remote blocking (e.g., remote lock/unlock), membership management (e.g., loyalty/membership cards), a web-linked function (e.g., website portal-on-line).

According to an embodiment of the present disclosure, when token provisioning ID&V information acquired by the payment management module 931 is successfully transferred through the payment server 720 to an external server and the transferred token-related information is valid, the server interworking module 933 may receive, for example, a "push token {id} status changed" message and transfer the received message to the payment management module 931.

According to an embodiment of the present disclosure, in regard to card information temporal suspension information (e.g., token suspension) acquired by the payment management module 931 of the electronic device 800, a use stop command of the payment server 720 may be transferred to the payment application 930 to switch the card configuration state for mobile payment from the active state to the inactive state.

According to an embodiment of the present disclosure, when the electronic device 800 is lost, the payment server 720 may delete or temporarily stop all token information stored in the payment server 720. In order to synchronize this with the payment application 930, the payment server 720 may transmit a push message. The payment server 720 may transfer the push message to the payment application 930 through the payment management module 931 or the server interworking module (e.g., a Push management module or an account management module) 933.

Referring to Table 2, showing contents of push APIs supported by the electronic device 800 and the payment management module 931, the APIs may be distinguishably and separately implemented according to the payment management module 931.

TABLE 1

| Push management | Use case | details |
|---|---|---|
| Token | Token provisioning with ID & V | Card information for identification or verification is sent down for installation and authentication of a token from an external server to a push management module within an electronic device |
| | Token suspension | Transferred, for interruption of use of a token, from an external server to a push management module within an electronic device |
| | Token resume | Transferred from an external server to a push management module within an electronic device, for restart of use of a token |
| | Token disposal | Transferred from an external server to a push management module within an electronic device, for removal of a token |
| | Token status change | Transferred from an external server to a push management module within an electronic device, for card state change |
| | Token Replenishment | Transferred from an external server to a push management module within an electronic device, for additional issuance of a token |
| | Transaction Notification | Token payment details are transferred from an external server (payment server) to a push management module within an electronic device |
| Device | Lost Device (Find my mobile) | Transfer of loss history information between an external server (service server) and an account management module within an electronic device |
| | Remote lock/unlock | Transfer of a remote device blocking command between an external server (service server) and an account management module within an electronic device |
| | Loyalty/Membership cards | Transfer of membership information between an external server (service server) and an account management module within an electronic device |
| | Website (online) | Support of a Web-linked function between an external server (service server) and an account management module within an electronic device |

TABLE 2

| API | Description | type | validation |
|---|---|---|---|
| device.push | Contains push platform | Json | required |
| device.push.spp.id | Samsung Push Id. | String | required |
| device.push.gcm.id | Google Push Id. | String | optional |

According to an embodiment of the present disclosure, the account management module may manage, in the payment application, information including a user-specific identifier (e.g., a Samsung account ID or a device ID), card, or membership which the module exchanges with the payment server 720. The user identifier may include an account, which a user has joined in order to manage cards (e.g., VISA card or MASTER card) of various business providers, a portal account associated with an electronic device, or a unique identifier (e.g., a model name, a MAC address, an international mobile equipment identity (IMEI), a serial number, a universally unique ID (UUID), an ID, and the like) of an electronic device. In addition, the unique identifier may have a value which has been generated by and transferred from the payment server 720 through the account.

The account management module may manage registration, addition, deletion, repeated registration, use suspension, or use restart of a card, using the account of the user or the identifier of the electronic device 800. Moreover, in the case of transmitting (importing/exporting) card information between the electronic device 800 and a wearable device also, registration, addition, deletion, repeated registration, use suspension, or use restart of a card may be managed based on the generated account or an identifier of the electronic device 800. Here, a management method based on an account may manage a plurality of electronic devices 800 or a plurality of users sharing one account to use a unique account (e.g., a Samsung account) for each electronic device 800 or synthetically manage a plurality of electronic devices 800 by one account.

According to an embodiment of the present disclosure, information of a first card (e.g., VISA™ card) and a second card (e.g., MASTER™ card) generated through an OCR module of the payment management module 931 may be used to register the cards based on an account (e.g., registration02@samsung.com) generated at the time of joining the Samsung account. The registered information may be synchronized with the payment server 720 based on the generated account.

According to an embodiment of the present disclosure, membership information generated through a bar code interface may be used to register the first card (e.g., a Samsung point card) and the second card (e.g., a CJ membership point card) based on an account (e.g., registration01@samsung.com) generated at the time of joining the Samsung account. The registered information may be synchronized with the payment server 720 based on the generated account. Further, a user may determine the active/inactive states of a card based on an account after logging-in through the payment application and transfer the determination to the payment server 720 using the account management module, and on the contrary, may change the management of the card state based on an account in a server management web page (e.g., a server portal). Further, the account management module manage, while interworking with the server, the card information (e.g., VISA™ card ID&V) and membership information (e.g., membership points, registraion001@Cj.com) associated with a service account (e.g., registration01@samsung.com). The membership information may be automatically linked, at the time of card payment, to payment processing information (e.g., payment amount) and membership accumulation information (e.g., points or mileage) to automatically accumulate or subtract the points or mileage.

When an application including an account management module is installed, the configuration state of a part or all of an existing registered card may be continuously linked and used by only one time of an account login (or sign-in) process of a user even in any device. Further, even membership information having a relatively low authentication security level may be registered and linked based on an account of the user to reduce additional authentication processes.

According to an embodiment of the present disclosure, the authentication module 935 may display a UI for authentication of a user or a card for payment through the display 160. The authentication module 935 may include, for example, a biometric information module.

According to an embodiment of the present disclosure, the biometric information module may acquire biometric information of a user. The biometric information of a user may include, for example, information of, a fingerprint, an iris, a face image, voice, cardiac impulse, or blood pressure. The electronic device 800 may acquire biometric information of a user through a sensor module. For example, the electronic device may acquire fingerprint information of a user through a fingerprint sensor. Meanwhile, the electronic device 800 may acquire information of an iris of a user through the camera module 801. The biometric information module may display a UI for acquiring biometric information of a user through the display 160.

According to an embodiment of the present disclosure, when a user tries payment using card information registered in the electronic device 800, the biometric information module may perform an authentication in order to acquire security data (e.g., token) from a security memory (e.g., an eSE or memory accessible in a secure environment) functionally connected to the electronic device 800. The electronic device 800 may acquire biometric information (e.g., fingerprint or iris) of the user through the biometric information module for user authentication. The acquired biometric information may be transferred to the biometric information management module 943 of the payment manager 940. According to an embodiment of the present disclosure, the security memory may be a memory including data stored by encryption key.

According to an embodiment of the present disclosure, the biometric information module may proceed with payment, using card information and biometric information registered in the electronic device 800, when the user proceeds with electronic payment on an Internet web page. In order to acquire security data (e.g., token) from a memory or security module (e.g., an eSE or a memory accessible in a secure environment) functionally connected to the electronic device 800, the user may perform an authentication. When user authentication has successfully progressed in the electronic device 800, the electronic device is linked to an external server to enable fast automatic authentication (e.g., fast iDentity online (FIDO)) without electronic payment on a separate Internet web page. For example, instead of an authentication process required at the time of on-line payment, a fast authentication may be performed by liking to the biometric information module.

According to an embodiment of the present disclosure, the electronic device 800 may previously appoint a fingerprint of a user and a card to be used for payment. For example, when the user performs authentication using a fingerprint in the payment application, the user may appoint his or her right hand thumb to VISA™ card and his or her right hand index finger to MASTER™ card, so that payment through a corresponding card can be achieved as soon as the user performs authentication using a corresponding finger.

According to an embodiment of the present disclosure, the peripheral device management module 937 may manage an external device functionally connected to the electronic device 800. The peripheral device management application 937 may include, for example, an MST peripheral device module and a wearable device module.

According to an embodiment of the present disclosure, the MST peripheral device module may output information on whether an MST accessory (e.g., fob type device of LoopPay™) and the electronic device 800 are connected or not wirelessly or wiredly, and may provide a UI proper for the user on the basis thereof. The UI may progress and output card registration or deletion, or payment in a state where the MST accessory has been connected thereto. The MST peripheral device module may store various card information necessary for payment in the electronic device 800 or a separate memory within the MST accessory, in a state where the electronic device 800 is connected to the MST accessory. As a result, the electronic device 800 or MST accessory can independently progress the payment in a state where the MST accessory is not connected.

The wearable device module may output information on whether a wearable device (e.g., a watch, a headset, glasses, a ring, and the like) and the electronic device 800 are connected or not wirelessly or wiredly, and may provide a UI proper for the user on the basis thereof. The wired or wireless connection may include various interfaces, such as BT, BLE, WiFi, Zigbee, or Z-wave, and may be implemented by applying a particular accessory protocol (Samsung accessory protocol (SAP)). The UI may progress and output card registration or deletion, or payment in a state where the wearable device has been connected thereto. In the process of card registration, deletion, or payment, the wearable device module may output information on whether to generate a secure session with the wearable device, and transmit or receive and display a user input value on the electronic device 800 or wearable device. The input of the user may include various card information required for payment and other additional authentication information (e.g., personal identification number, user-specific pattern-related data, fingerprint recognition-related data, a touch input value of the display 160 or wearable device bezel unit).

According to an embodiment of the present disclosure, the electronic device 800 may share one piece of payment information with the wearable device or accessory. For example, information on one VISA™ card may be stored in both the wearable device and the electronic device 800. According to an embodiment of the present disclosure, the electronic device 800 may store different pieces of card information generated from one piece of card information in the wearable device and the accessory, respectively. For example, among different tokens issued from one piece of VISA™ card information, one token may be stored in the electronic device while the other token is stored in the accessory or wearable device. According to an embodiment of the present disclosure, when a different token issued from one piece of card information is stored in the electronic device while the other token is stored in the accessory or wearable device, if a payment module of one device is activated, a payment module of the other device may be deactivated. For example, among different tokens issued from one piece of VISA™ card information, if one token is stored in the electronic device 800 while the other token is stored in the accessory or wearable device, payment of the electronic device 800 may be deactivated when the payment is performed by the wearable device. In addition, when the payment is performed by the electronic device 800, payment by the wearable device may be deactivated.

According to an embodiment of the present disclosure, the payment manager 940 may include, for example, a payment relay module 941, a biometric information management module 943, and a security environment relay module 946. According to an embodiment of the present disclosure, the payment relay module 941 may relay a card or information (e.g., token) corresponding to the card to the payment application 930, the kernel 950, or the payment server 720. The payment relay module 941 may perform off-line payment through a communication module (e.g., an NFC module or an MST module). A payment method using the NFC module 820 can be operated through the POS device 740, and a payment method using the MST module 810 can be operated by a user input. Further, the payment relay module 941 may perform on-line payment through a communication module (e.g., a cellular module, an RF module, a Wi-Fi module, and the like).

According to an embodiment of the present disclosure, the payment relay module 941 may perform state management (e.g., card/token life cycle management) of a card or information (e.g., token) corresponding to the card. The payment relay module 941 may provide at least one API associated with payment to the payment application 930.

According to an embodiment of the present disclosure, the payment relay module 941 may further include at least one interface provided by system services associated with payment, and system service interfaces, which provide security UIs for a payment service for access to the payment module 921, trustzone-based integrity measurement architecture (TIMA) for kernel integrity authentication, fingerprint recognition result inquiry (e.g., supporting both the security and non-security mode), and a PIN or a PAN input. The payment relay module 941 may include an encryption library in order to transfer a message or command to the TEE 920. The payment relay module 941 may transmit or receive a message or command with the TEE 920 through the encryption library.

According to an embodiment of the present disclosure, the payment relay module 941 may include a card management function which provides addition, deletion, or update of a card, as a general card management function. The payment relay module 941 may include a first payment SDK or a second payment SDK. The first payment SDK (e.g., Samsung SDK) may be embedded in the electronic device 800. The second payment SDK may be provided by a card company or bank and may be installed in the electronic device 800. From the first payment SDK or second payment SDK, the payment relay module 941 may select a payment SDK corresponding to card information. Further, the payment relay module 941 may set a basic card or select another card other than the basic card.

According to an embodiment of the present disclosure, the payment relay module 941 may transmit messages, such as token provisioning, token replenishment, token suspension, token resume, and token disposal, as a general token and key management function, to the payment server 720.

According to an embodiment of the present disclosure, the payment module 921 may acquire a token and a token cryptogram from the electronic device 800 or another external electronic device. A key (e.g., a limited used key (LUK) or a single used key) capable of generating the token or token cryptogram may be stored in the REE 910 or TEE 920. Moreover, when the token and the key are stored in the REE 910, the payment module 921 of the TEE 920 may encrypt and store the token and key, using the key (e.g., a device root key (DRK)) of the TEE 920. When the electronic device 800 performs payment, the payment relay module 941 may acquire the encrypted token in a decrypted state through the payment module. When the token or key capable of generating the token cryptogram is stored in the TEE 920, the electronic device 800 may store the token or key in an encrypted form, using the key of the TEE 920.

According to an embodiment of the present disclosure, the payment relay module 941 may receive a push message from the TSP 730 and transfer the push message to the payment application.

According to an embodiment of the present disclosure, when the first payment SDK (provided by a card company or bank) provides a self-token management function, the payment relay module 941 may further include a function of relaying a token management function request to the second payment SDK when receiving the request. For example, the payment relay module 941 having acquired a token or key, using an SDK of VISA™ card, may transfer the token or key to the payment module 921 within the TEE 920, using a Samsung™ SDK. According to an embodiment of the present disclosure, the payment relay module 941 may further include, on a payment framework, a host card emulation (HCE) function which enables a virtual card to be used in the electronic device 800 by only software without a separate hardware device (e.g., a security module or a secure element (SE)) at the time of payment. The HCE function may transfer a token and a token cryptogram through a communication module (e.g., an NFC), using a message standard (e.g., application protocol data unit (APDU)) associated with the POS 740.

According to an embodiment of the present disclosure, the payment relay module 941 may include a function of processing a message received from the POS device 740. The POS-related message processing function may include a function of managing payment data to be sent to the POS device 740 as a response. The POS-related message analysis function may include a function of, when the first payment SDK provides a self POS-related message processing function, relaying the POS-related message to the first payment SDK. According to an embodiment of the present disclosure, the payment relay module 941 may include at least one database for storing the card data, token data, or transaction data.

According to an embodiment of the present disclosure, the payment relay module 941 may select at least one method among a method using NFC and a method using MST. For example, the methods may include a method of first performing payment using NFC and performing payment using MST, a method of first performing payment using MST and performing payment using NFC, and a method of performing payment simultaneously using NFC and MST. According to an embodiment of the present disclosure, in the case of first performing payment through one communication module and performing payment through another communication module, the payment relay module 941 may perform payment through the another communication module when there is no response to a result of payment performance from the communication module having first performed the payment or after passage of a certain time.

According to an embodiment of the present disclosure, in the case of having both token information and PAN information for one card, the payment relay module 941 may use at least one of them for payment. The payment relay module 941 may determine whether the POS device 740 can perform payment using PAN or using a token. For example, the electronic device 800 may receive payable information through a back light unit (BLE), and the payment relay module 941 may identify the information. Based on the identified information, the payment relay module 941 may perform the payment using a toke when the token is available for the payment and using PAN when the PAN is available for the payment.

According to an embodiment of the present disclosure, the payment relay module 941 may further include an SDK provided by a payment network. The SDK may further include token management, POS-related message processing, or token/card databases.

According to an embodiment of the present disclosure, the security environment relay module 946 may further include a function enabling a payment application to access a biometric information driver module 951 or a security environment driver module 953 in order to use functions provided by the payment module 921 or a biometric information module 925. The payment relay module 941 may include an encryption library in order to transfer a message or command to the security environment relay module 946. The payment relay module 941 may transmit or receive a message or command with the security environment relay module 946 through the encryption library.

Various embodiments of the present disclosure may further include a security environment relay module 946 connected to enable the payment application 930 to use functions of the security identifier processing module 923 of the TEE 920, in the payment manager 940. According to an embodiment of the present disclosure, the payment relay module 941 may include a function of relaying an authentication request through a PIN input by the payment application 930 to the security identifier processing module 923 of the TEE 920. When there is a request for fingerprint recognition, a general application may acquire information on whether the recognition is success or failure. The security payment application (e.g., a payment trusted app) may acquire a security biometric result (e.g., a secure fingerprint result). The security biometric result may have a form encrypted by combining a disposable random number and information of success/failure. The disposable random number may be encrypted through a hardware key (e.g., a DRK) of the TEE 920.

According to an embodiment of the present disclosure, the payment relay module 941 may transfer a message requiring execution of payment to the payment module 921 through the security environment driver module 953 in order to perform payment. The payment module 921 may notify the payment relay module 941, through the security environment driver module 953, that an authentication operation is necessary. The payment relay module 941 may issue a command requiring the biometric sensor 807 to acquire biometric information through the biometric information management module 943 and the biometric information driver module 951. In addition, the payment relay module 941 may transfer an authentication identification message to the biometric information module 925 of the TEE 920 through the biometric information management module 943 and the security environment driver module 953. The biometric sensor 807 may be included in the biometric information module 925 of the TEE 920. The biometric information module 925 may identify a user's identity by comparing pre-stored biometric information of the user and information acquired by the biometric sensor. Based on the identified information, the biometric information module 925 may transfer success or failure of authentication to the biometric information management module 943 through the security environment driver module 953, and the biometric information management module 943 may transfer the received information to the payment relay module 941. The payment relay module 941 and the biometric information management module 943 may be configured to be integrated in a single construction or configured as separate modules.

According to an embodiment of the present disclosure, the payment relay module 941 may perform an authentication through an external device. For example, the electronic device 800 may request the payment server (e.g., a Samsung account server or a token requester server) 720 to authenticate biometric information (e.g., fingerprint or iris). The payment server 720 may perform authentication of biometric information of a user and transfer a result of the authentication to the electronic device 800. When the authentication has been completed, the payment relay module 941 may perform a token provisioning process by transferring data including information that the authentication has been completed to the TSP. Further, according to a result of the authentication, the electronic device 800 may perform payment when the authentication is successfully completed, or may not perform payment when the authentication fails or is not completed.

According to an embodiment of the present disclosure, the kernel 950 may include, for example, the biometric information driver module 951 and the security environment driver module 953. The biometric information driver module 951 may transfer a message transferred from the biometric information management module 943 of the payment manager 940 to the biometric sensor 807. The biometric information obtained by the biometric sensor 807 may be transferred to the biometric information module 925 within the TEE 920 instead of being transferred to a module within the REE 910 through the biometric information driver module 951.

According to an embodiment of the present disclosure, the security environment driver module 953 may perform as an interface for transfer from a module in the REE 910 to a module in the TEE 920. For example, in the case of the trust zone of ARM corresponding to an embodiment of the TEE 920, the application processor time-divisionally performs operations of the REE 910 and the TEE 920. Here, a separate data path for transferring a message from the REE 910 to the TEE 920 may implemented by hardware. In this event, a driver module for accessing the hardware may be the security environment driver module 953. The security environment driver module 953 may transfer a message relating to an operation of a module in the TEE 920 to a module in the REE 910.

According to an embodiment of the present disclosure, the TEE 920 may include, for example, the payment module 921, the security identifier processing module 923, the biometric information module 925, and the payment driver module 927. The electronic device 800 may store data requiring a relatively high security and perform related operations in a safe environment through the TEE 920. The TEE 920 may operate on an application processor of the electronic device 800, and a reliable TEE 920 determined in the step of manufacturing an electronic device 800 may refer to a security area within the electronic device 800. The electronic device 800 may store data requiring a relatively high security and perform related operations based on a safe hardware structure through the TEE 920. The TEE 920 may enable the application processor and the memory area to operate in a state of being divided into a general area and a security area. Further, the TEE 920 may configure software or hardware requiring security, to operate in only the security area. When the REE 910 of an electronic device is required to perform an operation related to sensitive information, the electronic device may be allowed to access the TEE 920 only through an API and a driver capable of accessing the TEE 920. The TEE 920 may hand over limited data on related information to the REE 910. The TEE 920 may encrypt internally stored data through a hardware key (e.g., a DRK). Without a separate decryption process, the REE 910 may unable to interpret data within the TEE 920.

An application (e.g., a security application or a payment module) within the TEE 920 may transfer a message to another electronic device (e.g., the TSP 730) outside of the electronic device 800.

According to an embodiment of the present disclosure, the TEE 920 may include a trusted OS and a security application. In addition, the TEE 920 may include an encryption module related to the security, a driver capable of collecting data in hardware requiring security, and the like. The security application may include the payment module 921. In addition, the TEE 920 may transfer payment information to the outside through a communication module. For example, the TEE may transmit payment information to the POS device 740 by transferring the payment information to the MST module 810 through the MST control module 830 or transferring the payment information to the NFC module 820 through the NFC control module 840.

According to an embodiment of the present disclosure, the trusted application may determine whether the REE 910 has an integrity. The electronic device 800 may store, in the TEE 920, information on whether the REE 910 has an integrity. Booting of the REE 910 supporting the TEE 920 may follow a sequence in which a boot loader is first executed, the TEE 920 is booted, and the REE 910 is booted. When the TEE 920 has been booted, integrity information of the REE 910 is identified in the TEE 920, and the identified information may be notified to a user after the booting. According to an embodiment of the present disclosure, when the image of the REE 910 has been damaged due to hacking or rooting, it may be determined that the integrity of the REE 910 is problematic. When the integrity is problematic, the REE may be prohibited to access the TEE 920. For example, when the payment relay module 941 tries to transfer a message or command to the TEE 920 through the security environment driver module 953, the kernel 950 of the TEE 920 may disregard the message or command or deny to receive the message.

According to an embodiment of the present disclosure, the payment module 921 may be an application installed by a bank or card company (e.g., VISA™ card or MASTER™ card). There may be at least one payment module 921. When a user accesses, in the electronic device 800, the payment server (e.g., a mobile application platform, a payment gateway, a token requester, a TSP, a trusted service manager, a bank server, and the like) 720 or the token provider 730, using the payment management module 931, and approves to install the payment module 921, the TSP 730 may perform operations associated with the installation. For example, the payment management module 931 may acquire a card number and valid term information of a plastic card through OCR, and perform a card registration operation for installing the payment module 921 in the payment server 720. The payment management module may connect to the TSP 730 in the network through the payment relay module 941 having connection information of the TSP 730 according to each card/bank company to receive an installation file, and the payment relay module 941 may transfer the information to the TEE 920 to install the payment module 921. The process described above may be called a provisioning process or card registration process. There may be a plurality of payment modules 921 of the TEE 920. Each payment module 921 is unable to exchange data within the TEE 920 and may be configured in an isolated form.

According to an embodiment of the present disclosure, the payment module 921 may be an application to be used for data communication with the payment server 720. The payment module 921 may include information of a credit card, a debit card, a membership card, and the like. The payment module 921 may communicate with another external electronic device through encryption. The encryption process may be different according to the card manufacturing company having transferred the payment module 921. The payment server 720 may control the state of the payment module 921. For example, the payment server 720 may activate, temporarily suspend, resume, or delete (dispose) the payment module 921.

According to an embodiment of the present disclosure, the payment module 921 may store information related to the card information. For example, the stored information may include at least one among a token, a token reference ID, a part of a PAN, a PAN product ID, a token requester ID, a token assurance level, token assurance data, a valid term of a token, an encryption key, and a value (e.g., one time password (OTP)) provided by the TSP 730, which correspond to the card information (e.g., PAN). The token may be controlled by the state of the TSP 730. For example, the token may be activated, temporarily suspended, resumed, or deleted (disposed). The token may be static information basically corresponding to the card information (e.g., PAN).

According to an embodiment of the present disclosure, the payment module 921 may determine a card to be used for payment. For example, a payment module 921 corresponding to a card selected by the user in at least one payment management module 931 may be determined according to a user's selection. The payment management module 931 may transfer the determined card to the payment relay module 941. The payment relay module 941 may transfer the determined card information to the payment module 921 through the security environment driver module 953. The payment module 921 may manage a list of cards actually used in the payment among possessed cards. The payment module 921 may change the list of cards actually used in the payment, based on the determined card information. The changing may include a method of raising the priority of the determined card information in the card list or a method of deleting the other card information except for the determined card information.

According to an embodiment of the present disclosure, the payment module 921 may generate information used for the payment based on the information associated with the card information when the payment is executed. Referring to Table 3, the information used for the payment may include a token, a token reference ID, a part of a PAN, a PAN product ID, a token requester ID, a token assurance level, token assurance data, a valid term of a token, a token cryptogram, a POS entry mode, a token requester indicator, and the like.

TABLE 3

| Field Name | Comment |
| --- | --- |
| Payment Token | The Payment Token number refers to a surrogate value for a PAN that is a 13 to 19-digit numeric value that passes basic validation rules of an account number, including the Luhn check digit. Payment Tokens are generated within a BIN range or Card range that has been designated as a Token BIN Range and flagged accordingly in all appropriate BIN tables. Payment Tokens are generated such that they will not have the same value as or conflict with a real PAN. Transaction messages The Payment Token number will be passed through the authorization, capture, clearing, and exception messages in lieu of the PAN. The Payment Token number may optionally be passed from the Token Service Provider to the Card Issuer as part of the authorization request. |
| Token Expiry Date | The expiration date of the Payment Token that is generated by and maintained in the Token Vault. The Token Expiry Date field carries a 4-digit numeric value that is consistent with the ISO 8583 format. Transaction messages The Token Expiry Date is passed in lieu of PAN Expiry Date. The value is replaced by the Token Service Provider with the PAN Expiry Date which is then passed to the Card Issuer as part of the authorization request. |
| Last 4 Digits of PAN | The last four digits of the PAN to be provided optionally through the Acquirer to the Merchant for customer service usage, such as being printed on the consumer receipt. |
| PAN Product ID | The last four digits of the PAN to be provided optionally through the Acquirer to the Merchant for customer service usage, such as being printed on the consumer receipt. |
| PAN Product ID | The PAN Product ID is an optional identifier used for determining the type of Card product that was tokenized. It may be included in cases where transparency of this information is necessary. Transaction messages The PAN Product ID may optionally be passed from the Token Service Provider to the Acquirer as part of the authorization response. |

TABLE 3-continued

| Field Name | Comment |
| --- | --- |
| POS Entry Mode | This specification uses the POS Entry Mode field to indicate the mode through which the Payment Token is presented for payment. Each Payment Network will define and publish any new POS Entry Mode values as part of its existing message specifications and customer notification procedures. Transaction messages POS Entry Mode is an existing field that will be passed through the authorization, capture, clearing, and exception messages. |
| Token Requestor ID | This value uniquely identifies the pairing of Token Requestor with the Token Domain. Thus, if a given Token Requestor needs Tokens for multiple domains, it will have multiple Token Requestor IDs, one for each domain. It is an 11-digit numeric value assigned by the Token Service Provider and is unique within the Token Vault: Positions 1-3: Token Service Provider Code, unique to each Token Service Provider Positions 4-11: Assigned by the Token Service Provider for each requesting entity and Token Domain Transaction messages Token Requestor ID can be optionally passed through the authorization, capture, clearing, and exception messages. |
| Token Assurance Level | Token Assurance Level is a value that allows the Token Service Provider to indicate the confidence level of the Payment Token to PAN/Cardholder binding. It is determined as a result of the type of ID&V performed and the entity that performed it. The Token Assurance Level is set when issuing a Payment Token and may be updated if additional ID&V is performed. It is a two-digit value ranging from 00 which indicates the Payment Token has no ID&V that has been performed to a value of 99 indicating the highest possible assurance. The specific method to produce the value is defined by the Token Service Provider. Transaction messages Token Assurance Level will be provided by the Token Service Provider. The value may be optionally passed to the Card Issuer as part of the authorization request. The value may optionally be passed to the Acquirer/Merchant in the authorization response, capture, clearing, and exception processing messages. |
| Token Assurance Data | This data provided by the Token Service Provider contains supporting information for the Token Assurance Level. Transaction messages This data may be optionally passed to the Card Issuer as part of the authorization request. |
| Token Cryptogram | This cryptogram is uniquely generated by the Token Requester to validate authorized use of the Token. The cryptogram will be carried in different fields in the transaction message based on the type of transaction and associated use case: NFC contactless transactions will carry the Token Cryptogram in existing chip data fields. Other transactions, such as those originating from a digital wallet, may carry the Token Cryptogram in an existing field. Transaction messages The Token Cryptogram will be passed in the authorization request and validated by the Token Service Provider and/or the Card Issuer. |
| Token Request Indicator | An indicator used to indicate that the message is intended to authenticate the Cardholder during a Payment Token Request. |

According to an embodiment of the present disclosure, the payment module 921 may receive a key (e.g., a LUK or a single used key), by which a token cryptogram can be generated, through the TSP 730 or the payment server 720 (e.g., a payment service server or a token requester server). The key may be transferred and received through a data network or an SMS. The key may be exchanged using a security channel between the electronic device 800 and the TSP 730. The security channel may be a logical channel for encrypting data, which is exchanged by a separate key (e.g., a method using a public key or private key) different from the key described above. Moreover, the payment module 921 may include a module for generating a key capable of generating a token cryptogram. The electronic device 800 may receive the module for generating the key, through the TSP 730 or the payment server 720. Otherwise, the key may be included in the electronic device 800 in the stage of manufacturing the electronic device 800.

According to an embodiment of the present disclosure, the payment module 921 may generate a token cryptogram, using a key (e.g., a limited used key or a single used key) capable of generating the token cryptogram. The payment module 921 may use different keys according to a certain rule, for example, in each transaction, in a certain number of times of transaction, or a transaction within a particular time. The TSP 730 may possess a key paired with the above-described key. The TSP 730 may decrypt the encrypted token cryptogram through the paired key.

According to an embodiment of the present disclosure, the payment module 921 may generate a token cryptogram, using a key capable of generating the token cryptogram.

According to an embodiment of the present disclosure, when the payment is performed, the electronic device 800 may transfer a message reporting that the payment application will perform the payment, to the payment relay module 941. The payment relay module 941 may determine whether to use MST or NFC for the payment. In the case of using MST for the payment, the payment relay module 941 may acquire information (e.g., token, token cryptogram, a part of PAN information, token valid period, and the like) necessary for payment from the payment module 921 of the TEE 920 and transfer the information to the payment driver module 927 in the TEE 920. The payment driver module 927 may transfer the information to the payment controller. The MST module 810 may transmit the information in order to perform payment.

According to an embodiment of the present disclosure, when using the NFC for the payment, the electronic device 800 may transfer the information necessary for the payment to the payment driver module 927 of the TEE 920. The payment driver module 927 may transfer information required for performing the payment to the NFC module 820. The NFC module 820 may perform the payment based on the information.

According to an embodiment of the present disclosure, in the case of using the NFC for the payment, the electronic device 800 may perform the payment when receiving a certain message from the POS device 740. For example, when the NFC module 820 detects a certain message transferred from the POS device 740, the NFC module 820 may transfer the message to the payment driver module 927. The payment driver module 927 may transfer information that the message has been received from the POS device 740, to the payment relay module 941 of the REE 910. The payment relay module 941 may generate a token cryptogram in order to perform payment. The token cryptogram may be generated in the payment module 921 of the TEE 920, using a key (e.g., a limited used key or a single used key) capable of generating the token cryptogram. The generated token cryptogram may be transferred to the REE 910. The payment relay module 941 may transfer payment-related information including the token and token cryptogram through a network module (e.g., an NFC-related host card emulation module). The network module may transfer the payment-related information to the POS device 740 through the NFC module 820.

According to an embodiment of the present disclosure, the payment module 921 may transfer information including the token, token valid period, token requester ID, and token cryptogram to an external electronic device. For example, the payment module 921 may transfer the payment information to the POS device 740 through the MST communication module. Further, the payment module 921 may transfer the payment information to the POS device 740 through the NFC communication module 820.

According to an embodiment of the present disclosure, the payment module 921 may transmit or receive certain information to or from the POS device 740 in the payment operation. In the case of NFC, the POS device 740 may first receive the information to perform the payment. In the case of MST, payment-related information including the token and token cryptogram may be transmitted, based on an explicit input from a user or an internal algorithm of the electronic device 800, to the POS device 740.

According to an embodiment of the present disclosure, the biometric information module 925 may store biometric information of a user of the electronic device 800 and compare the biometric information with information obtained by the biometric sensor to authenticate the user. The biometric information module 925 may include a fingerprint information module or an iris information module. The biometric information module may collect information from the biometric sensor 807. When the payment application 930 shows, through the display 160, contents requiring authentication of the biometric information of the user, the user may transfer the biometric information through the biometric sensor 807. The authentication module 935 of the payment application 930 may transfer, through the biometric information management module 943, a message requiring collection of biometric information to the biometric information driver module 951. The biometric information driver module 951 may transfer the message to the biometric sensor 807. The biometric sensor 807 may collect biometric information and transfer the collected information to the TEE 920. The biometric information module 925 of the TEE 920 may compare the collected biometric information with the stored biometric information of the user to determine whether to authenticate the biometric information, and may transfer a result of the determination to the authentication module 935 of the payment application 930 through the security environment driver module 953 and the biometric information management module 943 of the REE 910. The payment application 930 may show, to the display 160, whether to authenticate. The biometric information of the user may be stored in the TEE 920, stored in the REE 910 in an encrypted state, or stored in the security module (e.g., an eSE) 236.

According to an embodiment of the present disclosure, the security identifier processing module 923 may acquire, through a user input, an input value, which is necessary for the electronic device 800 or is associated with payment or authentication. For example, the input value may be a personal identification number (PIN) during payment. In addition, the input value may include information related to the card. For example, the information may include a PAN, a card valid term (e.g., an expiration date), or card verification value (CVV). In addition, the information may include a Chip PIN or ATM PIN. The security identifier processing module 923 may be indicated in the form of an application. A graphic library necessary for illustration of the application of the security identifier processing module 923 on a screen may be stored in the TEE 920. The graphic library stored in the TEE 920 may be different from a graphic library in the REE 910. The security identifier processing module 923 may perform user authentication by an input value, such as a PIN, and may transfer a result of the authentication to the payment management module 931 through the payment relay module 941.

According to an embodiment of the present disclosure, the security identifier processing module 923 may receive an encrypted disposable random number (e.g., nonce) transferred through the security environment driver module 953 by the security environment relay module 946. The security identifier processing module 923 may encrypt the disposable random number and the input value acquired through the user input, using an encryption key (e.g., a device root key) in the TEE 920, and transfer them to the security environment relay module 946. The security environment relay module 946 may transfer the encrypted input value and disposable random number to the payment module 921 through the security environment driver module 953. The payment module 921 may decrypt the input value and disposable random number, using a hardware key in the TEE 920. The payment module 921 may identify that the input value transferred through the REE 910 has an integrity, based on the point that the generated value and the received value of the disposable random number are the same. The payment module 921 may perform user authentication through the input value, based on the point that the input value has an integrity. The payment module 921 may perform payment through user authentication.

According to an embodiment of the present disclosure, a factory reset refers to an operation of returning a software image of the electronic device 800 to the original state at the time when the electronic device is shipped from a factory. This operation may be performed as an explicit operation of a user through an application. Moreover, a module for determining and monitoring a hacking by a certain condition (e.g., when it is determined that the system has been hacked) may perform a factory reset. When the operation is performed, data stored in the electronic device 800 is reset and the payment-related information of the user also may be thus reset. The payment-related information may be stored in the payment server 720. When the user accesses the payment server 720 based on an account, the user may be allowed to perform operations of registering a card and installing a payment module 921 again based on the payment-related information. When the data is reset, the payment-related module stored in the electronic device 800 may notify the TSP 730 of the resetting through the payment server 720 to deactivate the TSP. When a network of the electronic device 800 has been deactivated, it may be impossible to perform the operation of notification. In this event, the electronic device 800 may perform the factory reset and access the account of the payment server 720 based on an account. The electronic device 800 may identify a list of pre-registered cards through the payment server 720, and may deactivate a card module or token of the electronic device 800 pre-registered in the TSP 730 through the payment server 720. In addition, based on the card list of the payment server 720, the electronic device 800 may perform card registration again and receive a payment module 921, token, and the like.

According to various embodiments of the present disclosure, the electronic device may include a processor and a memory configured to store a plurality of execution environments including a first execution environment and a second execution environment.

According to various embodiments of the present disclosure, the processor may be configured to generate a first authentication value, using a first application executed in the first execution environment, transmit the first authentication value from the first application through the second execution environment to a second application executed in the first execution environment, transmit, based on reception of the first authentication value, a second authentication value and a result of authentication of the user from the second application to the first application through the second execution environment, and perform, when the second authentication value corresponds to the first authentication value, payment based on the result of the authentication, using the first application.

According to various embodiments of the present disclosure, when the first authentication value and the second authentication value do not correspond to each other, the processor may not perform payment using the first application.

According to various embodiments of the present disclosure, the processor may acquire authentication information of the user, using the second application.

According to various embodiments of the present disclosure, the authentication information may include a PIN, user-specific pattern-related data, fingerprint recognition-related data, a touch input value, or combinations thereof.

According to various embodiments of the present disclosure, the processor may compare the authentication information with pre-stored authentication information and transmit a result of authentication based on a result of the comparison.

According to various embodiments of the present disclosure, the processor may encrypt a second authentication value corresponding to the first authentication value and the result of the authentication.

According to various embodiments of the present disclosure, the processor may decrypt the second authentication value and the result of the authentication, using a pre-stored key.

According to various embodiments of the present disclosure, the second execution environment may include a first trust zone functionally connected to the first application and a second trust zone functionally connected to the second application.

According to various embodiments of the present disclosure, the first trust zone may transmit the first authentication value to the second trust zone using the first application, and the second trust zone may transmit the result of the authentication to the first trust zone using the second application.

According to various embodiments of the present disclosure, the first execution environment may include a trusted execution environment and the second execution environment may include a rich execution environment.

FIGS. 10A to 10D illustrate payment UIs of an electronic device according to various embodiments of the present disclosure.

Figure 10A:
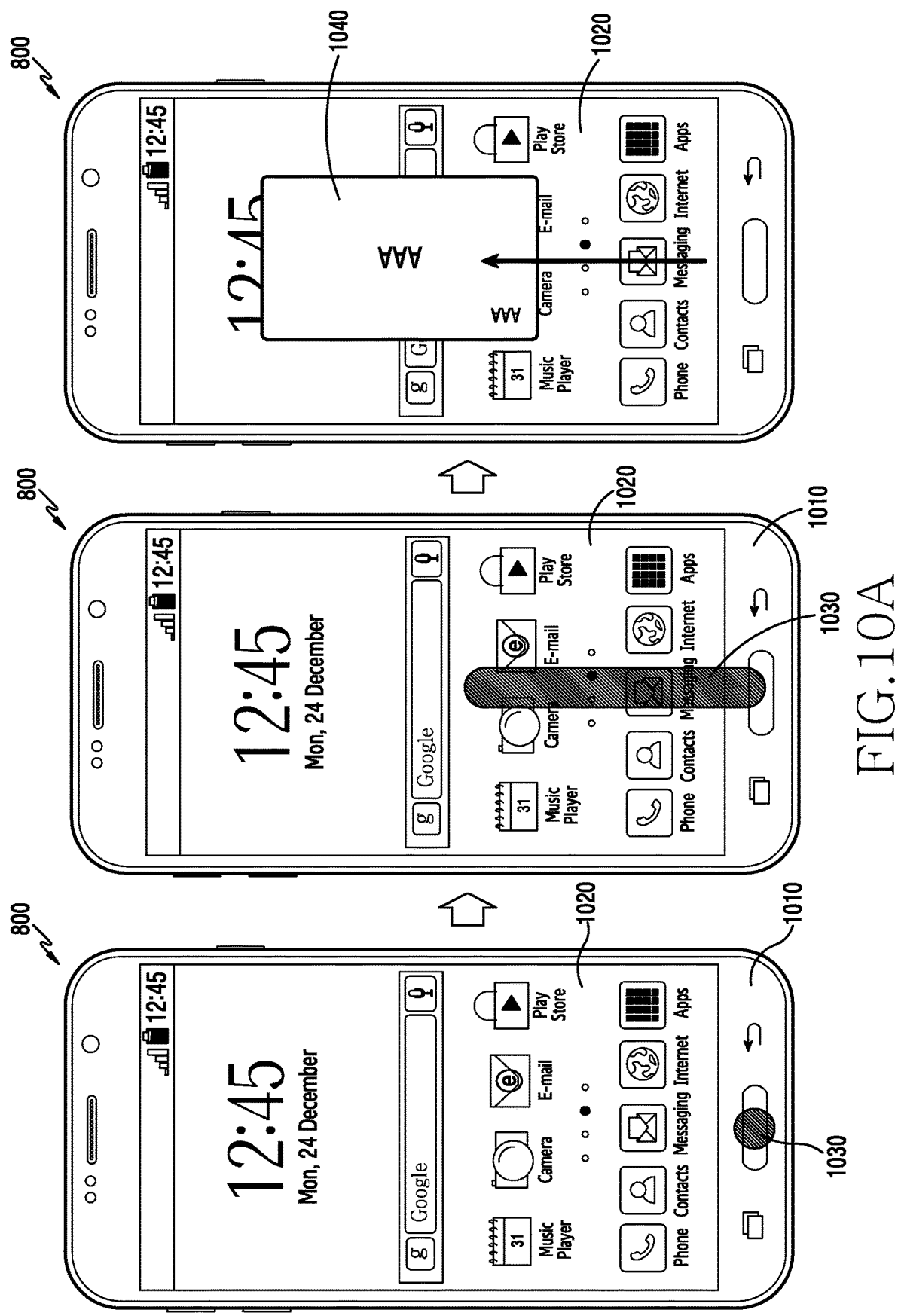
FIGS. 10A to 10D illustrate payment user interfaces (UIs) of an electronic device according to various embodiments of the present disclosure.

Referring to FIG. 10A, the electronic device 800 may receive a user input and execute a payment application. For example, the electronic device 800 may execute a payment application (e.g., Samsung Pay™) through a user input 1030 of sweeping in a direction toward a display 1020 from a bezel area 1010 at the lower end of the electronic device 800. In response to the user input 1030, the electronic device 800 may display at least one card 1040 among cards 1040 already registered in the electronic device 800, through the display 1020.

Figure 10B:
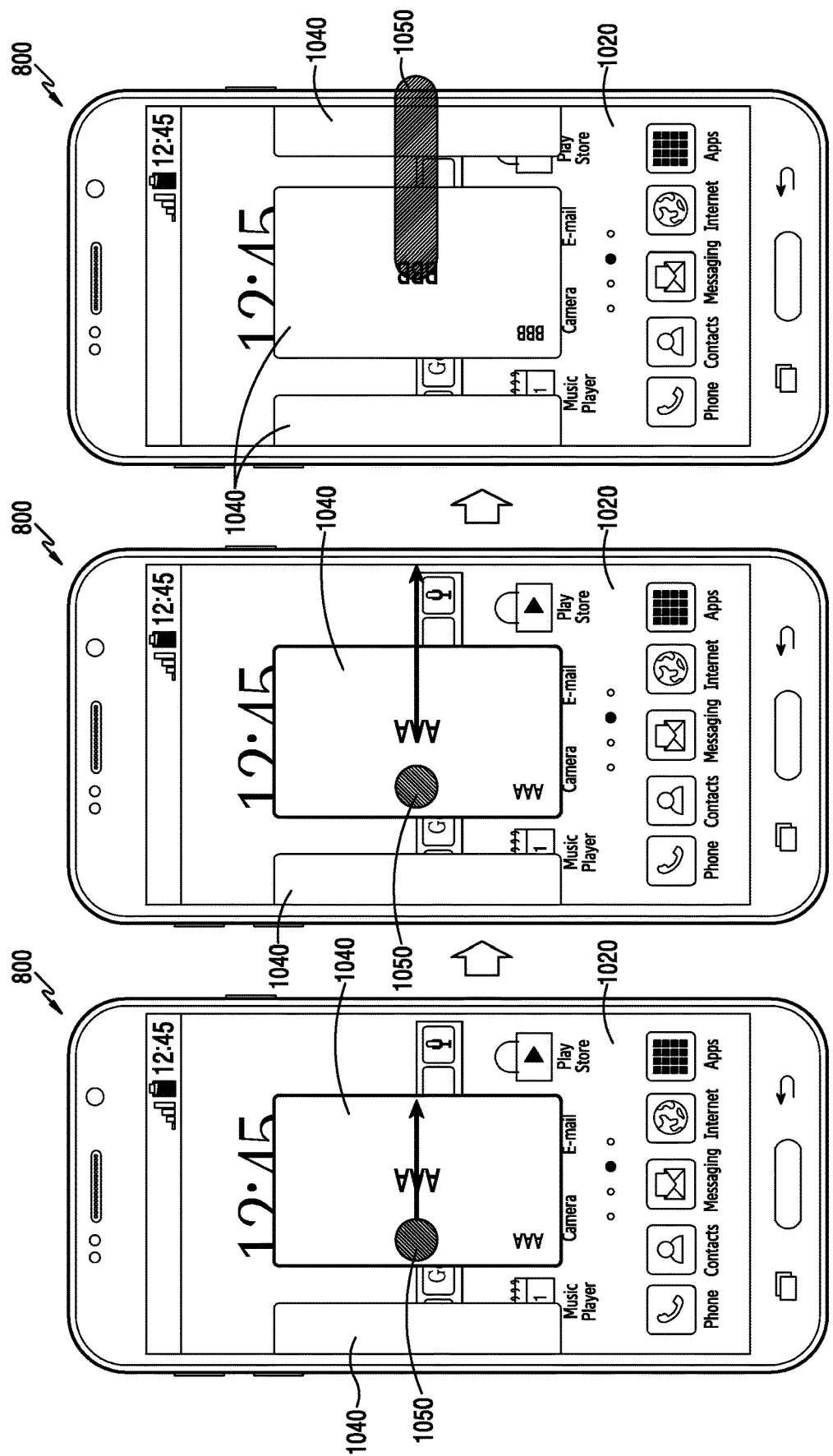

Referring to FIG. 10B, the electronic device 800 may receive a user input 1050 and select a card 1040 to be used for payment among the pre-registered cards 1040. For example, the electronic device 800 may select a card 1040 to be used for payment among the pre-registered cards 1040 through a user input 1050 of leftward/rightward scrolling. The electronic device 800 may request authentication from the user for payment of the selected card 1040. The authentication method may use, for example, biological information of a user.

Figure 10C:
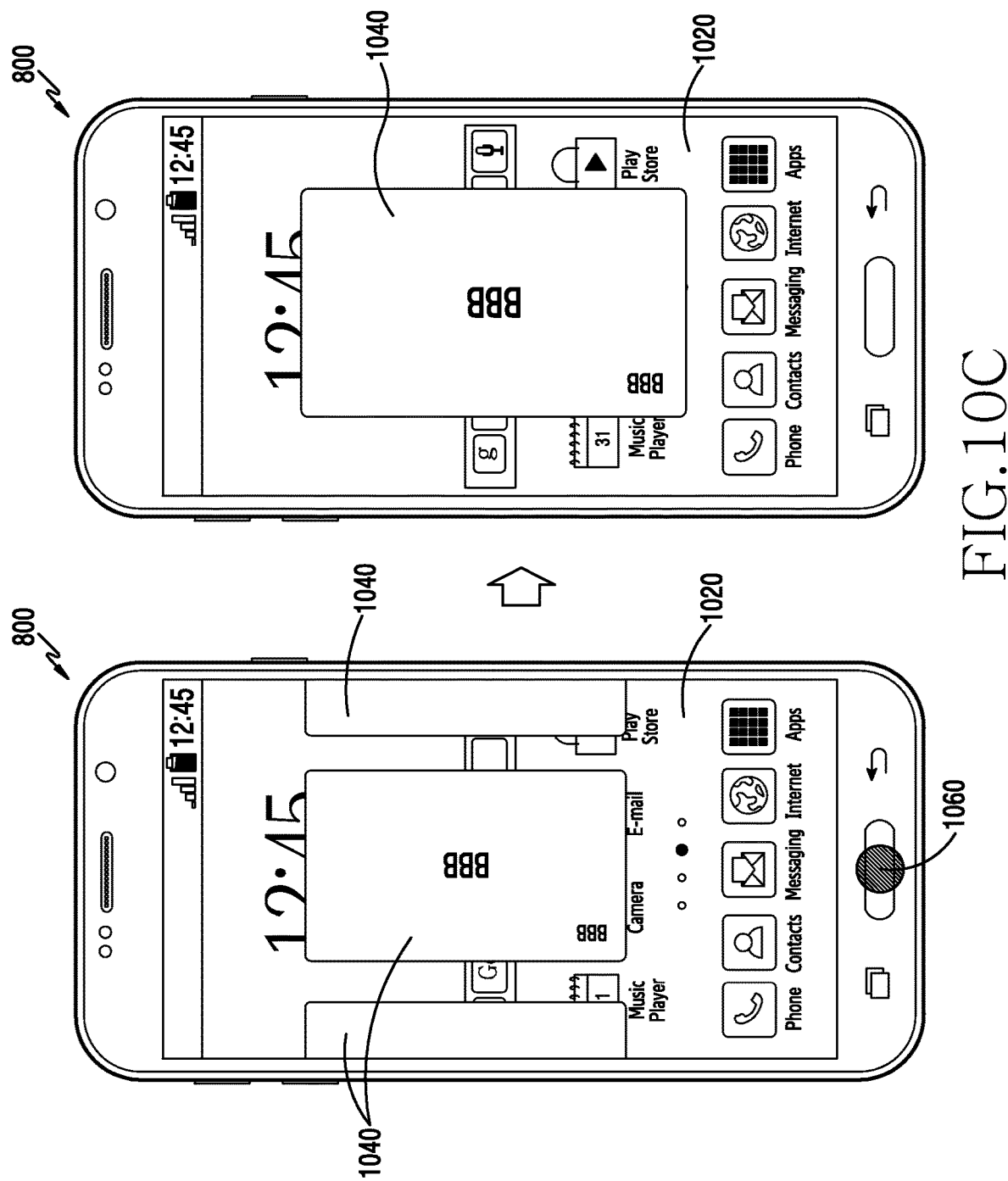

Referring to FIG. 10C, the electronic device 800 may scan a fingerprint of the user through the fingerprint detection module 1060 to perform a payment operation. For example, the electronic device 800 may scan a fingerprint of the user through the fingerprint detection module 1060 and wait for a payment operation. The electronic device 800 may enlarge a card 1040 selected in the display 1020 and wait for a payment operation.

Figure 10D:
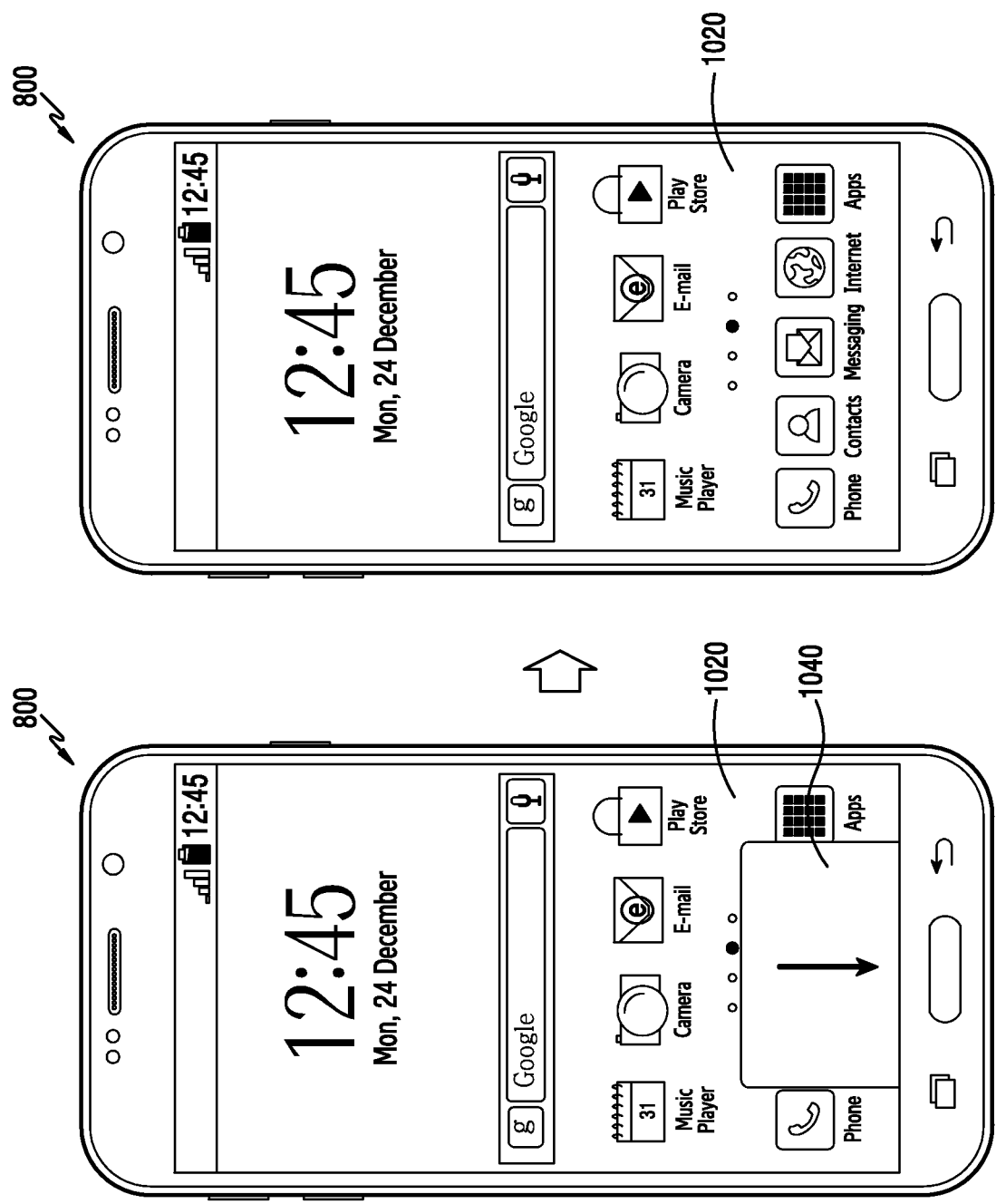

Referring to FIG. 10D, the electronic device 800 may terminate the payment application after completing the payment operation. For example, the electronic device 800 may remove the card 1040 from the display 1020.

Figure 11:
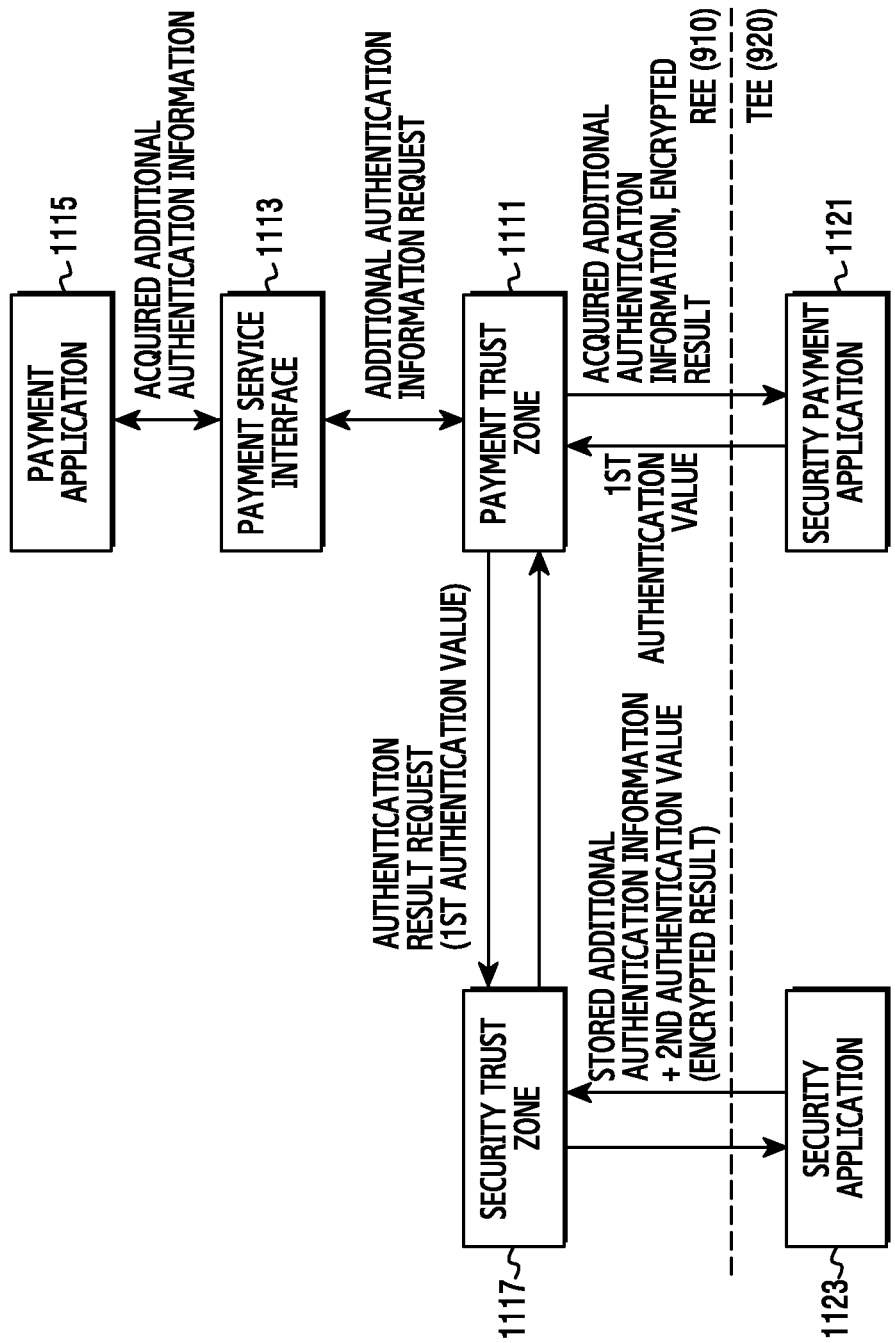
FIGS. 11 to 12B are block diagrams illustrating authentication functions of program modules in an electronic device according to various embodiments of the present disclosure.
Figure 12A:
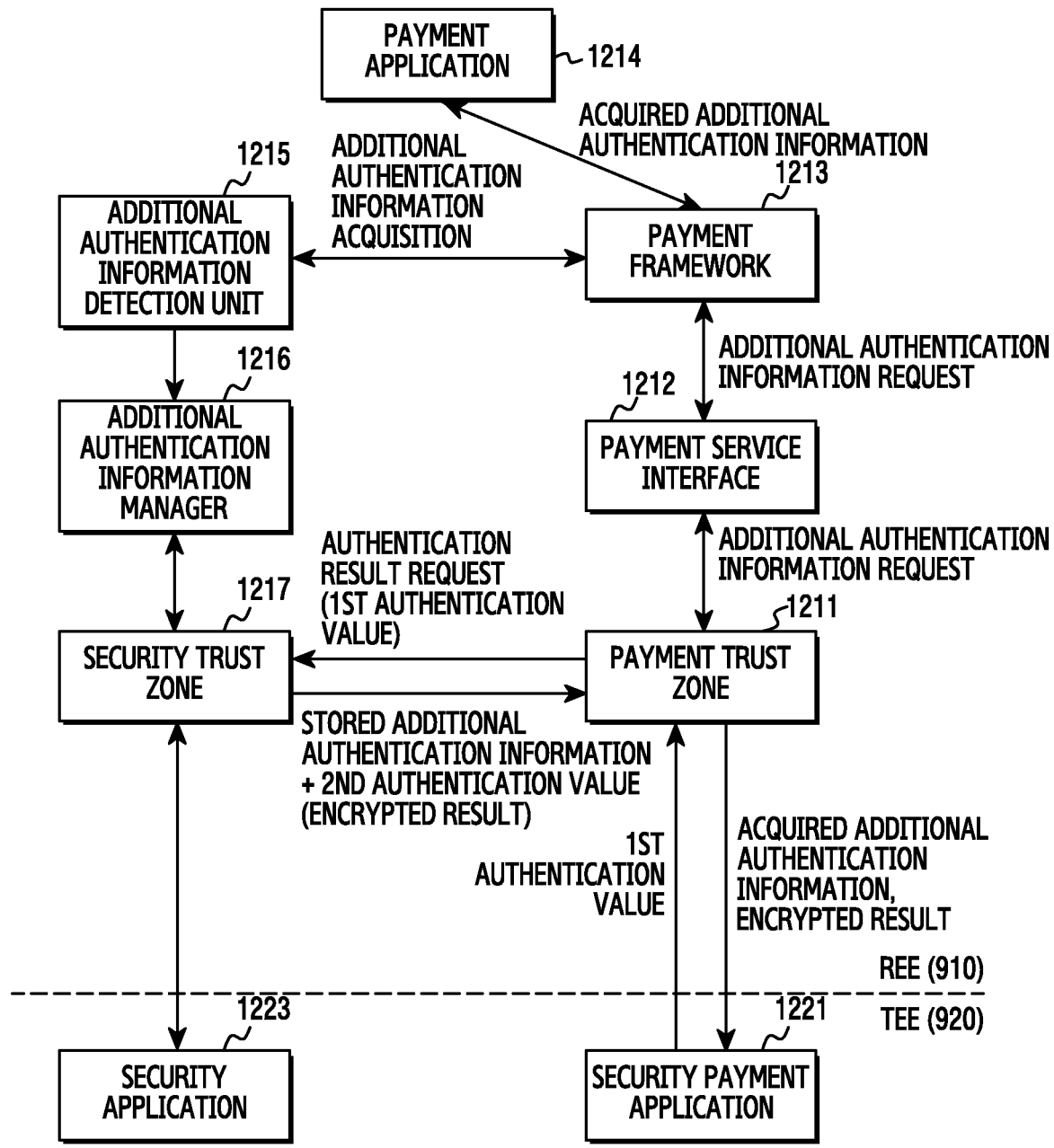
Figure 12B:
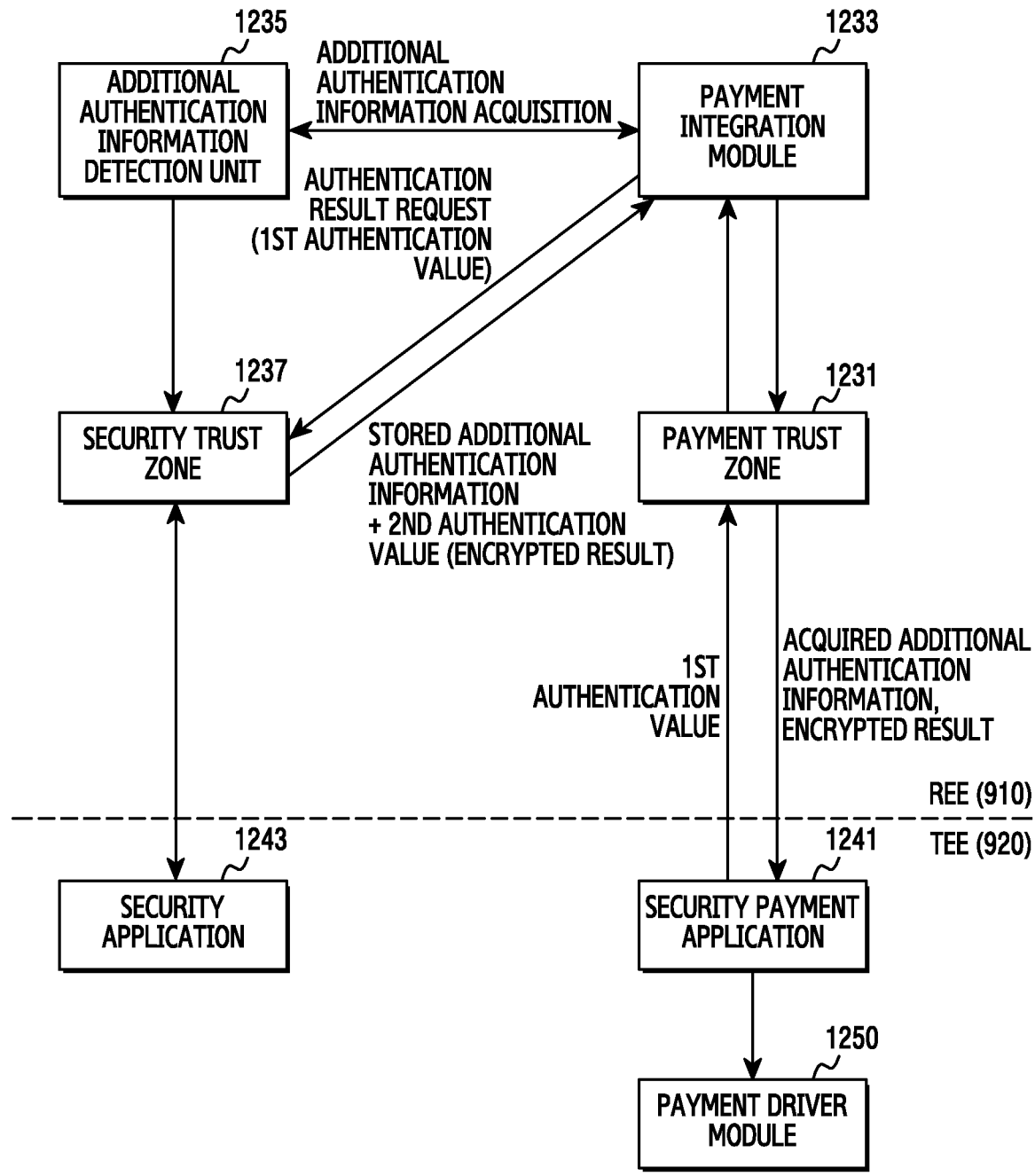

FIGS. 11 to 12B are block diagrams illustrating authentication functions of program modules in an electronic device according to various embodiments of the present disclosure. The payment relay module 941 may include a function of receiving a disposable random number (e.g., nonce) from the payment module 921 of the TEE 920 through the security environment relay module 946, a function of obtaining a PIN and an encrypted PIN result from a PIN result obtained by requesting the PIN result from the security identifier processing module 923 through the security environment relay module 946, and a function of requesting the payment module 921 to verify the encrypted PIN result.

Referring to FIG. 11, the payment module 921 of the TEE 920 may generate a first authentication value, using a security payment application 1121. For example, the first authentication value may be a disposable random number. The payment module 921 of the TEE 920 may transmit a first authentication value to a payment trust zone 1111 of the payment relay module 941. For example, the payment relay module 941 may receive the first authentication value through the security environment relay module 946 in the REE 910.

The payment relay module 941 of the REE 910 may request a payment application 1115 to provide additional authentication information through a payment service interface 1113. The payment application 1115 may acquire additional authentication information. For example, the additional authentication information may be a PIN. The payment application 1115 may transmit the additional authentication information to the payment relay module 941 of the REE 910 through the payment service interface 1113.

The payment relay module 941 of the REE 910 may transmit a first authentication value to a security trust zone 1117 of the payment relay module 941 to request an authentication result. The payment relay module 941 of the REE 910 may transmit the first authentication value to the payment module 921 of the TEE 920 to request an authentication result. For example, the payment module 921 of the TEE 920 may receive the first authentication value, using a security application 1123. For example, the payment relay module 941 may transmit the first authentication value to the security application 1123 of the TEE 920 through the security environment relay module 946 in the REE 910.

The payment module 921 of the TEE 920 may encrypt a second authentication value and pre-stored additional authentication information of a user. For example, the second authentication value may be received from the payment module 921 of the TEE 920 and may correspond to the first authentication value. Meanwhile, the second authentication value may change in the process of being received from the payment module 921 of the TEE 920 and, in this event, may not correspond to the first authentication value. The payment module 921 of the TEE 920 may transmit pre-stored additional authentication information of the user and an encrypted result of the payment relay module 941 of the REE 910, using the security application 1123. For example, in the REE 910, the security trust zone 1117 of the payment relay module 941 may receive the encrypted result from the payment module 921 of the TEE 920 and transmit the encrypted result to the payment trust zone 1111 of the payment relay module 941.

In the REE 910, the payment trust zone 1111 of the payment relay module 941 may receive the encrypted result from the security trust zone 1117 of the payment relay module 941. Further, in the REE 910, the payment trust zone 1111 of the payment relay module 941 may receive the additional authentication information from the payment application 1115 to through the payment service interface 1113. In the REE 910, the payment trust zone 1111 of the payment relay module 941 may transmit the additional authentication information and the encrypted result to the payment module 921 of the TEE 920. For example, the payment relay module 941 may transmit the encrypted result and the additional authentication information to the payment module 921 of the TEE 920 through the security environment relay module 946 in the REE 910.

The payment module 921 of the TEE 920 may decrypt the encrypted result, using the additional authentication information. For example, the payment module 921 of the TEE 920 may identify the additional authentication information and decrypt the encrypted result, using the security payment application 1121. Further, the payment module 921 of the TEE 920 may detect a second authentication value from the encrypted result and compare the first authentication value and the second authentication value. For example, when the additional authentication information coincides with pre-stored additional authentication information of a user, the payment module 921 of the TEE 920 may detect the second authentication value from the encrypted result. When the first authentication value and the second authentication value correspond to each other, the payment module 921 of the TEE 920 may perform payment. When the first authentication value and the second authentication value do not correspond to each other, the payment module 921 of the TEE 920 may not perform payment.

Referring to FIG. 12A, the payment module 921 of the TEE 920 may generate a first authentication value, using a security payment application 1221. For example, the first authentication value may be a disposable random number. The payment module 921 of the TEE 920 may transmit a first authentication value to a payment trust zone 1211 of the payment relay module 941. For example, the payment relay module 941 may receive the first authentication value through the security environment relay module 946 in the REE 910.

The payment relay module 941 of the REE 910 may request a payment application 1214 to provide additional authentication information through a payment service interface 1212 and a payment framework 1213. The payment application 1214 may acquire additional authentication information. The payment application 1214 may acquire additional authentication information, using the payment framework 1213 and an additional authentication information detection unit 1215. For example, the additional authentication information may be fingerprint recognition-related data, and may be a fingerprint scanner to enable the additional authentication information detection unit 1215 to detect fingerprint recognition-related data. The additional authentication information detection unit 1215 may transfer the additional authentication information to the payment framework 1213 and may provide the additional authentication information to an additional authentication information manager 1216. The payment application 1214 may transmit the additional authentication information to the payment relay module 941 of the REE 910 through the payment framework 1213 and the payment service interface 1212.

The payment relay module 941 of the REE 910 may transmit a first authentication value to a security trust zone 1217 of the payment relay module 941 to request an authentication result. The payment relay module 941 of the REE 910 may transmit the first authentication value to the payment module 921 of the TEE 920 to request an authentication result. For example, the payment module 921 of the TEE 920 may receive the first authentication value, using a security application 1223. For example, the payment relay module 941 may transmit the first authentication value to the security application 1223 of the TEE 920 through the security environment relay module 946 in the REE 910.

The payment module 921 of the TEE 920 may encrypt a second authentication value and pre-stored additional authentication information of a user. The additional authentication information manager 1216 may pre-store additional authentication information of a user. For example, the second authentication value may be received from the payment module 921 of the TEE 920 and may correspond to the first authentication value. Meanwhile, the second authentication value may change in the process of being received from the payment module 921 and, in this event, may not correspond to the first authentication value. The payment module 921 of the TEE 920 may transmit pre-stored additional authentication information of the user and an encrypted result of the payment relay module 941 of the REE 910, using the security application 1223. For example, in the REE 910, the security trust zone 1217 of the payment relay module 941 may receive the encrypted result from the payment module 921 of the TEE 920 and transmit the encrypted result to the payment trust zone 1211 of the payment relay module 941.

In the REE 910, the payment trust zone 1211 of the payment relay module 941 may receive the encrypted result from the security trust zone 1217 of the payment relay module 941. Further, in the REE 910, the payment trust zone 1211 of the payment relay module 941 may receive the additional authentication information from the payment application 1214 through the payment service interface 1213. In the REE 910, the payment trust zone 1211 of the payment relay module 941 may transmit the additional authentication information and the encrypted result to the payment module 921 of the TEE 920. For example, the payment relay module 941 may transmit the encrypted result and the additional authentication information to the payment module 921 of the TEE 920 through the security environment relay module 946 in the REE 910.

The payment module 921 of the TEE 920 may decrypt the encrypted result, using the additional authentication information. For example, the payment module 921 of the TEE 920 may identify the additional authentication information and decrypt the encrypted result, using the security payment application 1221. Further, the payment module 921 of the TEE 920 may detect a second authentication value from the encrypted result and compare the first authentication value and the second authentication value. For example, when the additional authentication information coincides with pre-stored additional authentication information of a user, the payment module 921 of the TEE 920 may detect the second authentication value from the encrypted result. When the first authentication value and the second authentication value correspond to each other, the payment module 921 of the TEE 920 may perform payment. When the first authentication value and the second authentication value do not correspond to each other, the payment module 921 of the TEE 920 may not perform payment.

Referring to FIG. 12B, a payment integration module 1233 may include the payment application 1214 and the payment framework 1213 of FIG. 12A. A payment trust zone 1231 may include the payment trust zone 1211 and the payment service interface 1212 of FIG. 12A. A security trust zone 1237 may include an additional authentication information manager 1216 and a security trust zone 1217.

Referring to FIG. 12B, the payment module 921 of the TEE 920 may generate a first authentication value, using a security payment application 1241. For example, the first authentication value may be a disposable random number. The payment module 921 of the TEE 920 may transmit a first authentication value to the payment trust zone 1231 of the payment relay module 941. For example, the payment relay module 941 may receive the first authentication value through the security environment relay module 946 in the REE 910.

The payment relay module 941 of the REE 910 may request the payment integration module 1233 to provide additional authentication information. The payment integration module 1233 may acquire additional authentication information. The payment integration module 1233 may acquire the additional authentication information, using an additional authentication information detection unit 1235. For example, the additional authentication information may be fingerprint recognition-related data, and may be a fingerprint scanner to enable the additional authentication information detection unit 1235 to detect fingerprint recognition-related data. The additional authentication information detection unit 1235 may transfer the additional authentication information to the payment integration module 1233 and may provide the additional authentication information to the security trust zone 1237. The payment integration module 1233 may transmit the additional authentication information to the payment relay module 941 of the REE 910.

The payment relay module 941 of the REE 910 may transmit a first authentication value to the security trust zone 1237 of the payment relay module 941 to request an authentication result. The payment relay module 941 of the REE 910 may transmit the first authentication value to the payment module 921 of the TEE 920 to request an authentication result. For example, the payment module 921 of the TEE 920 may receive the first authentication value, using a security application 1243. For example, the payment relay module 941 may transmit the first authentication value to the security application 1243 of the TEE 920 through the security environment relay module 946 in the REE 910.

The payment module 921 of the TEE 920 may encrypt a second authentication value and pre-stored additional authentication information of a user. The security trust zone 1237 may pre-store additional authentication information of a user. For example, the second authentication value may be received from the payment module 921 of the TEE 920 and may correspond to the first authentication value. Meanwhile, the second authentication value may change in the process of being received from the payment module 921 of the TEE 920 and, in this event, may not correspond to the first authentication value. The payment module 921 of the TEE 920 may transmit pre-stored additional authentication information of the user and an encrypted result of the payment relay module 941 of the REE 910, using the security application 1243. For example, in the REE 910, the security trust zone 1237 of the payment relay module 941 may receive the encrypted result from the payment module 921 of the TEE 920 and transmit the encrypted result to the payment integration module 1233.

In the REE 910, the payment integration module 1233 of the payment relay module 941 may receive the encrypted result from the security trust zone 1237 of the payment relay module 941. In the REE 910, the payment trust zone 1231 of the payment relay module 941 may receive the encrypted result from the payment integration module 1233. Further, in the REE 910, the payment trust zone 1231 of the payment relay module 941 may receive the additional authentication information from the payment integration module 1233. In the REE 910, the payment trust zone 1231 of the payment relay module 941 may transmit the additional authentication information and the encrypted result to the payment module 921 of the TEE 920. For example, the payment relay module 941 may transmit the encrypted result and the additional authentication information to the payment module 921 of the TEE 920 through the security environment relay module 946 in the REE 910.

The payment module 921 of the TEE 920 may decrypt the encrypted result, using the additional authentication information. For example, the payment module 921 of the TEE 920 may identify the additional authentication information and decrypt the encrypted result, using the security payment application 1241. Further, the payment module 921 of the TEE 920 may detect a second authentication value from the encrypted result and compare the first authentication value and the second authentication value. For example, when the additional authentication information coincides with pre-stored additional authentication information of a user, the payment module 921 of the TEE 920 may detect the second authentication value from the encrypted result. When the first authentication value and the second authentication value correspond to each other, the payment module 921 of the TEE 920 may perform payment. For example, the payment module 921 of the TEE 920 may perform payment, using a payment driver module 1250. When the first authentication value and the second authentication value do not correspond to each other, the payment module 921 of the TEE 920 may not perform payment.

Figure 13:
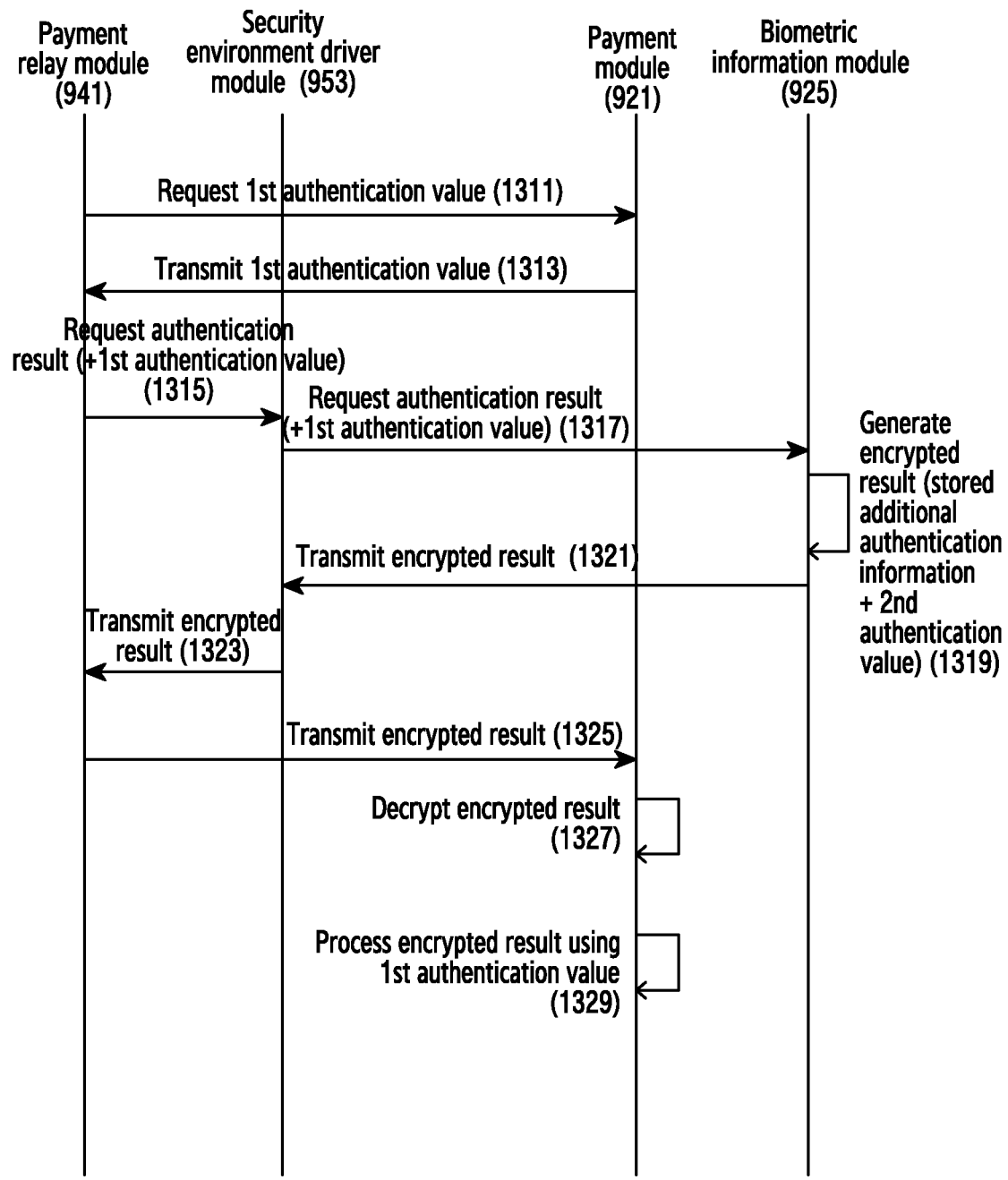
FIG. 13 is a signal flow diagram illustrating authentication operations of programming modules in an electronic device according to various embodiments of the present disclosure.

FIG. 13 is a signal flow diagram illustrating an authentication operation of a program module in an electronic device according to various embodiments of the present disclosure.

Referring to FIG. 13, in operation 1311, the payment relay module 941 may request the payment module 921 in the TEE 920 to provide a disposable random number (e.g., nonce), through the security environment driver module 953 and the security environment relay module 946.

According to an embodiment of the present disclosure, in operation 1313, the payment module 921 may generate the disposable random number and encrypt the disposable random number, using a key (e.g., a DRK) in the TEE 920. The payment module 921 may transfer the encrypted disposable random number to the security environment relay module 946 through the security environment driver module 953. Data transmission/transfer between modules or applications being executed in the same device may include a state in which data stored in a memory 860 is accessible.

According to an embodiment of the present disclosure, in operations 1315 and 1317, the security environment relay module 946 may transfer the encrypted disposable random number to the biometric information module 925 through the security environment driver module 953. The biometric information module 925 may decrypt the encrypted disposable random number, using the key. The biometric information module 925 may authenticate the user, using information acquired from the biometric sensor 807. In operation 1319, the biometric information module 925 may encrypt the user authentication success-or-failure information together with the disposable random number, using the key. In operations 1321 and 1323, the biometric information module 925 may transfer the encrypted authentication success-or-failure information and disposable random number to the security environment relay module 946 through the security environment driver module 953. In operation 1325, the security environment relay module 946 may transfer the encrypted authentication success-or-failure information and disposable random number to the payment module 921 through the security environment driver module 953.

According to an embodiment of the present disclosure, in operation 1327, the payment module 921 may decrypt the encrypted authentication success-or-failure information and disposable random number, through the key. In operation 1329, the payment module 921 may compare the received disposable random number with the generated disposable random number to determine whether the authentication success-or-failure information has been changed in the REE 910. The comparison may include determining whether the transmitted disposable random number and the received disposable random number completely coincide with each other, or determining that they coincide with each other when the received disposable random number is a number generated based on the transmitted disposable random number even though they do not completely coincide with each other. When the two disposable random numbers coincide and the authentication has succeeded, the payment module 921 may perform payment. When the disposable random numbers do not coincide and the authentication has not succeeded, the payment module 921 may not perform payment.

According to an embodiment of the present disclosure, the comparison may be executed in another application or agent (e.g., a payment manager 940 or a kernel 950) executed in the TEE 920 or REE 910.

Figure 14:
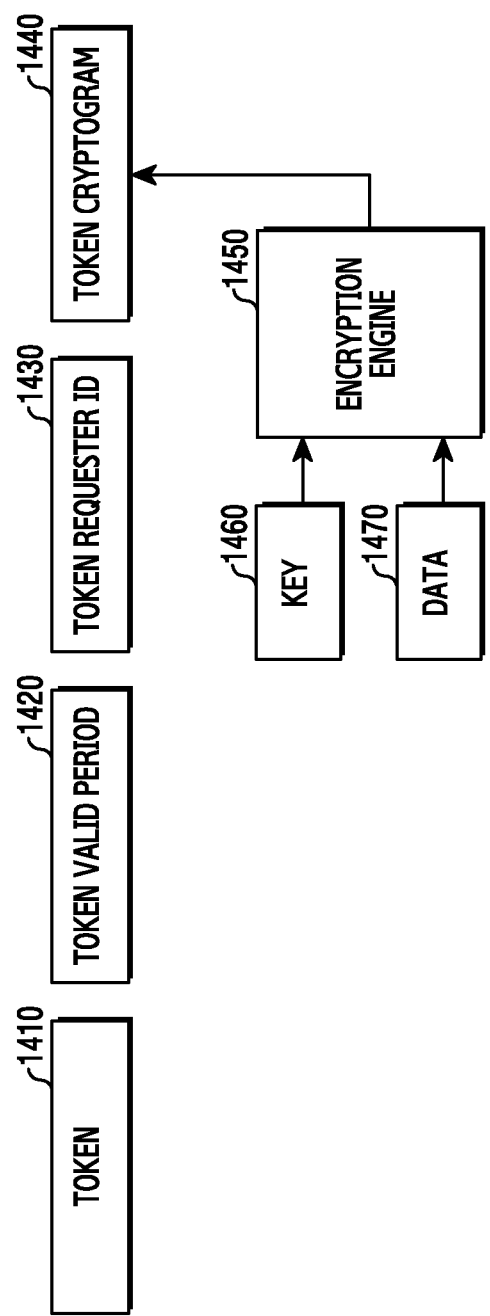
FIG. 14 is a block diagram illustrating a method of generating a token cryptogram according to various embodiments of the present disclosure.

FIG. 14 is a block diagram illustrating a method of generating a token cryptogram according to various embodiments of the present disclosure.

Referring to FIG. 14, the payment module 921 may store a token 1410, a token valid period 1420, a token requester ID 1430, and a token cryptogram 1440 from the electronic device 800 or another external electronic device. The payment module 921 may generate the token cryptogram 1440, using a key 1460 and data 1470. For example, an encryption engine 1450 may encrypt the token cryptogram 1440, based on the key 1460 and the data 1470. The payment module 921 may use different keys 1460 according to a certain rule, for example, in each transaction, in a certain number of times of transaction, or a transaction within a particular time. The data 1470 and the encryption engine 1450 may change into a wide variety of types according to the encryption method (e.g., AES, TKIP, and the like).

The TSP 730 may possess a key paired with the above-described key 1460. The TSP 730 may decrypt the encrypted token cryptogram 1440 through the paired key.

Figure 15:
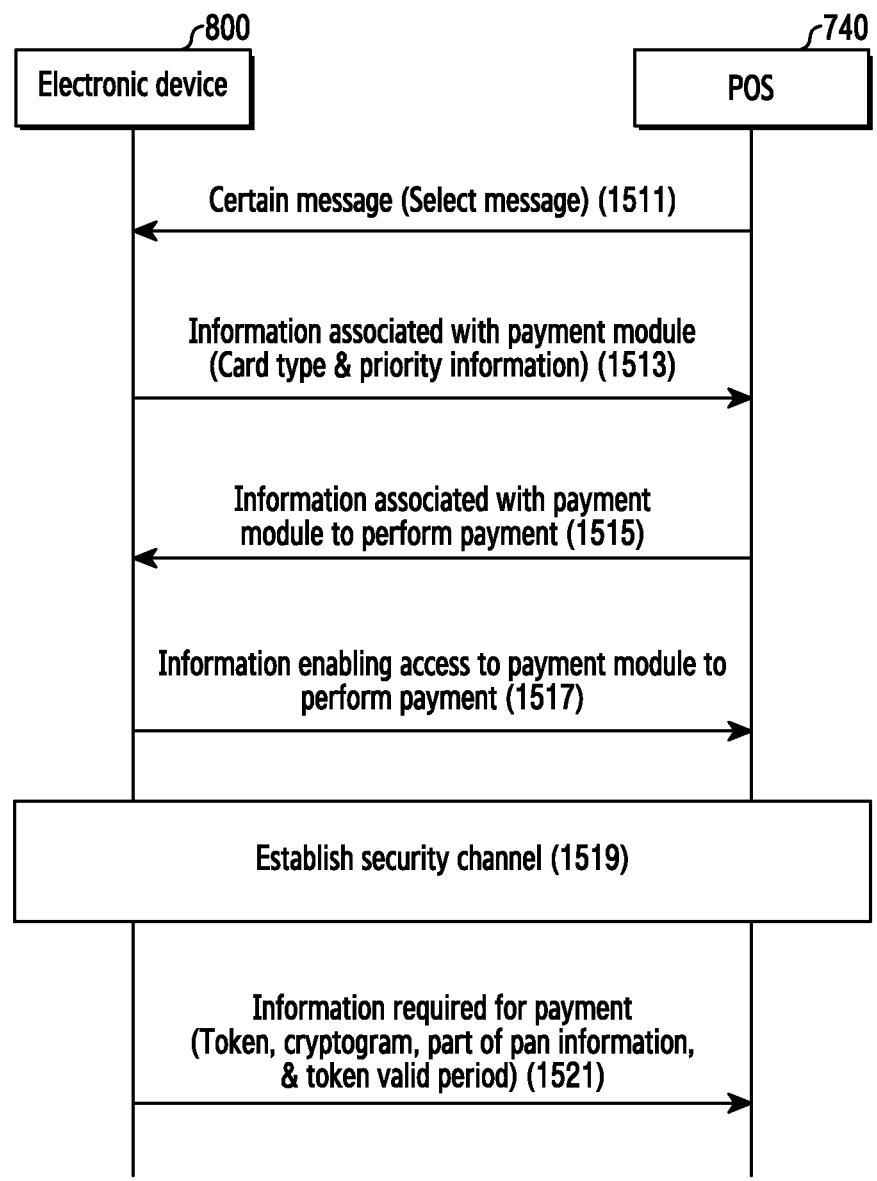
FIG. 15 is a signal flow diagram illustrating a concept of a communication method for payment between a near field communication (NFC) module and a point of sale (POS) device according to various embodiments of the present disclosure.

FIG. 15 is a signal flow diagram illustrating a concept of a communication method for payment between an NFC module and a POS device according to various embodiments of the present disclosure.

Referring to FIG. 15, the payment module 921 may transmit or receive certain information to or from the POS device 740 in the payment operation. In the case of NFC, the POS device 740 may first receive the information to perform the payment. In the case of MST, payment-related information including the token 1410 and token cryptogram 1440 may be transmitted, based on an explicit input from a user or an internal algorithm of the electronic device 800, to the POS device 740.

According to an embodiment of the present disclosure, in the case of using the NFC for the payment, the electronic device 800 may transmit or receive at least one message. The electronic device 800 may receive a message determined by the POS device 740 in operation 1511.

In operation 1513, the electronic device 800 may transmit information (e.g., a card type and priority information) associated with the payment module 921 to the POS device 740 based on the determined message.

In operation 1515, the POS device 740 may determine a payment module 921 to perform the payment, based on information associated with the payment module 921. The POS device 740 may transfer the information associated with the determined payment module 921 to the electronic device 800.

In operation 1517, the electronic device 800 may transfer the information enabling access to the determined payment module 921 to the POS device 740.

In operation 1519, the POS device 740 may establish a security channel between the electronic device 800 and the POS device 740 based on the information enabling the access. To this end, the electronic device 800 and the POS device 740 may exchange at least one key 1460 capable of establishing a security channel. The above process may be a process of exchanging at least one message.

In operation 1521, based on the security channel, the electronic device 800 may transmit information (e.g., the token 1410, the token cryptogram 1440, a part of PAN information, or the token valid period 1420) necessary for payment to the POS device 740.

Figure 16:
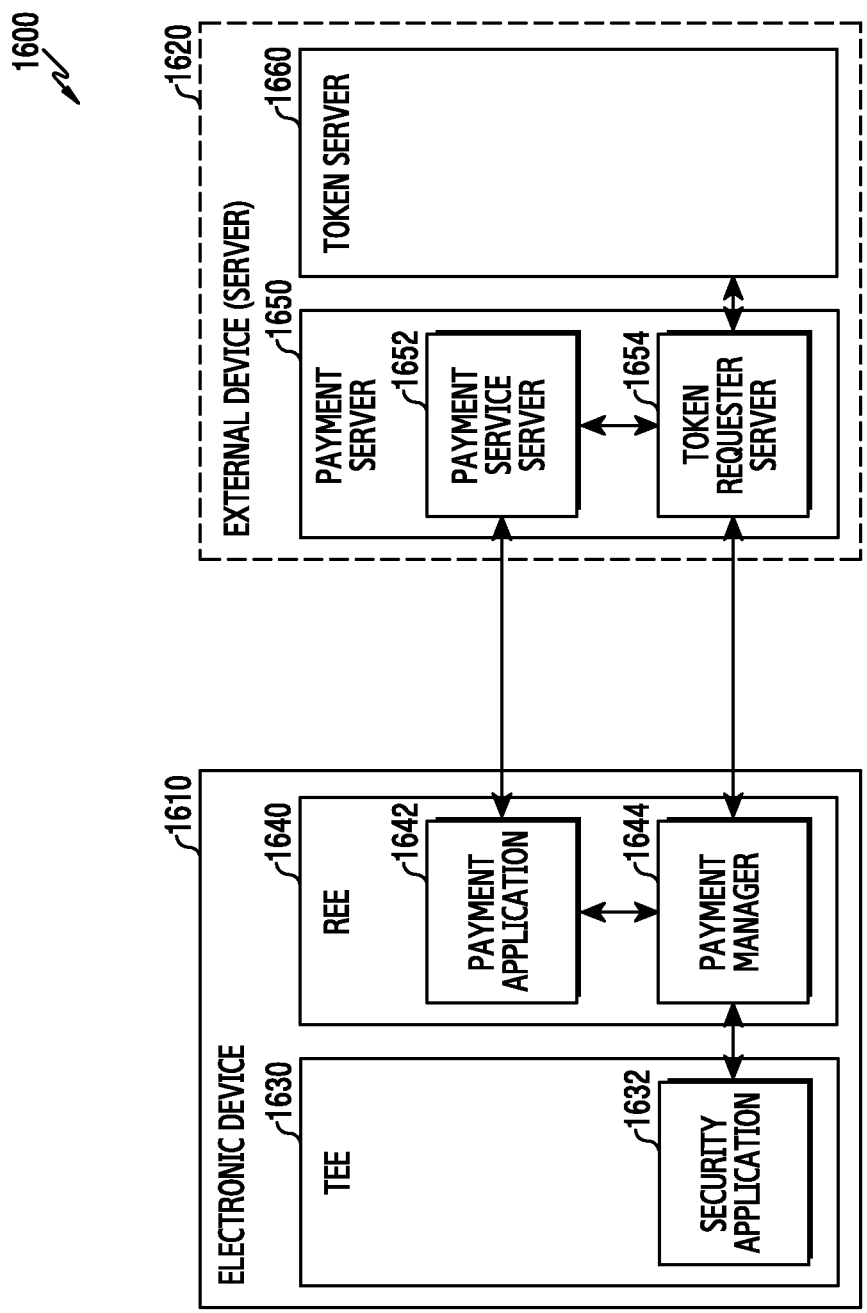
FIG. 16 is a block diagram illustrating a payment system according to various embodiments of the present disclosure.

FIG. 16 is a block diagram illustrating a payment system according to various embodiments of the present disclosure.

Referring to FIG. 16, a payment system 1600 may include an electronic device 1610 and/or an external device 1620 (e.g., a server). The electronic device 1610 may include, for example, a TEE 1630 and/or an REE 1640. The external device 1620 may include, for example, a server, and the server may include, for example, a payment server 1650 and/or a token server 1660. The payment server 1650 may include, for example, a payment service server 1652 or a token requester server 1654.

According to various embodiments of the present disclosure, the TEE 1630 may include a security system related to the electronic device 1610. For example, the electronic device 1610 may protect information included or stored in the TEE 1630 from a control related to a request, a revision, or an input from the outside, using the TEE 1630.

According to an embodiment of the present disclosure, the TEE 1630 may include, for example, a program mode, the security of which has been reinforced. For example, using the TEE 1630, a normal area (world) and a security area (world) may be distinguished. The normal world may be referred to as the REE 1640. Further, the TEE 1630 may, for example, execute a reliable application or manage encrypted information. For example, the encrypted information may include token or key information.

According to an embodiment of the present disclosure, the TEE 1630 may protect the encrypted information from the outside. The token or key information may be used to encrypt the card information. For example, in relation to the token or key information, when the card information is provided to a device for payment, the card information may be at least partly changed rather than being directly provided to the device for payment. In changing the card information, the token or key information may be used. The key may be acquired from, for example, a service provider who provides a payment service. Further, the key may be managed by the electronic device 1610 or the server. According to an embodiment of the present disclosure, the TEE 1630 may include, for example, a security application (e.g., a trusted application) 1632. The TEE 1630 may provide, for example, an environment in which the security application 1632 can be executed.

According to various embodiments of the present disclosure, the security application 1632 may include, for example, information related to a card company included in the TEE 1630. The information related to the card company may include, for example, an application related to the card company, and the application may be provided in a packaged form. The packaged form may be provided by an SDK.

According to various embodiments of the present disclosure, the security application 1632 may include, for example, an application or applet which should be executed in a mode, the security of which has been reinforced, likewise in the TEE 1630. Further, the security application 1632 may include, for example, an encryption-related function. For example, the security application 1632 may perform functions of generating, revising, or deleting a cryptogram related to the payment.

According to various embodiments of the present disclosure, the REE 1640 may include an application layer. For example, the REE 1640 may include an application and/or framework. The REE 1640 may allow access thereto from the outside or control thereof, differently from the TEE 1630. The REE 1640 may include, for example, a payment application (e.g., a wallet application) 1642 and/or a payment manager 1644. The payment application 1642 may perform, for example, functions of identification, OCR, or interfacing for payment by the payment application 1642. For example, the payment application 1642 may perform, for example, functions related to card registration or payment.

According to various embodiments of the present disclosure, the payment manager 1644 may include, for example, information related to a card company included in the REE 1640. The information related to the card company may include, for example, an application related to the card company, and the application may be provided in a packaged form. The packaged form may be provided by an SDK. The payment manager 1644 may include, for example, an encryption-related function. For example, the payment manager 1644 may perform functions of token ID management or card company channel establishment. Further, the payment manager 1644 may perform, for example, interfacing with the external device (e.g., a server) 1620. For example, the payment manager 1644 may provide an interface with a server (e.g., the payment server 1650) for a tokenization service.

According to various embodiments of the present disclosure, the payment manager 1644 may be functionally connected with and share information with the security application 1632. For example, the payment manager 1644 may perform interfacing with the security application 1632 for using (e.g., storing) the token or the key. Further, the security application 1632 may include information associated with a network service provider.

According to various embodiments of the present disclosure, the payment application 1642 and the payment manager 1644 may be functionally connected with each other, and the security application 1632 and the payment manager 1644 may be functionally connected with each other. For example, the payment manager 1644 may transfer information received from the outside to the payment application 1642 or the security application 1632 or transfer information received from the payment application 1642 or the security application 1632 to the outside. According to an embodiment of the present disclosure, the payment manager 1644 may share information related to payment with the security application 1632 or the payment application 1642.

According to various embodiments of the present disclosure, the electronic device 1610 may include an additional configuration or module, as well as the TEE 1630, the security application 1632, the REE 1640, the payment application 1642, and the payment manager 1644.

According to various embodiments of the present disclosure, the payment server 1650 is a management server for electronic payment or mobile payment and may transmit or receive information (e.g., token or key) related to payment to or from the electronic device 1610. Further, the payment service server 1652 and the token requester server 1654 included in the payment server 1650 are functionally connected with each other to share information relating to payment.

According to various embodiments of the present disclosure, the token server 1660 may be functionally connected to the token requester server 1654 to transmit or receive the information related to payment. For example, the token requester server 1654 and the token server 1660 may provide an interface for transfer of the token or the key.

Figure 17:
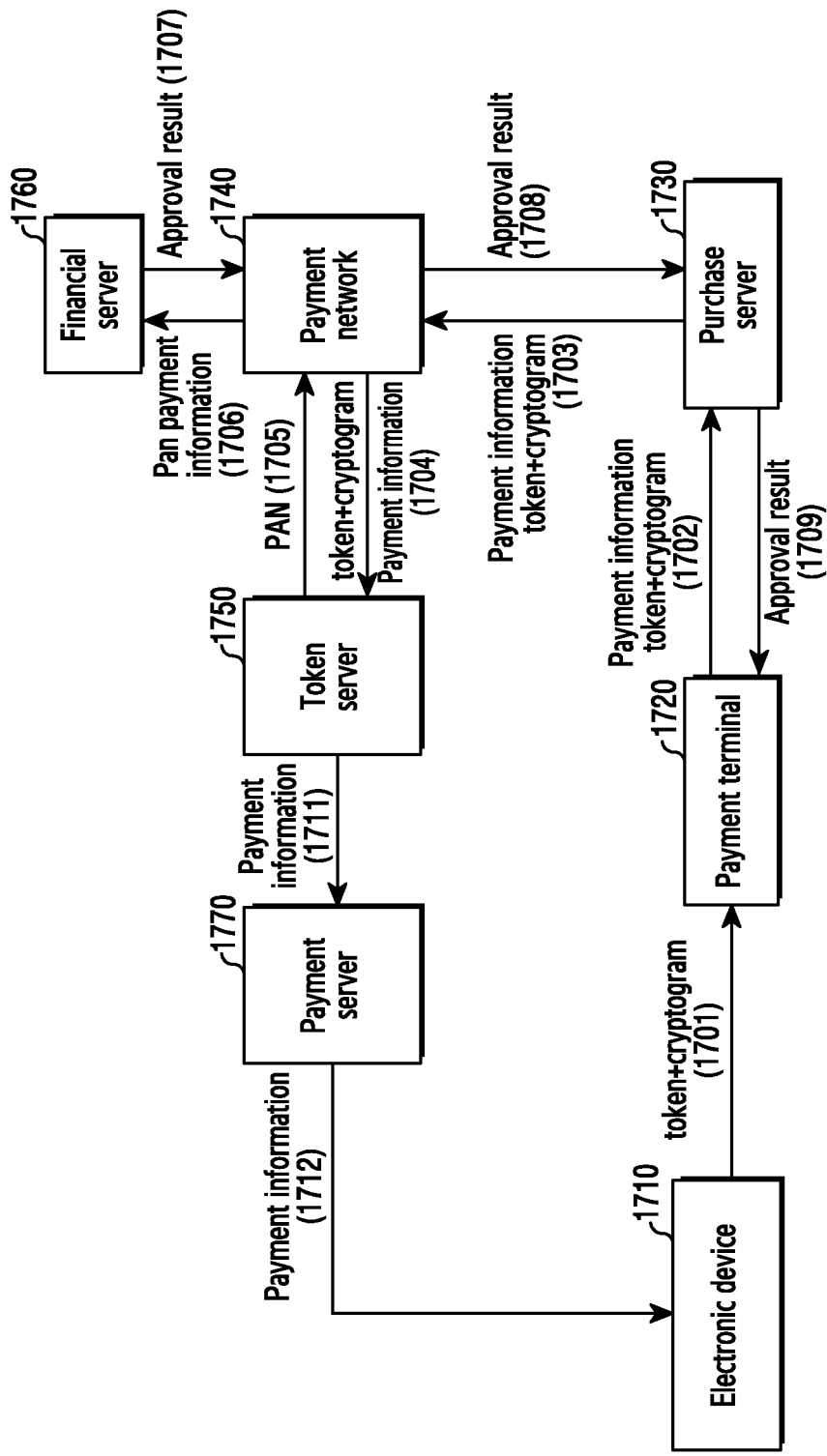
FIG. 17 illustrates a signal flow of token payment according to various embodiments of the present disclosure.

FIG. 17 illustrates a signal flow of token payment according to various embodiments of the present disclosure.

Referring to FIG. 17, the payment system may include an electronic device 1710, a payment server 1770, a token server 1750, a POS device 1720, a financial server 1760, a purchase server (acquirer) 1730, or a payment network 1740. The electronic device 1710 may include, for example, a payment application, a payment manager, or a security area (e.g., a security module or TEE). The POS device 1720 may include, for example, a sales time point information management system. The POS device 1720 may be, for example, a combination of functions of a cash register and a computer electronic device, and a user can perform a payment function using the POS device 1720. The financial server 1760 may include, for example, a bank or financial company for issuing a card, and may perform identification of the card. Further, the financial server may proceed approval of the card at the time of payment. The purchase server 1730 may include, for example, a bank or financial company which purchases a transaction sheet for the card transaction paid in a shop (e.g., the POS device 1720). The payment network 1740 may include, for example, a card network.

According to various embodiments of the present disclosure, in operation 1701, the electronic device 1710 may transfer a token and/or encryption information (e.g., cryptogram) to a payment terminal (e.g., the POS device 1720). For example, the token may be stored in the electronic device 1710. Further, the token may be stored in an encrypted area of the electronic device 1710. For example, the electronic device 1710 may encrypt and store the token in the security module or the TEE 920. For example, the electronic device 1710 may generate encryption information, using a key received from the outside or a key generated by the electronic device 1710. The security information may include a cryptogram. Further, the electronic device 1710 may transfer the cryptogram and/or the token to the POS device 1720.

According to various embodiments of the present disclosure, the electronic device 1710 may use various communication connections in order to transfer the token and/or cryptogram to the POS device 1720. The communication connections may include, for example, NFC, MST, barcode, or quick response (QR) code.

According to various embodiments of the present disclosure, in operation 1702, the POS device 1720 may transfer at least one among the token, the encryption information, and the payment information to the purchase server 1730. For example, the POS device 1720 may transfer the token and/or the cryptogram received from the electronic device 1710 and the payment information (e.g., payment location, payment date, or payment amount) acquired from the POS device 1720 to the purchase server 1730. Further, the payment information may be, for example, acquired from the POS device 1720 or received from an external device, and may include payment details relating to a payment function requested by the user. Further, the payment information may include, for example, payment history performed using the payment system 700.

According to various embodiments of the present disclosure, in operation 1703, the purchase device 1730 may transfer, for example, at least one among the token, the encryption information, and the payment information to the payment network 1740. The purchase server 1730 may receive at least one among the token, the password information, and the payment information, and transfer at least one among the received token, password information, and payment information to the payment network 1740.

According to various embodiments of the present disclosure, in operation 1704, the payment network 1740 may transmit, for example, at least one among the token, the encryption information, and the payment information to the token server 1750. The payment network 1740 may include a network associated with a card company, for example, VISA™, Master Card™, or Amex™. According to an embodiment of the present disclosure, the payment network 1740 may include or operate the token server 1750.

According to various embodiments of the present disclosure, the token server 1750 may receive at least one of the token, the encryption information, and the payment information from the payment network 1740. The token server 1750 may identify information on the received token. For example, the token server 1750 may use the token to identify card information (e.g., card number (PAN), expiration date) corresponding to the token. For example, the token server 1750 may identify a PAN corresponding to the financial server 1760, using information (e.g., Data) included in the token. The token server 1750 may, for example, identify a PAN corresponding to the financial server 1760 and use the PAN to get payment authentication from the financial server 1760. According to various embodiments of the present disclosure, the token server 1750 may identify the PAN, using the received cryptogram. According to various embodiments of the present disclosure, in operation 1705, the token server 1750 may transfer the PAN to the payment network 1740.

According to an embodiment of the present disclosure, the payment network 1740 may receive the PAN from, for example, the token server 1750. In operation 1706, the payment network 1740 may transfer the PAN and/or the payment information to the financial server 1760.

According to various embodiments of the present disclosure, the financial server 1760 may receive the PAN and/or the payment information from the payment network 1740. The financial server 1760 may determine whether to approve the payment, using the PAN and/or the payment information. For example, the financial server 1760 may use the PAN and/or the payment information to determine whether it coincides (e.g., valid PAN) with information included in the financial server 1760. The financial server 1760 may determine whether a database storing the PAN includes a PAN coinciding with the received PAN, and may identify payment restriction information (e.g., payment limit or foreign approval-or-not) associated with the coinciding PAN. The financial server 1760 may determine whether to approve the payment, by determining whether the payment information satisfies the identified payment restriction information. The financial server 1760 may approve the payment when the PAN and/or the payment information coincides with the information included in the financial server 1760. Meanwhile, the financial server 1760 may reject the payment when the PAN and/or the payment information does not coincide with the information included in the financial server 1760. The rejection of the payment may refer to unapproval of the payment (e.g., unapproval or rejection).

According to various embodiments of the present disclosure, in operation 1707, the financial server 1760 may transfer a result of the approval determination (e.g., approval or rejection) to the payment network 1740.

According to various embodiments of the present disclosure, in operation 1708, the payment network 1740 may transfer the approval result to the purchase server 1730. Further, the payment network 1740 may transfer the payment information to the token server 1750, when the approval result corresponds to approval.

According to various embodiments of the present disclosure, in operation 1709, the purchase server 1730 may transfer the approval result received from the payment network 1740 to the POS device 1720. In operation 1711, the token server 1750 may transfer, for example, the payment information to the payment server 1770.

According to various embodiments of the present disclosure, in operation 1712, the payment server 1770 may transfer, for example, the payment information to the electronic device 1710. For example, the payment server 1770 may transfer the payment information to the electronic device 1710, using a certain command (e.g., a push message). The payment information may include payment location, payment date, payment amount, and total payment amount.

Although the purchase server 1730, the token server 1750, the financial server 1760, and the payment server 1770 are separately illustrated and described in the above description, the purchase server 1730, the token server 1750, the financial server 1760, and the payment server 1770 may be configured in one unit according to embodiments.

According to various embodiments of the present disclosure, the electronic device 1710 may display the payment information on the display 160. For example, the electronic device 1710 may display the payment information, using the payment application included in the electronic device 1710, or display the payment information through an interface associated with a payment function. The interface associated with the payment function may include a notification bar.

According to various embodiments of the present disclosure, the electronic device 1710 may display the payment information or information (e.g., payment state, payment history, or accumulated amount) associated with the payment through a display 160 functionally connected to the electronic device 1710. For example, the electronic device 1710 may use a notification module (e.g., the notification manager 349 of FIG. 3) of the electronic device 1710 to display payment information or the information associated with the payment. Further, in the electronic device 1710, the payment information or the information associated with the payment may be displayed using at least one among, for example, a notification, an indicator, a status bar, a task bar, an icon, a floating icon, a tile, and a widget, and may be displayed in a partial area of at least one among a home screen, a lock screen, and a curved display.

According to various embodiments of the present disclosure, the electronic device 1710 may output a sound notifying of the payment information or the information associated with the payment through an audio module (e.g., the audio module 280 of FIG. 2 and/or a motor (e.g., the motor 298 of FIG. 2, a tactile feedback device (not shown), a friction display (not shown)) functionally connected to the electronic device 1710, or generate vibration or haptic effect notifying of the information.

According to various embodiments of the present disclosure, a payment card industry (PCI) for a protocol for a payment card exists, and the POS device 1720 should satisfy the requirements by a PIN transaction security (PTS) for payment transaction. For example, the POS device 1720 should follow a contingency mechanism, which can monitor physically sensitive data (e.g., card information and signature information) in order to physically protect the physically sensitive data and, when an intrusion is deleted, can delete the data to preclude the possibility of restoration of the sensitive data. Further, the POS device 1720 should discriminate between applications in executing each application, and follow requirements that it should be impossible to monitor, collide with, or revise another application or an OS. Further, as firmware is authenticated when the firmware is updated, the POS device 1720 should identify cryptological authentication of firmware in installing all applications in a corresponding terminal.

Further, an OS of the POS device 1720 may include only software necessary for an intended function. An OS of the POS device 1720 should be safely configured and be executed by least authority. An OS of the POS device 1720 should not allow an unauthenticated or unnecessary function for a security policy performed by a device. An OS of the POS device 1720 should disable or, if possible, delete an unrequired API or commands for supporting a special function.

Therefore, in order to use the electronic device 1710 as the POS device 1720, the requirements described above should be satisfied. According to various embodiments of the present disclosure, the electronic device 1710 may implement an input of PIN, and the like, as a trusted input to safely read a physical signature or the PIN input, entering through a touch screen and a trust zone, and directly bring the input into the trust zone. Meanwhile, at the time of processing the payment mode, the electronic device 1710 may configure a tone or screen displayed on a display 160 differently from a general mode, to enable a user to recognize the tone or screen. Hereinafter, an operation method for using the electronic device 1710 as the POS device 1720 will be described in detail.

Figure 18:
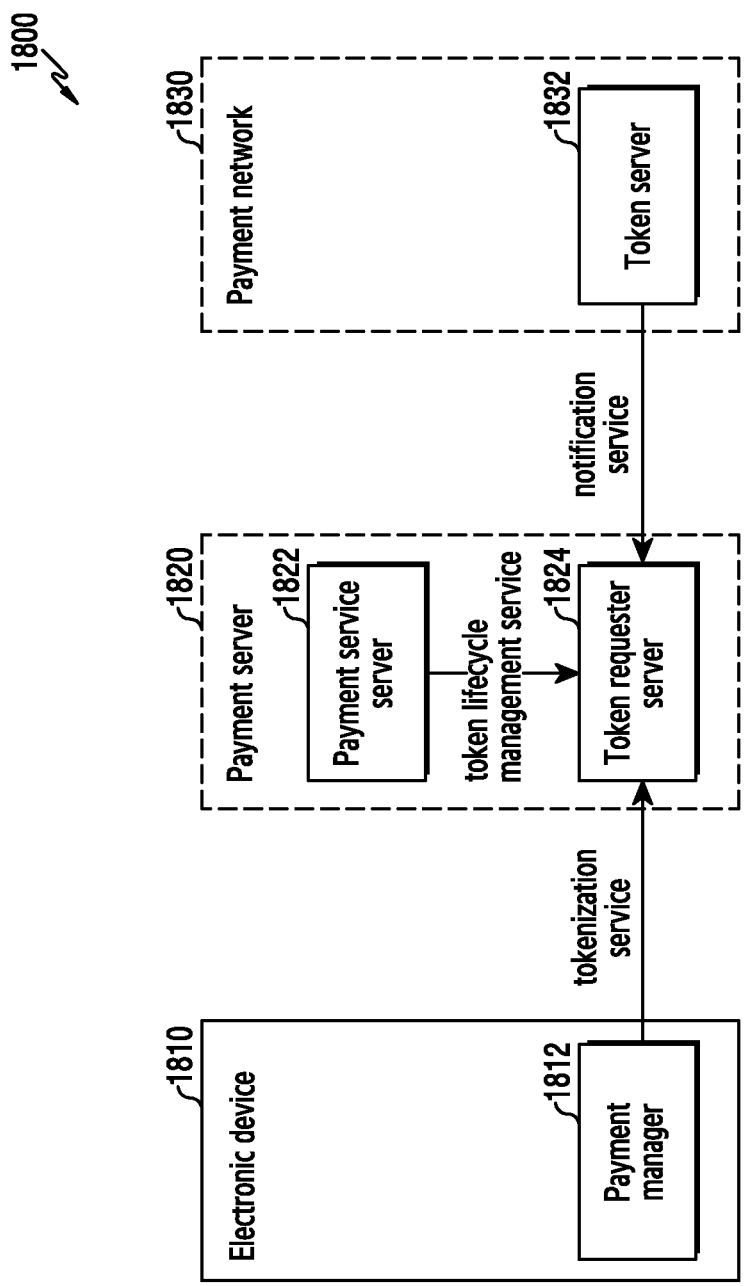
FIG. 18 illustrates a signal flow of an operation of a payment system according to various embodiments of the present disclosure.

FIG. 18 illustrates a signal flow of an operation of a payment system according to various embodiments of the present disclosure.

Referring to FIG. 18, a payment system 1800 may include an electronic device 1810, a payment server 1820, and/or a payment network 1830. The electronic device 1810 may include, for example, a payment manager 1812. The payment server 1820 may include, for example, a payment service server 1822 or token requester server 1824. The payment network 1830 may include, for example, a token server 1832. The payment system 1800 may use, for example, the token for the functions performed by each of the electronic device 1810, the payment server 1820, and/or the payment network 1830.

According to various embodiments of the present disclosure, the electronic device 1810 may provide a tokenization service associated with the token, using the payment manager 1812 included in the electronic device 1810 and the token requester server 1824 included in the payment server 1820.

According to various embodiments of the present disclosure, the payment management server 1822 may provide an operation cycle (e.g., token life management) associated with a token, using the token requester server 1824 included in the payment server 1820.

According to various embodiments of the present disclosure, the token server 1832 may provide a notification service associated with the token, using the token requester server 1824.

According to various embodiments of the present disclosure, the token requester server 1824 may provide a payment method to the electronic device 1810, using a payment network solution. For example, the token requester server 1824 may determine a payment method proper for the user, using the tokenization service, an operating cycle associated with the token, and/or a notification service associated with the token.

Figure 19A:
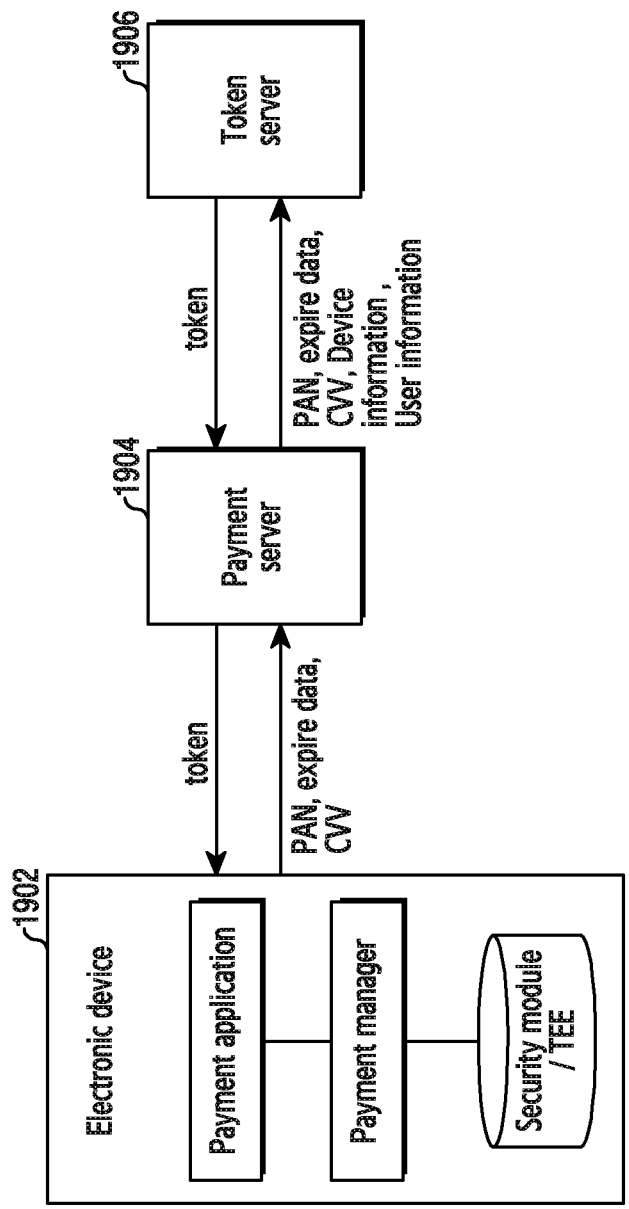
FIGS. 19A to 19C illustrate signal flows of token issuance operations of an electronic device according to various embodiments of the present disclosure.
Figure 19B:
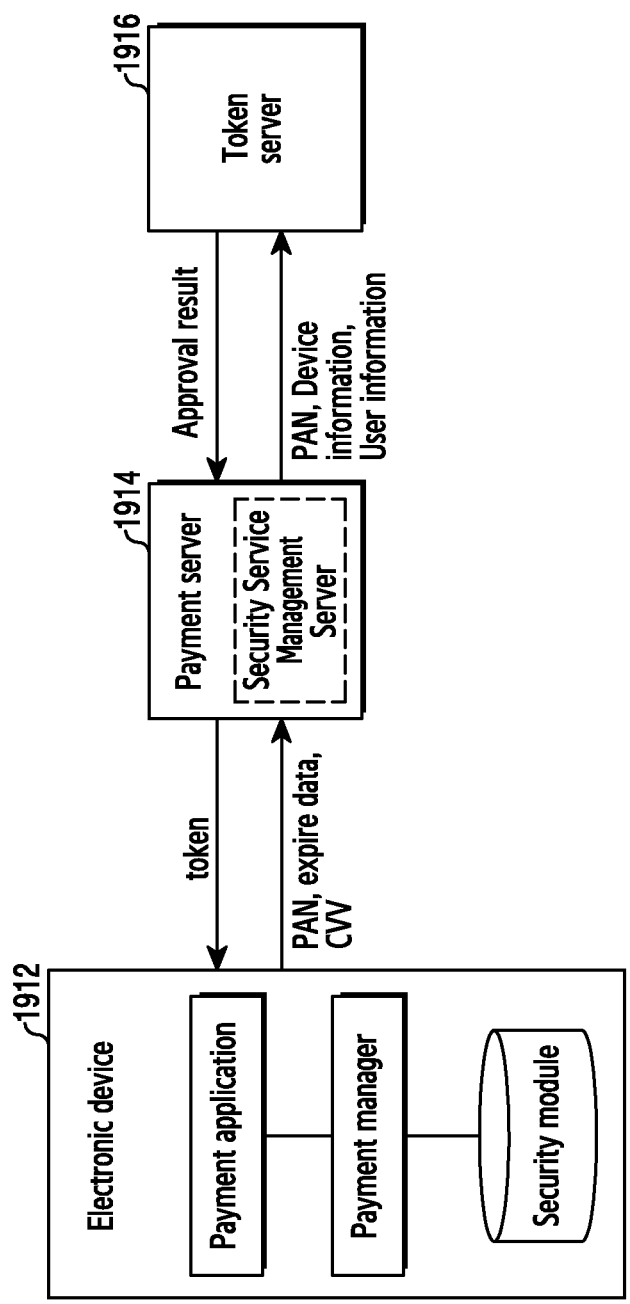
Figure 19C:
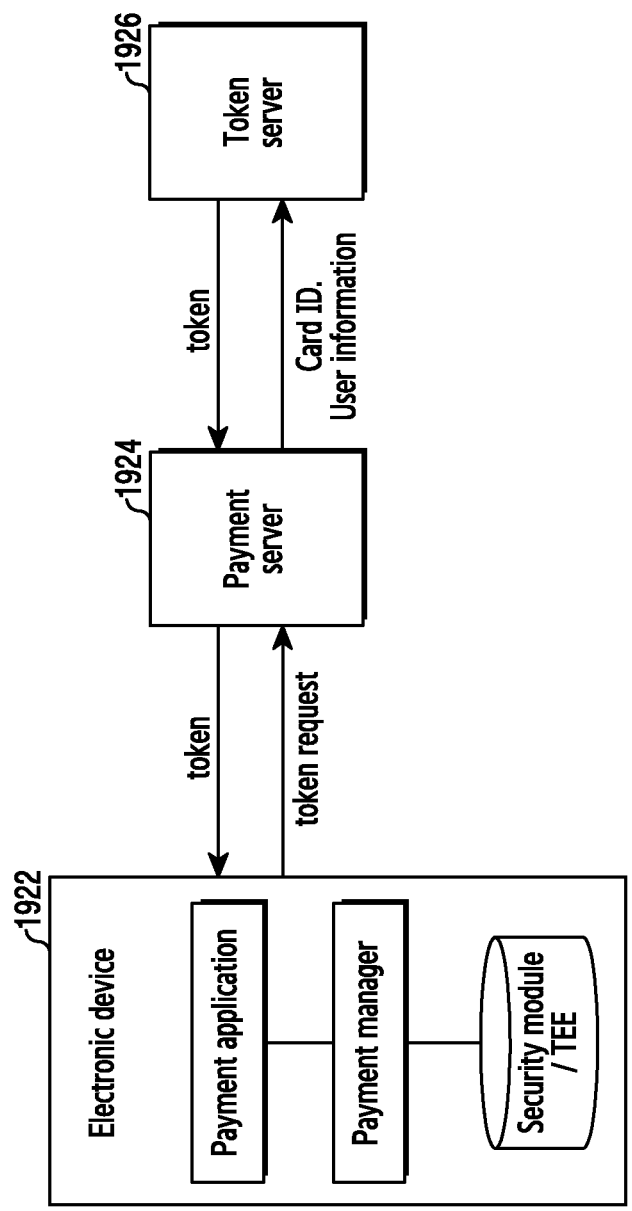

FIGS. 19A to 19C illustrate signal flows of token issuance operations of an electronic device according to various embodiments of the present disclosure. According to various embodiments of the present disclosure, the token issuance operation may be changed according to the country. For example, the token issuance operation may be changed according to the United States of America, Europe, or Republic of Korea.

Referring to FIG. 19A, the first token issuance operation may include, for example, an electronic device 1902, a payment server 1904, or a token server 1906. The electronic device 1902 may include, for example, a payment application, a payment manager, a security module, or a TEE.

According to various embodiments of the present disclosure, the electronic device 1902 may acquire card-related information through a sensor functionally connected to the electronic device 1902. The card-related information may be used in, for example, a card registration operation. The sensor may include, for example, an OCR. The card-related information may include, for example, at least one among PAN, valid period, and CVV. For example, the sensor may be operated using the payment application included in the electronic device 1902.

According to various embodiments of the present disclosure, the payment application included in the electronic device 1902 may transfer the card-related information to the payment server 1904. The payment server 1904 may include, for example, a payment service server or token requester server, and the card-related information may be transferred between the payment service server and the token requester server.

According to an embodiment of the present disclosure, the payment server (e.g., the token requester server) 1904 may transfer the card-related information and/or information (e.g., device information or user information) related to the electronic device 1902 to the token server 1906. The information related to the electronic device 1902 may include, for example, information of a device having requested the first token issuance operation.

According to an embodiment of the present disclosure, the token server 1906 may issue (generate) a token based on the information received from the payment server 1904.

According to an embodiment of the present disclosure, the token server 1906 may transfer a token based on the information received from the payment server 1904. The token server 1906 may transfer the token to, for example, the token requester server included in the payment server 1904.

According to an embodiment of the present disclosure, the payment server 1904 may transfer the token to the electronic device 1902. The payment server 1904, for example, the token requester server included in the payment server 1904, may transfer the token to the electronic device 1902.

According to an embodiment of the present disclosure, the electronic device 1902 may store, in the security module or the TEE, the token received from the payment server 1904. For example, the electronic device 1902 may store the token in the security module or the TEE, which is a security area, to control access from the outside.

According to an embodiment of the present disclosure, the electronic device 1902 may store, in the general memory (e.g., the memory included in the REE), the token received from the payment server 1904.

According to an embodiment of the present disclosure, one or more tokens may be issued (generated) based on a payment method (e.g., OTP or call center) performed by the electronic device 1902.

According to an embodiment of the present disclosure, one token may be issued (generated) corresponding to the electronic device 1902. For example, a first token may be included in the first electronic device while a second token is included in the second electronic device. The first token and the second token may be different from each other.

According to an embodiment of the present disclosure, the token may be activated based on an authentication operation (e.g., ID&V). For example, the token may be stored in the electronic device 1902 and activated based on the authentication operation. The authentication operation may include, for example, an identification. The identification may be conducted by, for example, a financial server.

Referring to FIG. 19B, the second token issuance operation may include, for example, an electronic device 1912, a payment server 1914, or a token server 1916. The electronic device 1912 may include at least one among, for example, a payment application, a payment manager, and a security module. Further, the payment server 1914 may include, for example, a security service management server.

According to various embodiments of the present disclosure, the electronic device or an electronic device may acquire card-related information through a sensor functionally connected to the electronic device. The card-related information may be used in, for example, a card registration operation. The sensor may include, for example, an OCR. The card-related information may include, for example, at least one among PAN, valid period, and CVV. The sensor may be operated using the payment application included in the electronic device.

According to various embodiments of the present disclosure, the payment application included in the electronic device 1912 may transfer the card-related information to the payment server 1914. The payment server 1914 may include, for example, a payment service server or token requester server, and the card-related information may be transferred between the payment service server and the token requester server.

According to an embodiment of the present disclosure, the payment server 1914 may transfer the card-related information to the security service management server included in the payment server 1914. The security service management server may be included and internally operate in, for example, the payment server 1914 or located outside of the payment server 1914. For example, the security service management server may be included in another device (e.g., an external device) different from the payment server 1914, and may be functionally connected to the payment server 1914 to transmit or receive the card-related information.

According to an embodiment of the present disclosure, the security service management server may transfer the card-related information and/or information (e.g., device information or user information) related to the electronic device 1912 to the token server 1916. The information related to the electronic device 1912 may include, for example, information of a device having requested the second token issuance operation.

According to an embodiment of the present disclosure, the token server 1916 may perform an authentication operation based on the information received from the payment server 1914. The token server 1916 may perform an authentication operation, for example, based on the card-related information and/or the information related to the electronic device 1912.

According to an embodiment of the present disclosure, the token server 1916 may transfer a result (e.g., a success or a failure) of the authentication operation to the security service management server included in the payment server 1914.

According to an embodiment of the present disclosure, the security service management server may issue (generate) a token based on the card-related information and/or the information related to the electronic device 1912.

According to an embodiment of the present disclosure, the security service management server may store the token in a security area (e.g., a security module) included in the electronic device 1912. For example, the security service management server may have an authority (e.g., a security module access authority) for access to the security area of the electronic device 1912. Further, the security service management server may store the token in the security area of the electronic device 1912, using the access authority. Further, the token may be transferred from the security service managing server to the electronic device 1912.

According to an embodiment of the present disclosure, the electronic device 1912 may store the token in the security module, which is a security area, to control access from the outside.

According to an embodiment of the present disclosure, one or more tokens may be issued (generated) based on a payment method (e.g., OTP or call center) performed by the electronic device 1912.

According to an embodiment of the present disclosure, one token may be issued (generated) corresponding to the electronic device 1912. For example, a first token may be included in the first electronic device while a second token is included in the second electronic device. The first token and the second token may be different from each other.

According to an embodiment of the present disclosure, the token may be activated based on an authentication operation (e.g., ID&V). For example, the token may be stored in the electronic device 1912 and activated based on the authentication operation. The authentication operation may include, for example, an identification. The identification may be conducted by, for example, a financial server.

Referring to FIG. 19C, the third token issuance operation may include, for example, an electronic device 1922, a payment server 1924, or a token server 1926. The electronic device 1922 may include, for example, a payment application, a payment manager, a security module, or a TEE.

According to various embodiments of the present disclosure, the electronic device or an electronic device may acquire card-related information through a sensor functionally connected to the electronic device. The card-related information may be used in, for example, a card registration operation. The sensor may include, for example, an OCR.

The card-related information may include, for example, at least one among PAN, valid period, and CVV. The sensor may be operated using the payment application included in the electronic device.

According to an embodiment of the present disclosure, the electronic device or an electronic device may perform an authentication operation (e.g., ID&V). The authentication operation, for example, an identification, may be performed using the payment application.

According to an embodiment of the present disclosure, the electronic device 1922 may perform the card registration and/or the identification when performing the payment function. For example, the electronic device 1922 may perform the card registration and the identification in order to perform the payment function, and the card registration and the identification may refer to a standby (preparation) state for the payment function.

According to an embodiment of the present disclosure, the electronic device 1922, the payment server 1924, and the token server 1926 may share information associated with the card registration and the identification. For example, the electronic device 1922, the payment server 1924, and the token server 1926 may share at least one type of information among PAN, valid term, CVV, device information, and user information.

According to an embodiment of the present disclosure, a token associated with the third token issuance operation may be issued (generated) when payment is performed using the payment function.

According to various embodiments of the present disclosure, the payment application included in the electronic device 1922 may perform user authentication in order to perform the payment function. For example, the user authentication may include secret code authentication, pattern authentication, or biometric information authentication.

According to an embodiment of the present disclosure, when the user authentication is successful (e.g., authentication completion), the payment application may perform the third token issuance operation with respect to the payment server 1924. The third token issuance operation may include, for example, a token request.

According to an embodiment of the present disclosure, based on the token request, the payment server 1924 may transfer card information (e.g., card Identifier) and/or user information to the token server 1926. The information related to the electronic device 1922 may include, for example, information of a device having requested the third token issuance operation.

According to an embodiment of the present disclosure, the token server 1926 may issue (generate) a token based on the information received from the payment server 1924.

According to an embodiment of the present disclosure, the token server 1926 may transfer a token based on the information received from the payment server 1924.

According to an embodiment of the present disclosure, the payment server 1924 may transfer the token to the electronic device 1922.

According to an embodiment of the present disclosure, the electronic device 1922 may store, in the security module or the TEE, the token received from the payment server 1924. For example, the electronic device 1922 may store the token in the security module or the TEE, which is a security area, to control access from the outside.

According to an embodiment of the present disclosure, the electronic device 1922 may store, in the general memory (e.g., the memory included in the REE), the token received from the payment server 1924.

According to an embodiment of the present disclosure, the electronic device 1922 may not store, in the storage area (e.g., the memory) included in the electronic device 1922, the token received from the payment server 1924. For example, the electronic device 1922 may use the token in the payment function instead of storing the token in the storage area.

According to an embodiment of the present disclosure, the storage area of the token may be changed based on a payment method (e.g., OTP or call center) performed by the electronic device 1922. For example, the token may be stored in the security module or the TEE when the payment method is OTP, and may not be stored in the electronic device 1922 when the payment method is call center.

According to various embodiments of the present disclosure, the token may include use time or valid time. For example, use of the token may be restricted when a certain time (e.g., three hours or one day) has passed from the issuance (generation) of the token.

According to various embodiments of the present disclosure, the token may include card information. For example, the token may include disposable card information (e.g., a one-time card (OTC)).

Figure 20:
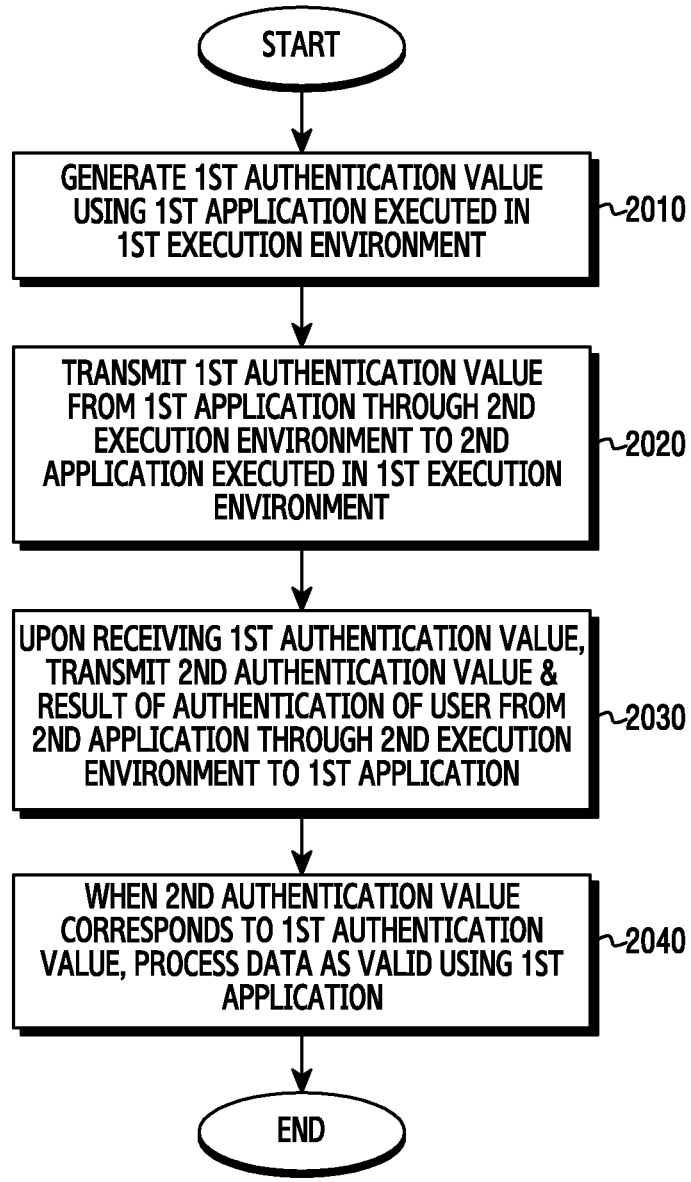
FIG. 20 is a flowchart illustrating a data communication between security applications according to various embodiments of the present disclosure.

FIG. 20 is a flowchart illustrating a data communication between security applications according to various embodiments of the present disclosure.

Referring to FIG. 20, a user may request the payment module 921 of a first security application (e.g., the security payment module 1121 or 1221) being executed in the TEE 920 for payment to perform a payment operation, using the payment application (e.g., the payment application 1115 or 1214) being executed in the REE 910 of an electronic device (e.g., the electronic device 800).

In operation 2010, the first security application 1121 or 1221 executed in the TEE 920 may generate a disposable random number.

According to an embodiment of the present disclosure, the first security application 1121 or 1221 may request a second security application (e.g., the biometric information module 925) being executed in the TEE 920 for user authentication for payment to perform user authentication.

In operation 2020, in response to the request, the first security application 1121 or 1221 may transmit the disposable random number to a second security application (e.g., a security application 1123 or 1223). According to an embodiment of the present disclosure, a request between the first security application 1121 or 1221 and the second security application 1123 or 1223 being executed in the TEE 920 may be transmitted through the security environment relay module 946 of the REE 910.

According to an embodiment of the present disclosure, the second security application 1123 or 1223 may acquire the user's biometric information (e.g., Fingerprint), using the biometric sensor 240I. The second security application 1123 or 1223 may compare the acquired biometric information with biometric information having been initially registered by the existing user.

In operation 2030, the second security application 1123 or 1223 may transmit a result of the comparison together with the disposable random number having been received from the first security application 1121 or 1221, to the first security application 1121 or 1221. According to an embodiment of the present disclosure, the second security application 1123 or 1223 may encrypt and transmit the result of the comparison and the disposable random number. According to an embodiment of the present disclosure, a request between the first security application 1121 or 1221 and the second security application 1123 or 1223 being executed in the TEE 920 may be transmitted through the security environment relay module 946 of the REE 910.

In operation 2040, based on the result of the comparison between the disposable random number received from the second security application 1123 or 1223 and the random number generated by the first security application 1121 or 1221, the first security application 1121 or 1221 may determine whether to treat the result of the comparison as valid data.

A method of operating an electronic device capable of operating a plurality of execution environments including a first execution environment and a second execution environment according to various embodiments may include generating a first authentication value, using a first application executed in the first execution environment, transmitting the first authentication value from the first application through the second execution environment to a second application executed in the first execution environment, transmitting, based on reception of the first authentication value, a second authentication value and a result of authentication of the user from the second application to the first application through the second execution environment, and performing, when the second authentication value corresponds to the first authentication value, payment based on the result of the authentication, using the first application.

According to various embodiments of the present disclosure, when the first authentication value and the second authentication value do not correspond to each other, performing of the payment may include dispensing with payment using the first application.

According to various embodiments of the present disclosure, the transmitting to the first application may include acquiring authentication information of the user, using the second application.

According to various embodiments of the present disclosure, the authentication information may include a PIN, user-specific pattern-related data, fingerprint recognition-related data, a touch input value, or combinations thereof.

According to various embodiments of the present disclosure, acquiring of the authentication information may include comparing the authentication information with pre-stored authentication information and transmitting a result of authentication based on a result of the comparison.

According to various embodiments of the present disclosure, the transmitting to the first application may include encrypting a second authentication value corresponding to the first authentication value and the result of the authentication.

According to various embodiments of the present disclosure, performing of the payment may include decrypting the second authentication value and the result of the authentication, using a pre-stored key.

According to various embodiments of the present disclosure, the second execution environment may include a first trust zone functionally connected to the first application and a second trust zone functionally connected to the second application.

According to various embodiments of the present disclosure, the transmitting to the second application may include transmitting the first authentication value to the second trust zone, using the first application, by the first trust zone.

According to various embodiments of the present disclosure, the transmitting to the first application may include transmitting the result of the authentication to the first trust zone, using the second application, by the second trust zone.

According to various embodiments of the present disclosure, the first execution environment may include a trusted execution environment and the second execution environment may include a rich execution environment.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a memory configured to store a plurality of execution environments including a first execution environment and a second execution environment; and
   a processor configured to:
      generate a first authentication value comprising a disposable random number encrypted by the processor through a hardware key of a trusted execution environment of the first execution environment, using a first application executed in the first execution environment,
      transmit the first authentication value from the first application, which is executed in the first execution environment, through the second execution environment to a second application, which is executed in the first execution environment,
      based on reception of the first authentication value, decrypt the first authentication value using the hardware key and authenticate a user using the second application,
      based on a result of the authentication, encrypt user authentication success-or-failure information together with the disposable random number using the second application,
      transmit a second authentication value comprising the user authentication success-or-failure information encrypted together with the disposable random number to the first application through the second execution environment,
      based on reception of the second authentication value, decrypt the second authentication value using the first application using the hardware key,
      determine whether the second authentication value corresponds to the first authentication value based on the disposable random number, using the first application, and
      based on the first application identifying that the second authentication value corresponds to the first authentication value and the user authentication success-or-failure information indicates a success of the authentication, perform a payment,
   wherein the first execution environment comprises the trusted execution environment and the second execution environment comprises a rich execution environment.

2. The electronic device of claim 1, wherein the processor is further configured to, based on the first application identifying that the second authentication value does not correspond to the first authentication value, refrain from performing the payment.

3. The electronic device of claim 1, wherein the authentication information of the user is acquired using a third application executed in the second execution environment.

4. The electronic device of claim 3, wherein the authentication information comprises a personal identification number (PIN), user-specific pattern-related data, fingerprint recognition-related data, a touch input value, or combinations thereof.

5. The electronic device of claim 3, wherein the processor is further configured to:
   acquire reference authentication information stored in the first execution environment, using the second application executed in the first execution environment,
   transmit the reference authentication information from the second application to the first application through the second execution environment, and
   compare the authentication information with the reference authentication information using the first application.

6. The electronic device of claim 1, wherein the second execution environment comprises a first trust zone functionally connected to the first application and a second trust zone functionally connected to the second application.

7. The electronic device of claim 6,
   wherein the first trust zone transmits the first authentication value to the second trust zone using the first application, and
   wherein the second trust zone transmits a result of an authentication of the user to the first trust zone using the second application.

8. The electronic device of claim 3, further comprising:
   a biometric sensor,
   wherein the processor is further configured to acquire, from the biometric sensor, the authentication information of the user using a biometric application which is executed in the first execution environment.

9. The electronic device of claim 1, wherein the second execution environment comprises an application the processor is configured to execute to perform each function of at least one of phone call, messaging, payment, alarm, browsing, or camera functions.

10. A method of operating an electronic device capable of operating a plurality of execution environments including a first execution environment and a second execution environment, the method comprising:
   generating a first authentication value comprising a disposable random number encrypted by a processor through a hardware key of a trusted execution environment of the first execution environment, using a first application executed in the first execution environment;
   transmitting the first authentication value from the first application, which is executed in the first execution environment, through the second execution environment to a second application, which is executed in the first execution environment;
   based on reception of the first authentication value, decrypting the first authentication value using the hardware key and authenticating a user using the second application;
   based on a result of the authentication, encrypting user authentication success-or-failure information together with the disposable random number using the second application;
   transmitting a second authentication value comprising the user authentication success-or-failure information encrypted together with the disposable random number to the first application through the second execution environment;
   based on reception of the second authentication value, decrypting the second authentication value using the first application using the hardware key;

determining whether the second authentication value corresponds to the first authentication value based on the disposable random number, using the first application; and based on the first application identifying that the second authentication value corresponds to the first authentication value and the user authentication success-or-failure information indicates a success of the authentication, performing a payment, wherein the first execution environment comprises the trusted execution environment and the second execution environment comprises a rich execution environment.

11. The method of claim 10, further comprising, based on the first application identifying that the second authentication value does not correspond to the first authentication value, refraining from performing the payment.

12. The method of claim 10, wherein the authentication information of the user is acquired using a third application executed in the second execution environment.

13. The method of claim 12, wherein the authentication information comprises a personal identification number (PIN), user-specific pattern-related data, fingerprint recognition-related data, a touch input value, or combinations thereof.

14. The method of claim 12, wherein the transmitting of the second authentication value comprises:
acquiring reference authentication information stored in the first execution environment, using the second application executed in the first execution environment;
transmitting the reference authentication information from the second application to the first application through the second execution environment; and
comparing the authentication information with the reference authentication information using the first application.

15. The method of claim 10, wherein the second execution environment comprises a first trust zone functionally connected to the first application and a second trust zone functionally connected to the second application.

16. The method of claim 15,
wherein the transmitting to the second application comprises transmitting the first authentication value to the second trust zone using the first application by the first trust zone, and
wherein the transmitting to the first application comprises transmitting a result of an authentication of the user to the first trust zone using the second application by the second trust zone.

17. At least one non-transitory computer-readable recording medium for storing a computer program recorded therein for executing operations in an electronic device capable of operating a plurality of execution environments including a first execution environment and a second execution environment, the operations comprising:

generating a first authentication value comprising a disposable random number encrypted by a processor through a hardware key of a trusted execution environment of the first execution environment, using a first application executed in the first execution environment;

transmitting the first authentication value from the first application, which is executed in the first execution environment, through the second execution environment to a second application, which is executed in the first execution environment;

based on reception of the first authentication value, decrypting the first authentication value using the hardware key and authenticating a user using the second application;

based on a result of the authentication, encrypting user authentication success-or-failure information together with the disposable random number using the second application;

transmitting a second authentication value comprising the user authentication success-or-failure information encrypted together with the disposable random number to the first application through the second execution environment;

based on reception of the second authentication value, decrypting the second authentication value using the first application using the hardware key;

determining whether the second authentication value corresponds to the first authentication value based on the disposable random number, using the first application; and based on the first application identifying that the second authentication value corresponds to the first authentication value and the user authentication success-or-failure information indicates a success of the authentication, performing a payment, wherein the first execution environment comprises the trusted execution environment and the second execution environment comprises a rich execution environment.

* * * * *